(12) United States Patent
Tagawa et al.

(10) Patent No.: US 7,096,504 B1
(45) Date of Patent: Aug. 22, 2006

(54) DISTRIBUTION SYSTEM, SEMICONDUCTOR MEMORY CARD, RECEIVING APPARATUS, COMPUTER-READABLE RECORDING MEDIUM AND RECEIVING METHOD

(75) Inventors: Kenji Tagawa, Katano (JP); Teruto Hirota, Moriguchi (JP); Hideki Matsushima, Studio City, CA (US); Masayuki Kozuka, Arcadia, CA (US); Mitsuhiro Inoue, Studio City, CA (US); Yasushi Uesaka, Sanda (JP); Shunji Harada, Osaka (JP); Taihei Yugawa, Nara (JP); Masaya Miyazaki, Ikeda (JP); Masanori Nakanishi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 638 days.

(21) Appl. No.: 09/653,416

(22) Filed: Aug. 31, 2000

(30) Foreign Application Priority Data

| Sep. 1, 1999 | (JP) | ................................. 11-247922 |
| Sep. 13, 1999 | (JP) | ................................. 11-258582 |
| Sep. 28, 1999 | (JP) | ................................. 11-274182 |
| Apr. 26, 2000 | (JP) | ............................. 2000-125864 |

(51) Int. Cl.
*G06F 7/04* (2006.01)
*G06F 17/30* (2006.01)
*G06F 17/60* (2006.01)
*H04K 1/00* (2006.01)

(52) U.S. Cl. ........................... 726/27; 705/51; 713/189

(58) Field of Classification Search .................... 713/2, 713/113, 168, 189; 707/2, 9, 204; 705/1, 705/51, 54, 59; 726/27
See application file for complete search history.

(56) References Cited

U.S. PATENT DOCUMENTS

| 5,515,532 | A | * | 5/1996 | Iijima | ........................ 707/200 |
| 5,608,902 | A | * | 3/1997 | Iijima | ........................ 707/200 |
| 5,761,678 | A | * | 6/1998 | Bendert et al. | ............. 707/204 |
| 5,790,664 | A | * | 8/1998 | Coley et al. | ................ 709/203 |

(Continued)

FOREIGN PATENT DOCUMENTS

EP      0 715 247 A1    6/1996

(Continued)

OTHER PUBLICATIONS

"SDMI Secure Digital Music Initiative", SDMI Portable Device Specification, Part 1, Version 1.0, Los Angeles, Jul. 8, 1999, Document No. pdwg99070802, pp. 1-35.

*Primary Examiner*—Ayaz Sheikh
*Assistant Examiner*—Christian La Forgia
(74) *Attorney, Agent, or Firm*—Wenderoth, Lind & Ponack, L.L.P.

(57) ABSTRACT

A distribution server 103 distributes a content via a network, and a KIOSK terminal 105 receives the content via the network and records the content in an SD memory card 100. A customer device 111 receives a content via the SD memory card 100, checks out the content and records a copy on a recording medium. SD-Audio players 122 to 124 receive a copy of the content and play back the copy. Here, the KIOSK terminal 105 records a Usage Rule that certifies the right to control recording of content on the SD memory card 100. Move Control Information showing the number of times that moving of rights is permitted is set in the Usage Rule.

13 Claims, 45 Drawing Sheets

U.S. PATENT DOCUMENTS

| | | | |
|---|---|---|---|
| 5,845,069 A * | 12/1998 | Tanaka | 713/200 |
| 5,884,298 A * | 3/1999 | Smith et al. | 707/2 |
| 5,920,861 A * | 7/1999 | Hall et al. | 707/9 |
| 5,925,127 A | 7/1999 | Ahmad | |
| 6,092,112 A | 7/2000 | Fukushige | 709/229 |
| 6,330,670 B1 * | 12/2001 | England et al. | 713/2 |
| 6,345,256 B1 * | 2/2002 | Milsted et al. | 705/1 |
| 6,418,421 B1 * | 7/2002 | Hurtado et al. | 705/54 |
| 6,421,685 B1 * | 7/2002 | Nishikawa | 707/201 |
| 6,519,700 B1 * | 2/2003 | Ram et al. | 713/193 |
| 6,567,915 B1 * | 5/2003 | Guthery | 713/168 |
| 2001/0042043 A1 * | 11/2001 | Shear et al. | 705/51 |

FOREIGN PATENT DOCUMENTS

| | | |
|---|---|---|
| EP | 0 809 221 A2 | 11/1997 |
| EP | 0 878 796 | 11/1998 |
| JP | 08-263440 | 10/1996 |
| JP | 09-160899 | 6/1997 |
| JP | 11-234259 | 8/1999 |
| JP | 11-259964 | 9/1999 |
| JP | 11-328033 | 11/1999 |
| WO | 95/34857 | 12/1995 |
| WO | 97/14087 | 4/1997 |

* cited by examiner

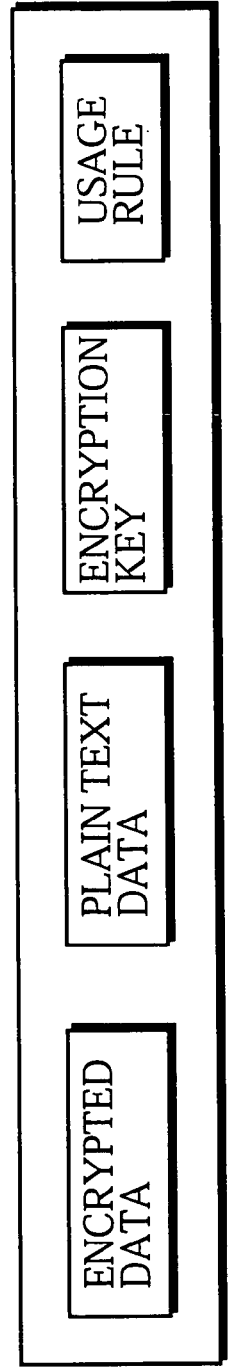

FIG. 2A

RECORDING MEDIUM

※NO ENCRYPTION KEY SO DEVICE HAVING THIS RECORDING MEDIUM CANNOT PLAY BACK COPYRIGHTED MATERIAL

FIG. 2B

RECORDING MEDIUM

※HAS AN ENCRYPTION KEY, SO DEVICE HAVING THIS RECORDING MEDIUM CAN PLAY BACK COPYRIGHTED MATERIAL
NO USAGE RULE, SO COPYRIGHTED MATERIAL CANNOT BE RECORDED TO ANOTHER RECORDING MEDIUM

FIG. 2C

RECORDING MEDIUM

※HAS AN ENCRYPTION KEY, SO DEVICE HAVING THIS RECORDING MEDIUM CAN PLAY BACK COPYRIGHTED MATERIAL
  HAS A USAGE RULE, SO COPYRIGHTED MATERIAL CAN BE RECORDED ON ANOTHER RECORDING MEDIUM

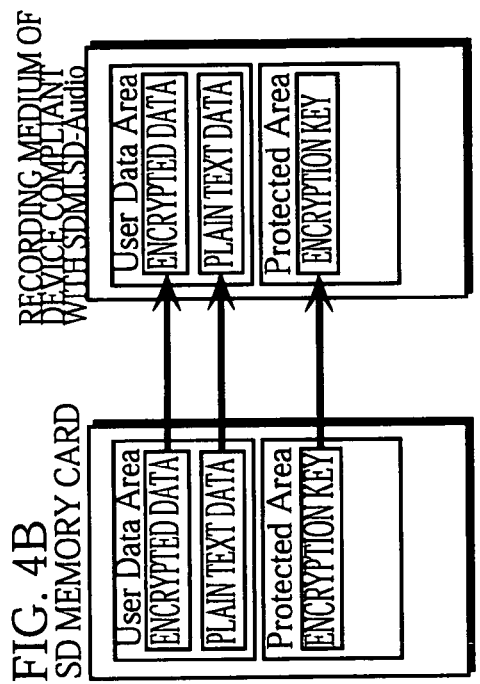

FIG. 4A
SD MEMORY CARD

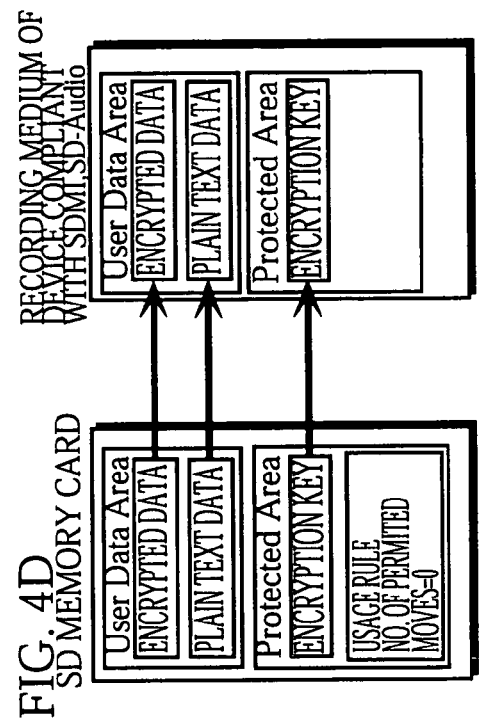

FIG. 4B
SD MEMORY CARD

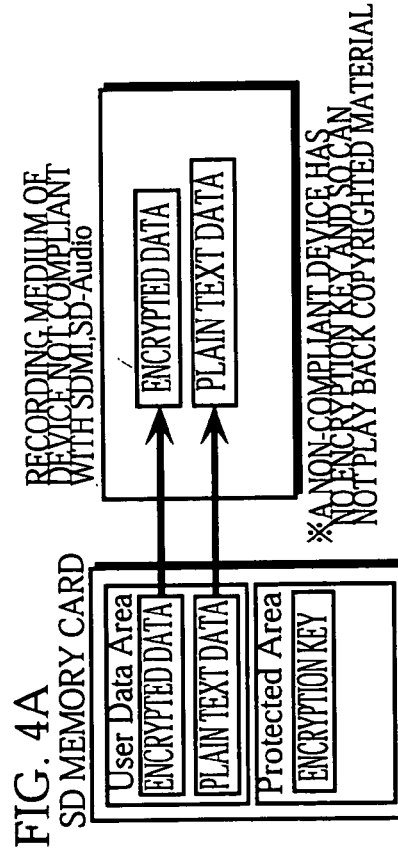

FIG. 4C
SD MEMORY CARD

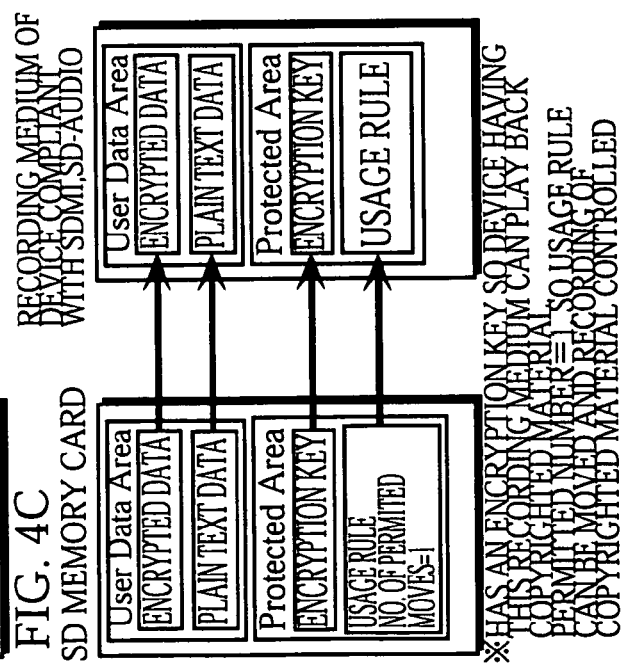

FIG. 4D
SD MEMORY CARD

※ A NON-COMPLIANT DEVICE HAS NO ENCRYPTION KEY AND SO CAN NOT PLAY BACK COPYRIGHTED MATERIAL

※ HAS AN ENCRYPTION KEY SO DEVICE CAN PLAY BACK COPYRIGHTED MATERIAL. THIS RECORDING MEDIUM HAS A USAGE RULE PERMITTED NUMBER=1 SO USAGE RULE CAN BE MOVED AND RECORDING OF COPYRIGHTED MATERIAL CONTROLLED

※ HAS AN ENCRYPTION KEY SO COPYRIGHTED MATERIAL CAN BE PLAYED BACK. HOWEVER PERMITTED NUMBER=0 SO USAGE RULE MATERIAL CANNOT BE CONTROLLED

NUMBER OF CHECK-OUTS =3

NUMBER OF CHECK-OUTS=3

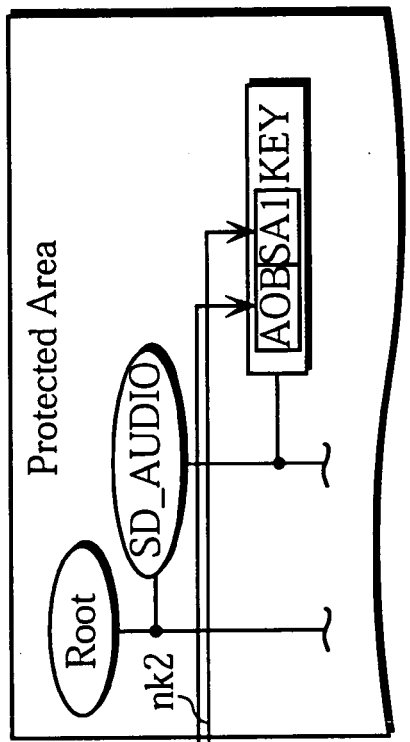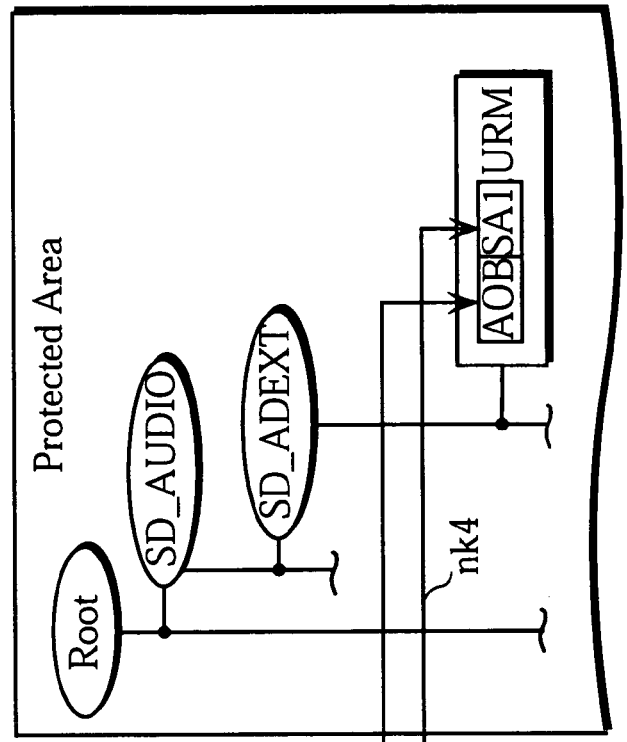
FIG. 28A
FIG. 28B

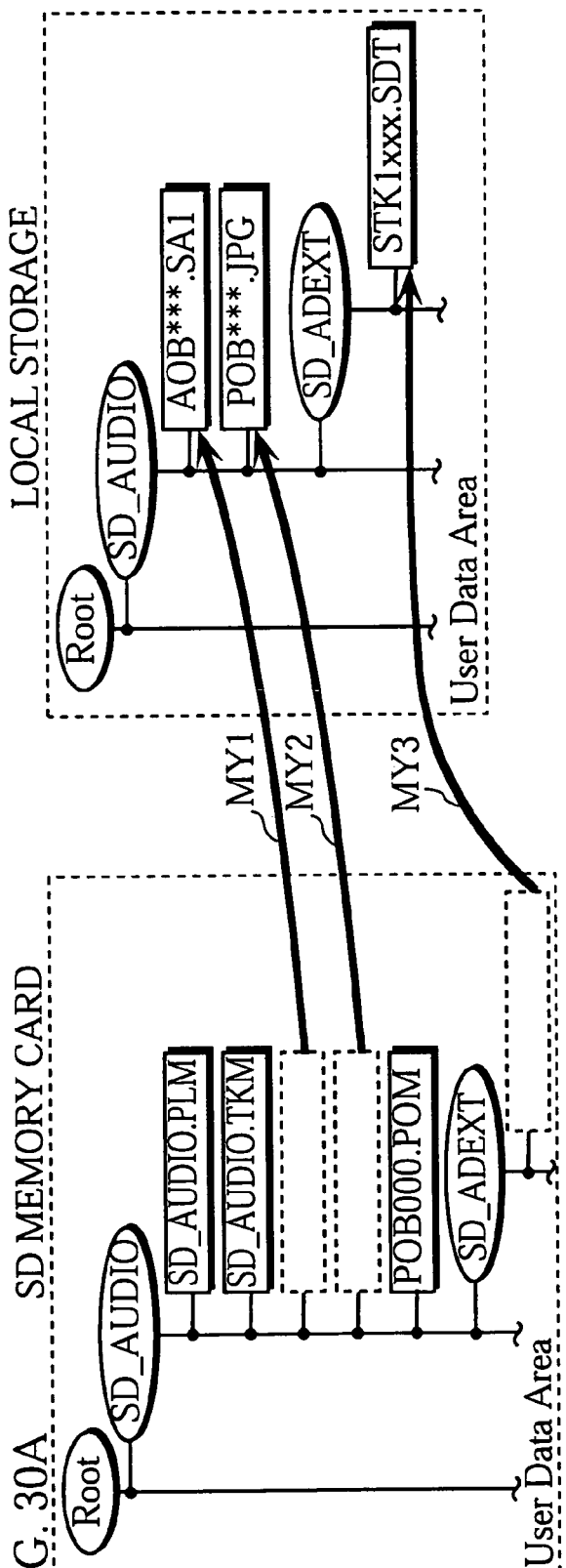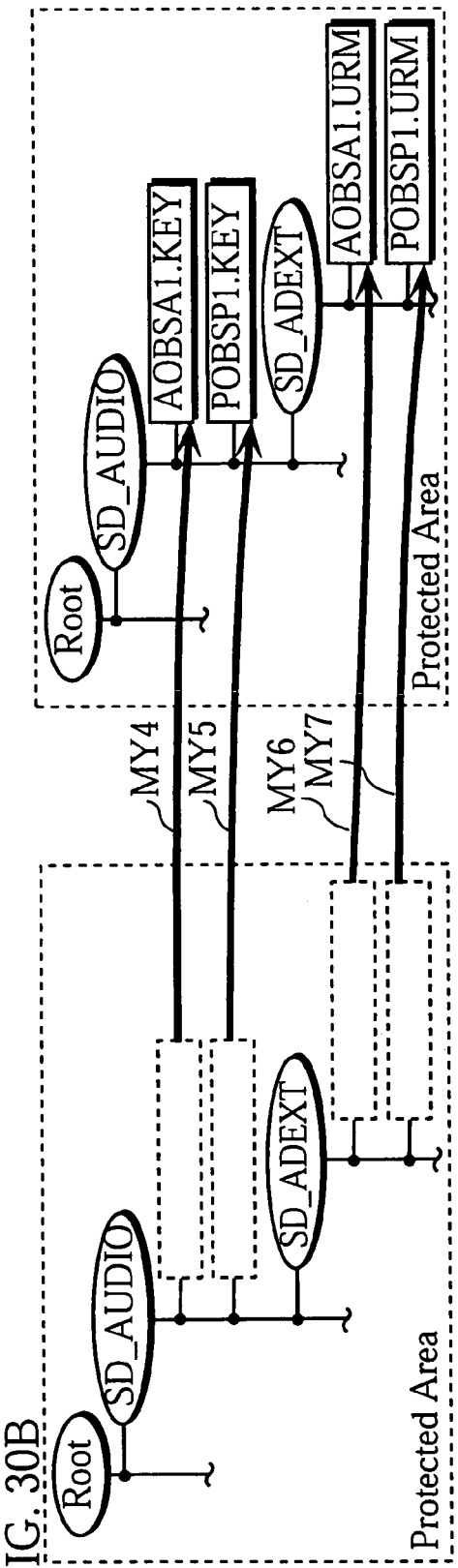

FIG. 31A  SD MEMORY CARD
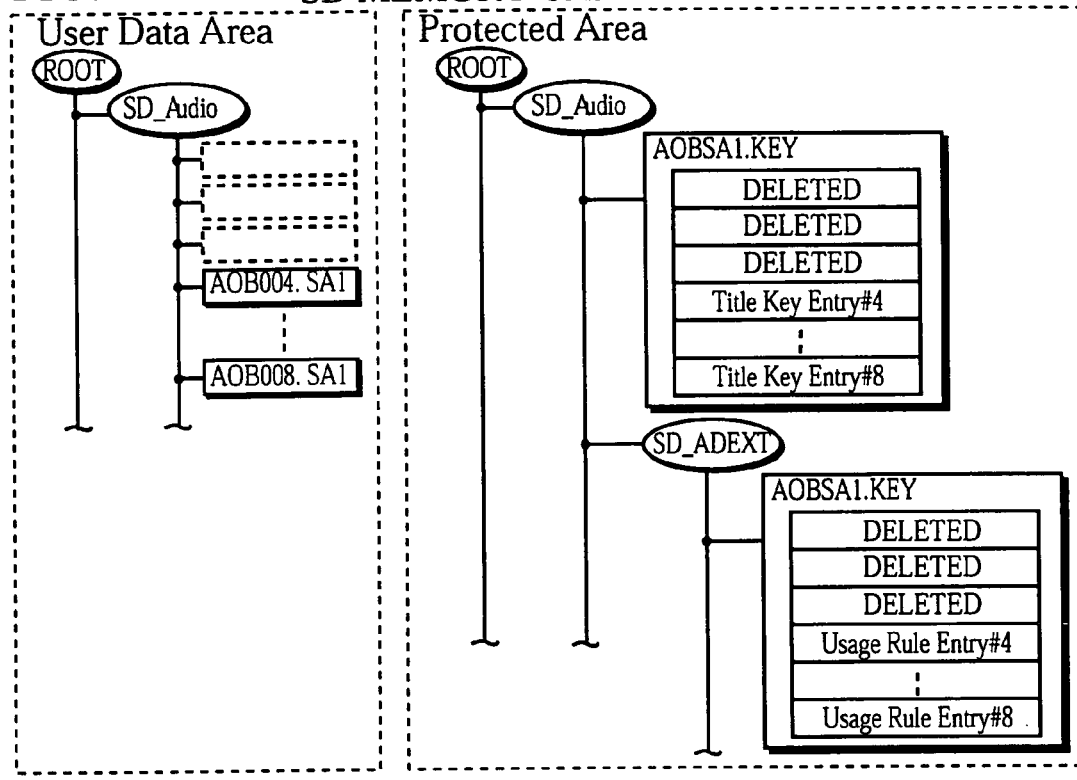
FIG. 31B  LOCAL STORAGE
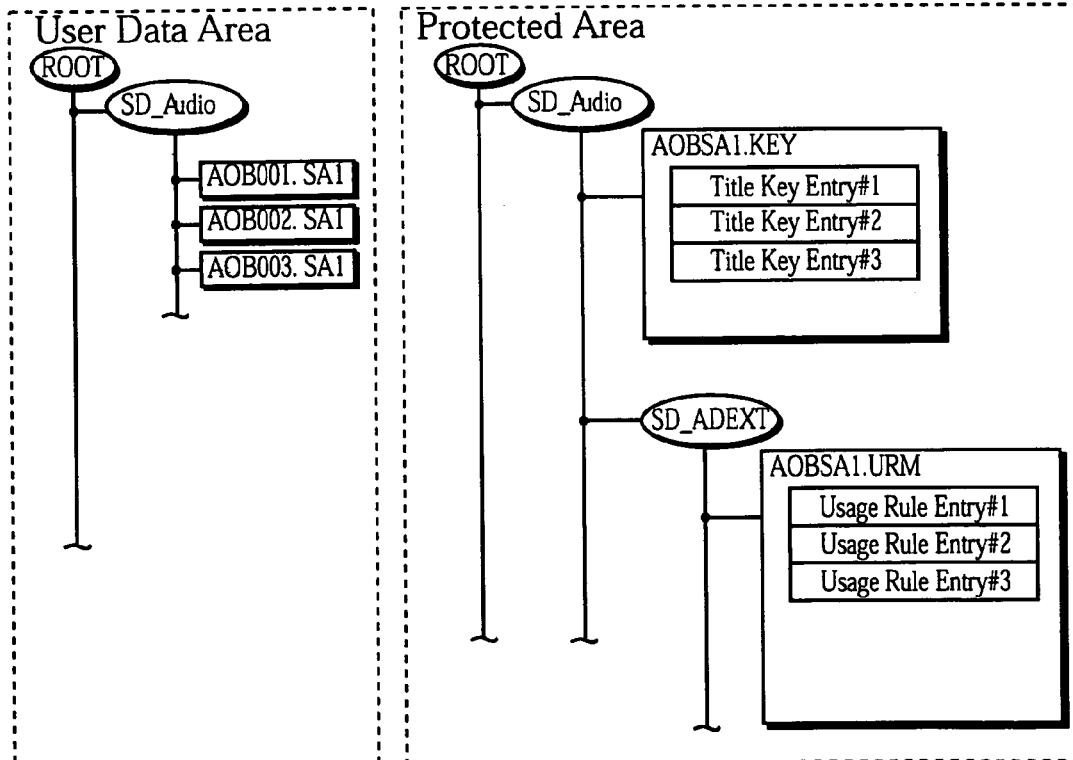

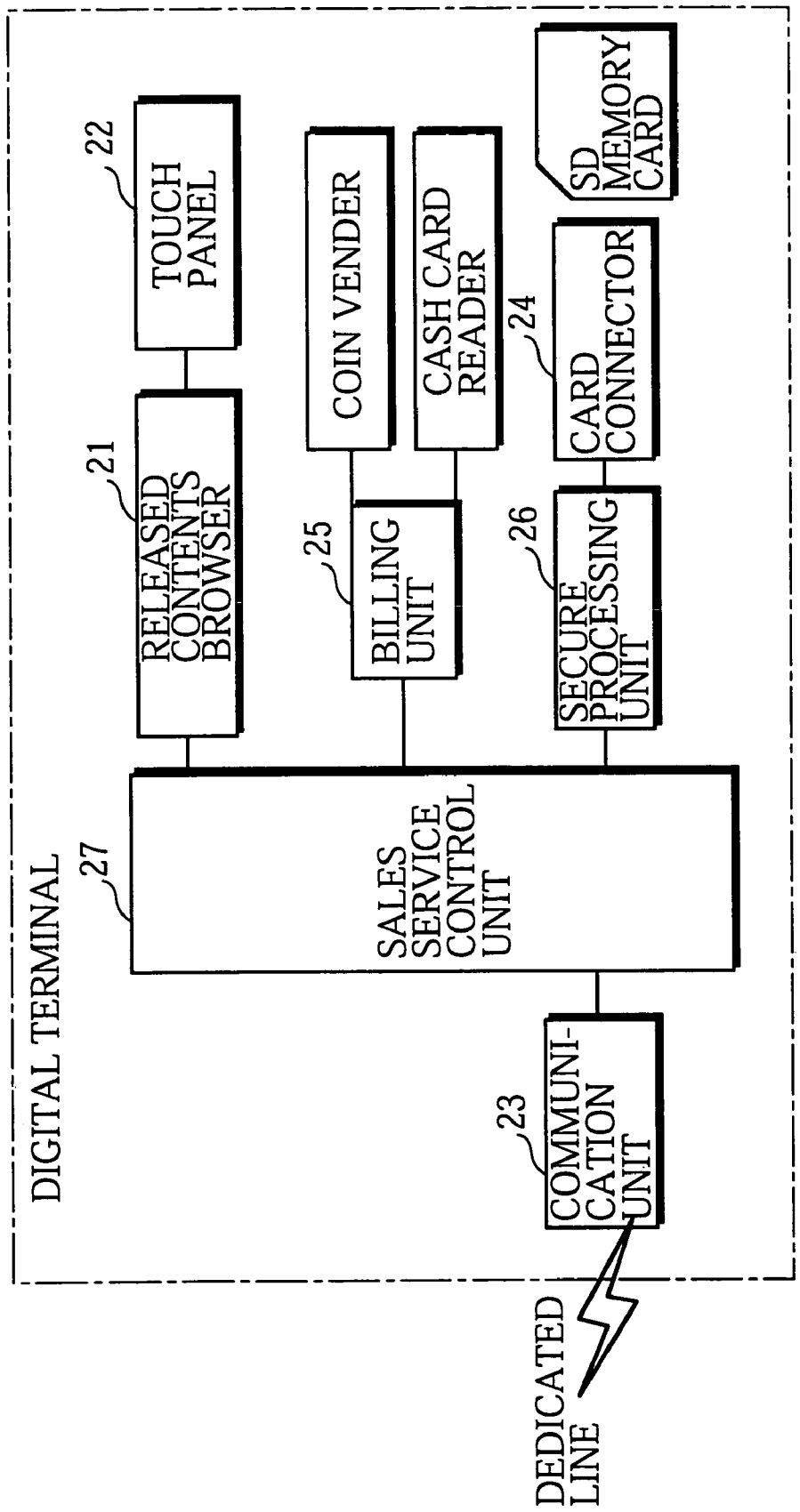

DISTRIBUTION SYSTEM, SEMICONDUCTOR MEMORY CARD, RECEIVING APPARATUS, COMPUTER-READABLE RECORDING MEDIUM AND RECEIVING METHOD

BACKGROUND OF THE INVENTION

1. Field of the Invention

The present invention relates to a distribution system realized by a service for distributing copyrighted digital material such as Electronic Music Distribution (EMD), a semiconductor memory card, a receiving apparatus, a computer-readable recording medium and a receiving method.

2. Description of the Background Art

A distribution system includes a distribution server, a device for purchasing contents, and a playback apparatus for playing back contents, and gives people living around the world the opportunity to purchase copyrighted material via various global networks. If a personal computer owned by a user is used as the purchasing device, contents are purchased in the following way. The user operates the personal computer, and transmits a purchase request to the distribution server. Upon receiving the purchase request, the distribution server bills the user, and then transmits the copyrighted digital material. The personal computer operated by the user receives the transmitted copyrighted material, and writes it onto the hard disk (HD). If writing is performed correctly, the purchase of the copyrighted material is completed.

The purchasing device performs processing called check-out and check-in. Check-out refers to the process of recording copyrighted material (a first-generation copy) onto a portable recording medium such as a semiconductor memory card or a mini disc. The number of times check-out is performed by the purchasing device can also be limited to a predetermined number, such as three or four. If copyrighted material is recorded onto a portable recording medium using check-out, this copyrighted material can be played back using the playback apparatus. However, once check-out has been performed the predetermined number of times, the copyrighted material can be set in a state in which check-out is not permitted. Check-in, on the other hand, is the process of returning copyrighted material recorded on a portable recording medium to the personal computer. If check-in is performed on a copyrighted material that has been set so that check-out is not permitted, check-out of the copyrighted material becomes possible once more. Check-out and check-in are prerequisites for copyright protection, which prevents reduction in the copyright owner's profits.

The following is a brief explanation of how copyright is protected when check-out and check-in are being performed. A unique identifier, called a Media-ID, is recorded in an area of the recording medium onto which a copy of the copyrighted material is to be recorded, the area being one that cannot be read by a normal user operation. When check-out is performed, contents are encrypted using the media ID unique to the recording medium. Thus, even if an ill-intentioned user copies contents that have been checked out onto one recording medium onto another recording medium, the media ID of the recording medium onto which the contents are copied differs from the media ID that was used to encrypt the contents (the media ID of the original disc). As a result, decryption cannot be properly performed, and copyright is protected.

SUMMARY OF THE INVENTION

The object of the invention is to provide a distribution system that provides a high level of convenience for the user, while protecting copyright, when a device manages the recording of copyrighted material using check-out, check-in and the like.

Current distribution systems pose various obstacles to user convenience. Such distribution systems include the user's personal computer, as well as devices used as KIOSK terminals in convenience stores, record stores, and stations.

If the device used is a KIOSK terminal, copyrighted material is purchased in the following way. First the KIOSK terminal prompts the user to provide a portable recording medium on which the copyrighted material is to be recorded, such as a semiconductor memory card or a mini disc. Once this portable recording medium has been connected to the KIOSK terminal, and the necessary charge paid, the copyrighted material is downloaded from the distribution server and recorded onto the portable recording medium. Users of KIOSK terminals can thus easily acquire their favorite music while shopping or on the way to work or school.

If copyrighted material is recorded onto a semiconductor memory card by a KIOSK terminal, however, a device other than the KIOSK terminal is not allowed to check-in the copyrighted material recorded onto the semiconductor memory card by the KIOSK terminal. The reason for this is as follows. Were check-in to be performed by another device, the copyrighted material on which check-in had been performed could be checked out three or four more times. If check-in by another device and check-out by the same device were to be repeated, a large number of first generation copies would be made, and copyright protection made ineffective. Thus, check-in by other devices is completely prohibited in order to prevent this kind of proliferation of first generation copies.

As a result, a user who has purchased copyrighted material from a KIOSK terminal will not be able to enjoy the ability to perform check-out and check-in at home using a personal computer. The fact that a user who has paid the required charge is not able to perform check-out and check-in shows a lack of consideration of the user and may reduce their desire to use KIOSK terminals.

In order to overcome the above problems and achieve the above object, the inventors of the present invention suggest that a Usage Rule, showing the right to manage the recording of copies of copyrighted material, be moved. In the Secure Digital Music Initiative (SDMI), this Usage Rule is called Digital Rights Management Information (DRMI). Management of the number of copy generations and number of times copies can be made during check-out and copying is performed based on this Usage Rule. A distribution system that moves the Usage Rule, thereby achieving the above object, includes a distribution server for distributing a content via a network, and first and second receiving apparatuses for receiving the content via the network, and records a copy of the content onto a recording medium in order to supply the content to a playback apparatus. Here, the first receiving apparatus may include a first receiving unit and a recording unit. The first receiving unit receives, via the network, a data set including the content and control information controlling copying of the content onto the recording medium, and holds the received data set. The recording unit generates authorization information showing whether moving the data set to another receiving apparatus is permitted. Then the recording unit records the content onto a distribution medium together with corresponding usage rule information including (1) the authorization information, and (2) the control information included in the data set. Here, the second receiving apparatus may include a second receiving unit, a data set moving unit, and a check-out unit. The second receiving unit receives the data set from the distribution server via the network, and holds the received data set. The data set moving unit reads authorization information from the distribution medium, and only when the read authorization information shows that moving the data set is permitted, (a) moves the data set from the distribution medium to the inside of the second receiving apparatus, and (b) holds the data set. The check-out unit performs check-out when the data set is held by one of the second receiving unit and the data set moving unit. Check-out is performed based on the control information in the held data set by generating a copy of the content included in the held data set and recording the copy onto the recording medium, the copy recorded onto the recording medium being supplied to the playback apparatus.

A single device moves a content and a corresponding Usage Rule to two receiving devices, so that control of recording of a content and corresponding Usage Rule recorded onto a semiconductor memory card by a first receiving apparatus (in the above example the KIOSK terminal) can be performed by a second receiving apparatus (here, a personal computer). Recording of copies of copyrighted materials recorded by the KIOSK terminal can be performed by the personal computer, so a user who has paid the appropriate charge to purchase a copyrighted material from the KIOSK terminal can perform check-out and check-in of the copyrighted material on their own personal computer.

Here, the control information may indicate a number of remaining check-outs. The check-out unit may include a connecting unit for connecting to a recording medium, and recording a copy of the content included in the data set held by the data set moving unit onto the recording medium when a copy of the held content is not already recorded on the connected recording medium, and the number of remaining check-outs shown by the control information held by one of the second receiving unit and the data set moving unit is at least one. Furthermore, the second receiving apparatus may include a check-in unit and an updating unit. When a copy of the content is already recorded on the connected recording medium, the check-in unit deletes the copy of the content recorded on the connected recording medium. The updating unit updates the control information by decrementing the number of remaining check-outs when a copy of the held content is newly recorded on the recording medium, and incrementing the number of remaining check-outs when the copy of the held content is deleted from the recording medium. In this distribution system, check-out performed by the second receiving apparatus can only be performed for the number of times shown by the control information, so that check-out cannot be performed beyond the limit set by the copyright owner. This ensures that the profits of the copyright owner will not be unfairly reduced.

Here, the recording medium may have an assigned unique identifier. The check-out unit may include an allocation unit and a storage unit. The allocation unit allocates a unique identifier to the held content. The unique identifier is recorded onto the recording medium with the content when check-out is performed. The storage unit reads the unique identifier for the recording medium connected to the connecting unit from the recording medium, and stores the read recording medium identifier as a pair with the allocated content identifier. Furthermore, the check-in unit may include a read unit, a comparing unit, and a holding unit. When a copy of the content has already been recorded on a recording medium connected to the connecting unit, the read unit reads the unique identifiers for the connected recording medium and the content. The comparing unit compares the pair of identifiers read by the read unit with the pair of identifiers stored by the storage unit to determine whether the copy recorded on the connected recording medium was previously produced by the second recording apparatus. When the copy was previously produced by the second recording apparatus, the holding unit reads the copy from the connected recording medium, holds the read copy, and then deletes the copy from the recording medium. When the second receiving apparatus in this distribution system performs check-in, it determines whether the copy to be checked-in is one that was previously checked out by itself, by comparing two pairs of identifiers, each including a recording medium identifier and content identifier. The second recording apparatus only performs check-in if the copy has been previously checked out by itself, so there is no danger of the principle that a device should not check-in a copy that has been checked out by another device being ignored.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 1 shows a data structure of a copyrighted material;

FIG. 2A shows a situation (1) in which a copyrighted material is recorded onto a recording medium without an accompanying encryption key and Usage Rule information;

FIG. 2B shows a situation (2) in which a copyrighted material is recorded onto a recording medium without Usage Rule information;

FIG. 2C shows a situation (3) in which a copyrighted material is recorded onto a recording medium together with Usage Rule information;

FIG. 4A shows a situation in which an incompatible device is connected to the SD memory card 100 whose protected area stores only an encryption key;

FIG. 4B shows a situation in which a compatible device is connected to the SD memory card 100 whose protected area stores only an encryption key;

FIG. 4C shows a situation in which a compatible device is connected to the SD memory card 100 whose protected area stores an encryption key and a Usage Rule, the Usage Rule including Move Control Information authorizing data transfer;

FIG. 4D shows a situation in which a compatible device is connected to the SD memory card 100 whose protected area stores an encryption key and a Usage Rule, the permitted number of moves included in the Usage Rule being 0;

FIGS. 28A and 28B show correspondences between AOBSA1.KEY, AOBSA1.URM, and AOB files;

FIGS. 30A and 30B envisage a case in which all audio objects in a user data area of the SD memory card 100 are moved to the customer device;

FIGS. 31A and 31B show the files arranged in the user data area of the SD memory card 100 when only three of the eight audio objects in the user data area are moved;

FIG. 33 shows a structure of a digital terminal;

DESCRIPTION OF THE PREFERRED EMBODIMENTS

Figure 3A:
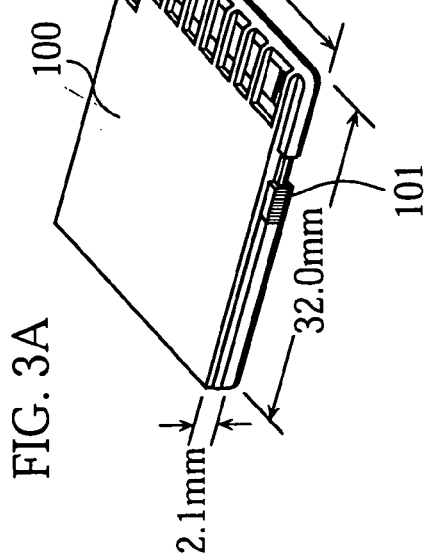
FIG. 3A shows an external view of an SD memory card.

The following embodiment describes a distribution system operated in accordance with the SDMI, SD-Audio Ver1.0 standard, and SD-Audio Ver1.1 standard. Note that devices compliant with the SDMI, the SD-Audio Ver1.0 standard, and the SD-Audio Ver1.1 standard are known as compatible devices, and devices not compliant with any one of these standards as incompatible devices. The SD-Audio Ver1.0 standard enables copyrighted material to be recorded onto a recording medium so that special playback and editing of songs can be performed. In contrast, the SD-Audio Ver1.1 standard enables copyrighted material to be moved and previewed.

FIG. 1 shows a data structure of a copyrighted material. The copyrighted material shown in the drawing is formed from encrypted data, plain text data, an encryption key used to encrypt the data, and a Usage Rule for managing recording of the copyrighted material. Examples of encrypted data are MPEG-AAC (Moving Picture Experts Group-Advanced Audio Coding) data, and JPEG (Joint Photographic Experts Group) still picture data, and an example of plain text data is navigation data controlling the reproduction of MPEG stream data and JPEG still picture data. Furthermore, the Usage Rule includes checkout authorization information showing the number of times that check-out is permitted, Move Control Information showing the number of times that movement of the copyrighted material is permitted, and copy control information. Alternative situations occurring when the data set forming the copyrighted material is recorded onto a recording medium are shown in FIGS. 2A to 2C.

FIG. 2A shows a situation (1) in which the copyrighted material is recorded on the recording medium without the Usage Rule. In this situation (1), the encryption key is not present, so the encrypted data cannot be decrypted, making it impossible to play back the copyrighted material.

FIG. 2B shows a situation (2) in which the copyrighted material is recorded on the recording medium without the Usage Rule. In situation (2), both the encryption key and the encrypted data are present, so this recording medium possesses the rights to play back the copyrighted material. However, the Usage Rule for managing recording is not present, so the encryption key and encrypted data of this copyrighted material cannot be recorded onto another recording medium. Note that in this specification the encrypted data and encryption key pairing that make up the body of the copyrighted material are also referred to as a content. When the encryption key and encrypted data are recorded on a recording medium, this status is referred to as 'playback rights recorded'.

FIG. 2C shows a situation (3), in which a copyrighted material including a Usage Rule is recorded on a recording medium. The rights for managing recording of the copyrighted material exist both on the recording medium and in a connected device. In situation (3), the situation shown in FIG. 2B can be created on another recording medium by performing check-out, check-in and the like on copyrighted materials, in addition to playback.

Next, a distribution medium that can store copyrighted materials securely is explained. In the embodiments, an example of such a distribution medium is a semiconductor memory card (hereafter referred to as a Secure Digital (SD) memory card). An SD memory card 100 shown in FIG. 2C has the external structure shown in FIG. 3A, being 32.0 mm long, 24.0 mm wide and 2.1 mm thick: about the size of a postage stamp, and small enough for a user to hold on the tip of one finger. The SD memory card 100 has nine connectors for connecting to a device, and a write protect switch 101 on one side, which can be set by the user to permit or prohibit overwriting of recorded data.

Figure 3B:
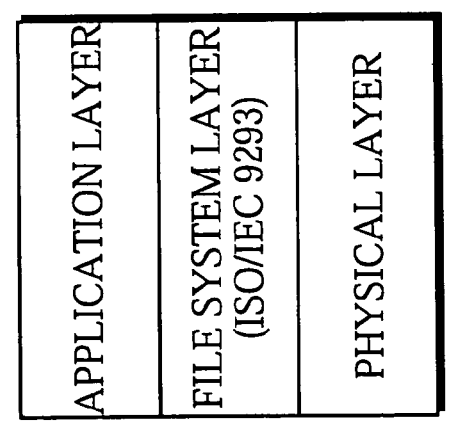
FIG. 3B shows a hierarchical structure of an SD memory card 100.

FIG. 3B shows a hierarchical structure of the SD memory card 100. As shown in the diagram, the hierarchical structure of the SD memory card 100 is formed from a physical layer that securely stores the data set forming the copyrighted material, a file system layer that is accessed based on a File Allocation Table (FAT, ISO/IEC 9293), with a cluster being the smallest unit of access, and an application layer storing encrypted data, an encryption key, plain text and a Usage Rule forming the copyrighted material.

Figure 3C:
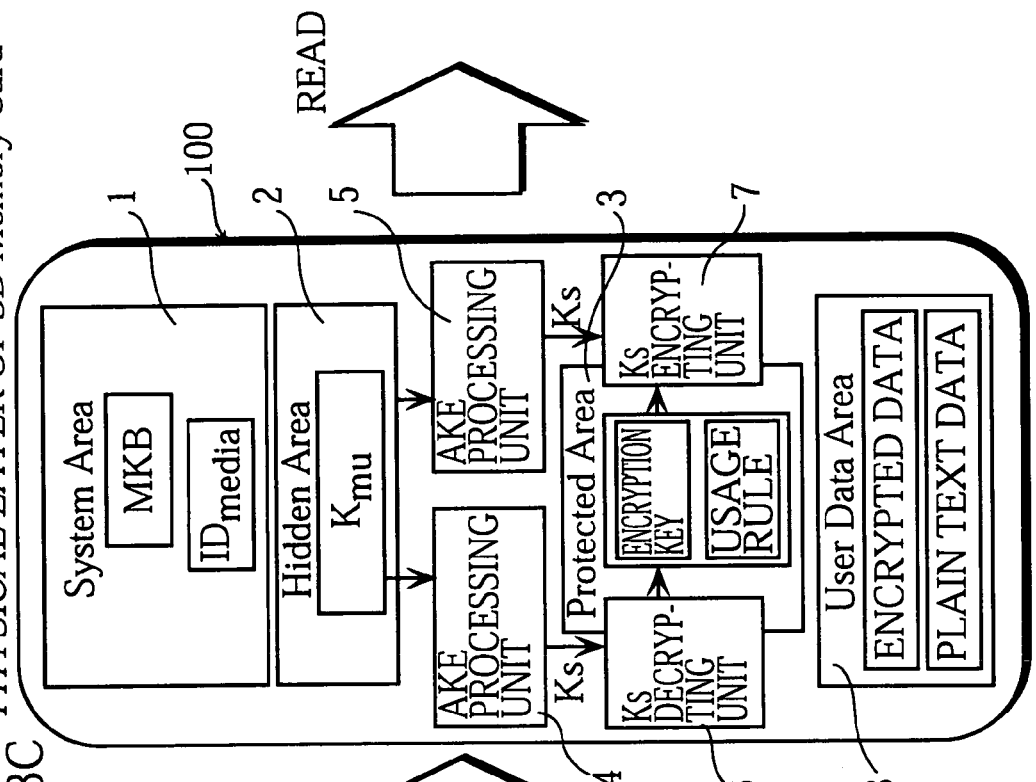
FIG. 3C shows a physical structure of the SD memory card 100.

FIG. 3C shows the structure of the physical layer of the SD memory card 100. In the drawing, the physical layer of the SD memory card 100 includes a system area 1, a hidden area 2, a protected area 3, AKE processing units 4 and 5, a Ks decrypting unit 6, a Ks encrypting unit 7, and a user data area 8.

The system area 1 is a read-only area storing a media key block (MKB) and a media ID. The MKB and media ID stored in this area cannot be overwritten. Suppose that the SD memory card 100 is connected to a device, and the MKB and media ID is read by that device. If the connected device correctly performs a specified calculation using a device key Kd held internally, it can obtain a correct encryption key Kmu.

The hidden area 2 stores the encryption key Kmu having the correct value, in other words the encryption key Kmu that should be obtained if the connected device performs correct calculation using the correct device key Kd.

The protected area 3 stores an encryption key and a Usage Rule.

The AKE (authentication and key exchange) processing units 4 and 5 perform mutual authentication between a connected device and the SD memory card 100 using the challenge-response method, verify the authenticity of the opposing device, and if the opposing device is invalid, stop processing. If the opposing device is valid, however, an encryption key (session key Ks) is shared by the device and the SD memory card 100. Authentication performed by the device connected to the SD memory card 100 has three phases. First, in a first challenge phase, the device generates a random number, encrypts the random number using the encryption key Kmu, and transmits the encrypted random number to the SD memory card 100 as a challenge value A. Then, in a first response phase, the SD memory card 100 uses the encryption key Kmu stored internally to decrypt the challenge value A, and transmits the decrypted value to the connected device as a response value B. Following this, in a first verify phase, the connected device decrypts the challenge value A held internally using its encryption key Kmu, and compares the decrypted value with the response value B transmitted from the SD memory card 100.

Authentication performed by the SD memory card 100 also has three phases. First, in a second challenge phase, the SD memory card 100 generates a random number, encrypts the random number using the encryption key Kmu, and transmits the encrypted random number to the connected device as a challenge value C. Then, in a second response phase, the connected device uses the encryption key Kmu stored internally to decrypt the challenge value C, and transmits the decrypted value to the SD memory card 100 as a response value D. Following this, in a second verify phase, the SD memory card 100 decrypts the challenge value C held internally using its encryption key Kmu, and compares the decrypted value with the response value D transmitted from the connected device.

If the connected device uses an improper encryption key Kmu to perform mutual authentication, challenge value A and response value B in the first verify phase and challenge value C and response value D in the second verify phase will be judged to be non-matching values, and mutual authentication will be stopped. If the authenticity of the opposing devices is verified, however, the AKE processing units 4 and 5 calculate an exclusive OR of challenge value A and challenge value C and obtain the session key Ks by decrypting the exclusive OR using the encryption key Kmu.

The Ks decrypting unit 6 uses the session key Ks to decrypt an encryption key and Usage Rule which has already been encrypted by session key Ks and output from the connected device. The encryption key and Usage Rule obtained by this decryption are written into the protected area 3.

The Ks encrypting unit 7 receives a command from another device connected to the SD memory card 100 instructing it to read the encryption key and the Usage Rule, encrypts the encryption key and the Usage Rule stored in the protected area 3 using the session key Ks, and then outputs the encrypted encryption key and the Usage Rule to the device that issued the command.

The user data area 8 can be accessed by a connected device regardless of whether the authenticity of that device has been verified, and stores encrypted data and plain text data. If the encryption key read from the protected area 3 has a correct value, the encrypted data stored in the user data area 8 can be correctly decrypted. Reading of data from the protected area 3 is performed together with decryption performed by the Ks decrypting unit 6 and encryption performed by the Ks encrypting unit 7. Therefore, the protected area 3 can usually only be accessed by a connected device when that device has successfully performed AKE processing.

The following is an explanation of data obtained by a device connected to the SD memory card 100, the SD memory card 100 having a data set that constitutes a copyrighted material.

FIG. 4A shows a first example, in which an incompatible device is connected to the SD memory card 100, whose protected area 3 stores only an encryption key. In this case, the encrypted data and plain text data stored in the user data area 8 can be read, but, since the protected area 3 cannot be accessed, the encryption key cannot be obtained. This situation is identical to situation (1). Even though the device is connected to the SD memory card 100, it cannot obtain playback rights and so the copyrighted material cannot be reproduced.

In a second example shown in FIG. 4B, a compatible device is connected to the SD memory card 100, whose protected area 3 stores only an encryption key. This device can read the encryption key stored in the protected area 3, together with the encrypted data and plain text data stored in the user data area 8. This means that the compatible device can obtain playback rights, and play back the copyrighted material. However, a Usage Rule is not stored in the protected area 3, so the device cannot read a Usage Rule from the SD memory card 100 and is unable to obtain the right to manage recording of the copyrighted material.

In a third example shown in FIG. 4C, a compatible device is connected to the memory card 100, whose protected area 3 stores a Usage Rule and an encryption key. The Usage Rule includes Move Control Information showing that one move is permitted, so the connected device can read a copyrighted material corresponding to the Usage Rule from the SD memory card 100 and store it on an internalized recording medium. When the Usage Rule is recorded on the internalized recording medium in the device, the copyrighted material exists both on the internal recording medium and on the SD memory card 100 and rights also exist in duplicate, so the connected device performs processing to delete the copyrighted material from the SD memory card 100. This deletion completes the transfer of both management rights and the copyrighted material from the SD memory card 100 to the connected device.

In a fourth example shown in FIG. 4D, a compatible device is connected to the SD memory card 100, whose protected area 3 stores a Usage Rule and an encryption key. The Usage Rule includes Move Control Information showing that the number of permitted moves is 0, so the Usage Rule cannot be moved, and the connected device cannot obtain management rights. In this case, the copyrighted material on the SD memory card 100 is treated as a 'master'. When the permitted number of moves is 0, this indicates that the permitted number of moves was originally 1 or more, but that the copyrighted material has been moved to a device one or more times, and the number of permitted moves decremented, until it has reached 0.

This completes the explanation of the structure of the SD memory card 100. Next, a device used in EMD is explained. Such devices may be divided into four types: distribution servers, digital terminals (first receiving apparatuses), customer devices (second receiving apparatuses) and SD-Audio players (playback apparatuses) 122 to 124. These types of device are explained in turn. A representative distribution server and digital terminals for this embodiment are shown in FIGS. 5 and 6, representative customer devices are shown in FIG. 7A, and representative playback apparatuses are shown in FIG. 7B.

Figure 5:
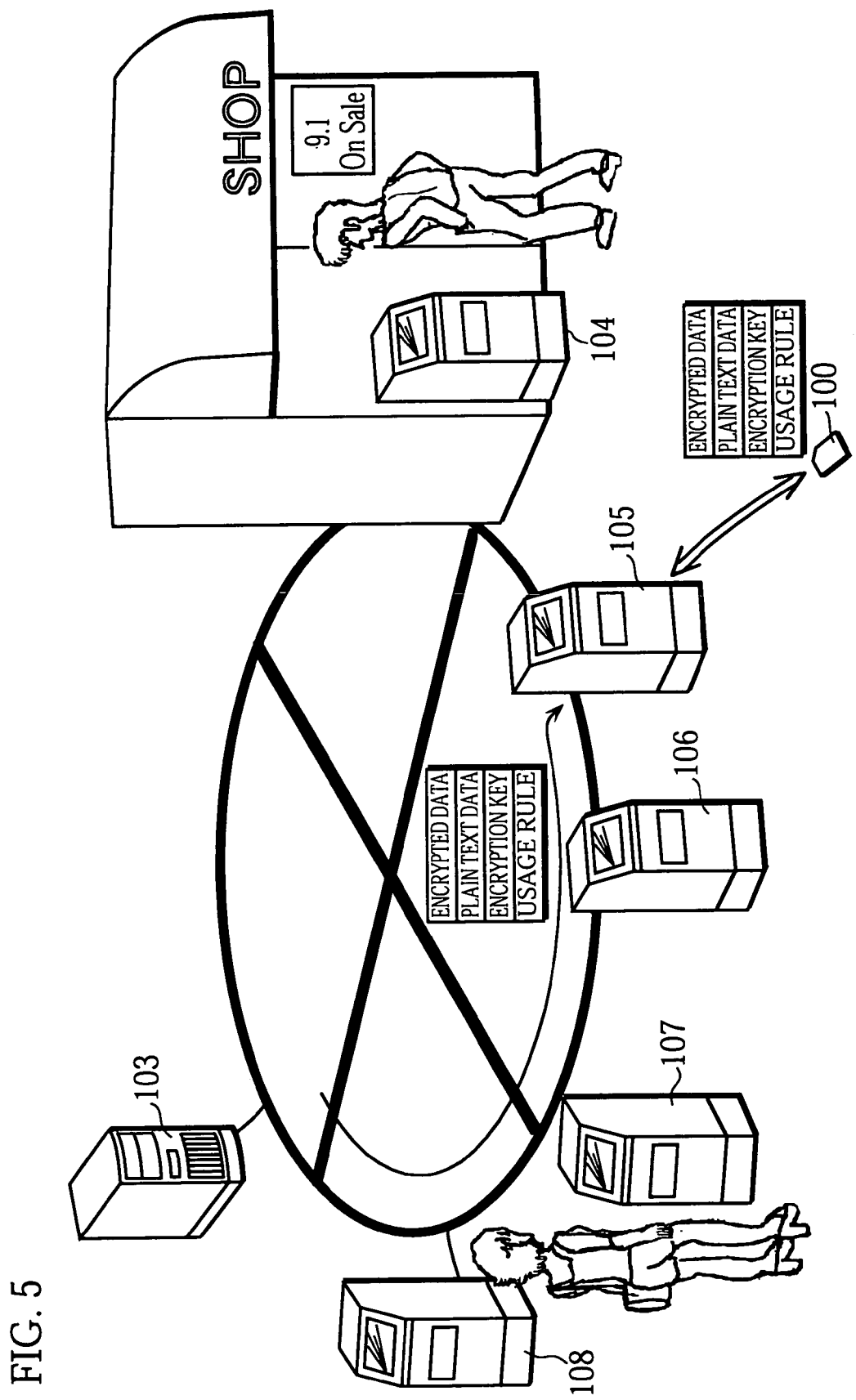
FIG. 5 shows a situation where a KIOSK terminal is installed in a station or store.

A distribution server 103 in FIG. 5 stores a data set formed from a plurality of copyrighted materials. If the purchase of any one of the copyrighted materials is requested by a digital terminal or customer device, the requested copyrighted material is transmitted to the relevant digital terminal or customer device via a network.

Figure 6B:
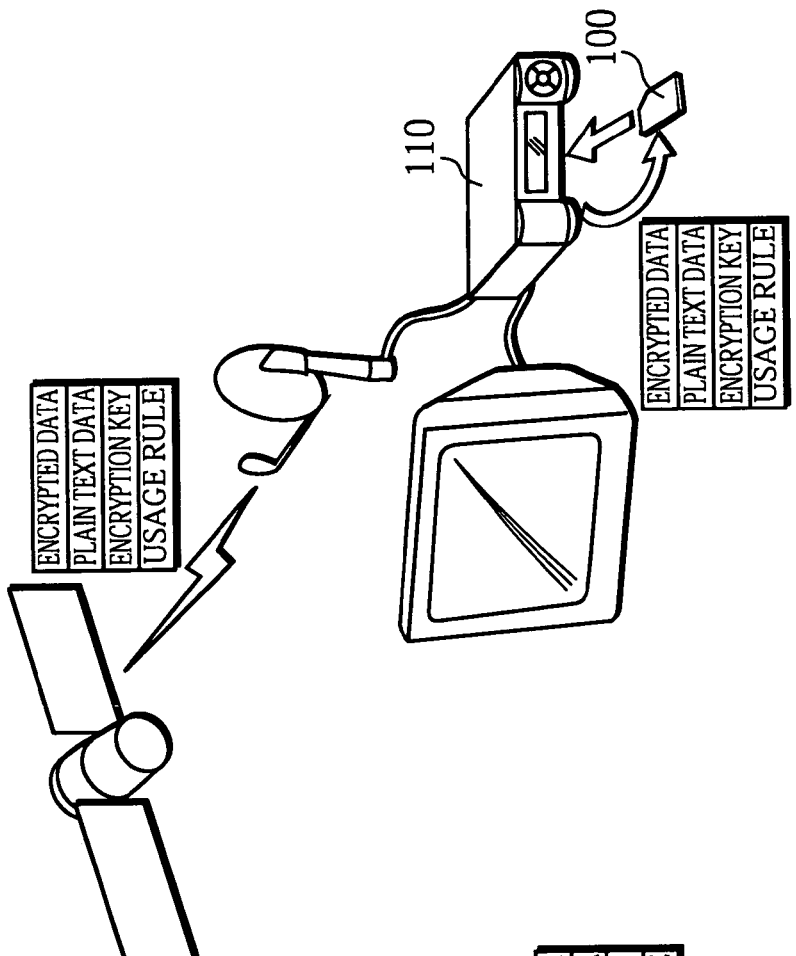
FIG. 6B shows a situation in which encrypted data, plain text data, an encryption key, and a Usage Rule forming the copyrighted material are written into the SD memory card 100 by a digital terminal 110 that is an STB.
Figure 6A:
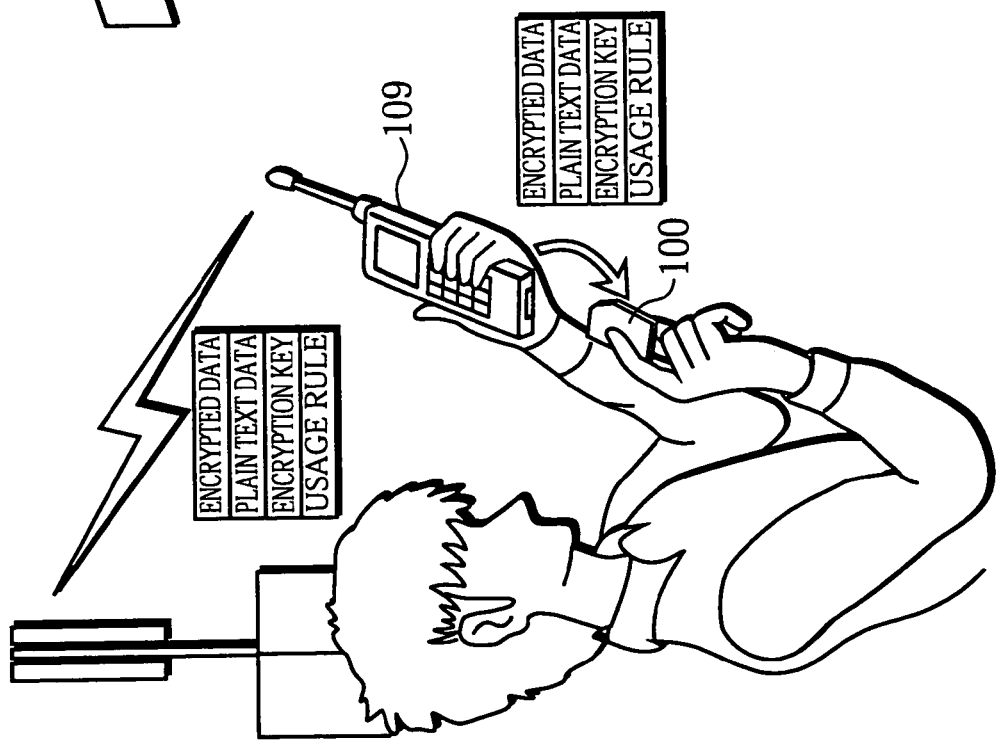
FIG. 6A shows a situation in which encrypted data forming the copyrighted material, plain text data, an encryption key, and a Usage Rule are written into the SD memory card 100 by a digital terminal 109 that is a mobile phone.
Figures 7A, 7B:
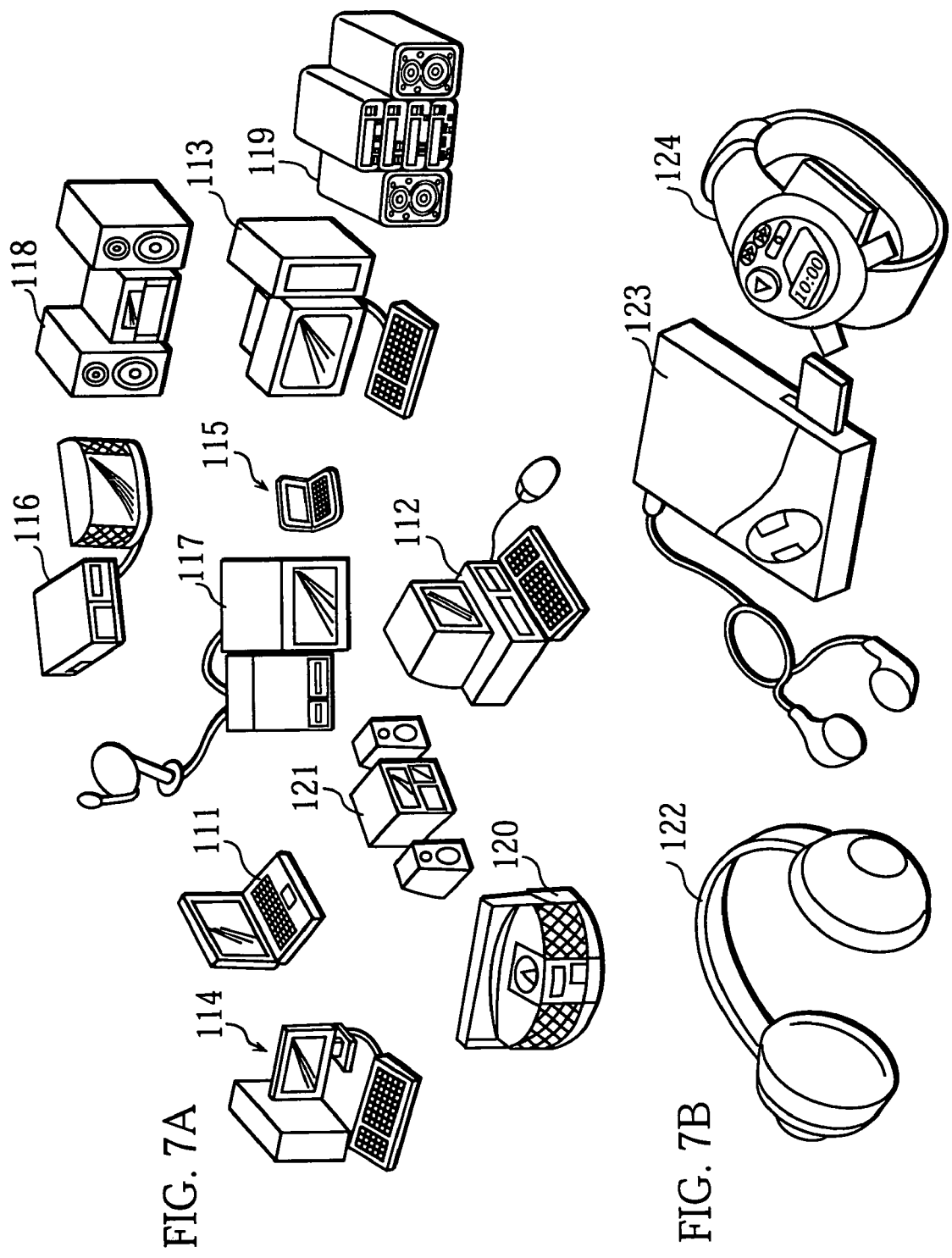
FIG. 7A shows a variety of customer devices.
FIG. 7B shows a variety of SD-Audio players.

Digital terminals 104 to 110 in FIGS. 5, 6A, and 6B are examples of a compatible device that obtains a data set forming a copyrighted material by transfer via a network from the distribution server 103, which is operated by a record company. The network may be a wired network such as ISDN (Integrated Services Digital Network) or PSTN (Public Switched Telephone Network), a satellite broadcast line, or one of the various types of wireless networks, such as a cellular system. The digital terminals 104 to 110 can be divided into KIOSK terminals 104 to 108, which are installed in stations, airports, music stores, convenience stores and the like, a mobile phone 109 that communicates via a wireless cellular system, and a set top box (STB) 110 used for receiving satellite broadcasts. FIG. 5 shows a situation in which KIOSK terminals 104 to 108 are installed in stations or stores. FIG. 6A shows a situation in which a data set forming a copyrighted material is written onto the SD memory card 100 by a digital terminal, in this case the mobile phone 109. FIG. 6B shows a situation in which a data set forming a copyrighted material is written onto the SD memory card 100 by a digital terminal, in this case the STB 110. KIOSK terminals 104 to 108 are connected to the distribution server 103 using a dedicated fiber-optic line, and obtain the data set via this dedicated line. The mobile phone 109 obtains the data set via a wireless base station and telephone exchange, and the STB 110 obtains it via a communications satellite and a fiber-optic line.

The digital terminals shown in the drawings access the distribution server 103 to present a plurality of copyrighted materials stored on a recording medium in the distribution server 103 to a user, and receive a purchase request for one of the copyrighted materials from the user. Once a purchase request for one of the copyrighted materials has been made by the user, a signal requesting transmission of the data set forming this copyrighted material is transmitted to the distribution server 103. The digital terminal receives the transmitted data set forming the copyrighted material from the distribution server 103, and saves it, before recording it on the SD memory card 100.

Customer devices 111 to 121 have an internalized recording medium known as local storage, and manage a home music library formed from copyrighted materials obtained via a network route and an SD memory route (a route that obtains copyrighted materials via the SD memory card 100), as well as performing playback and check-out of copyrighted materials recorded on the SD memory card 100 or local storage. FIG. 7A shows various types of customer devices, for example personal computers (111 to 116) and audio systems (117 to 121), and FIG. 7B shows various types of SD-Audio players used to play back contents. All of the devices shown in FIG. 7A have internalized local storage and manage a home music library. Local storage includes a protected area and user data area, and is a recording medium that securely stores data sets formed of copyrighted materials, as shown in the examples of FIG. 4. The following is an explanation of the functions performed by such consumer devices, taking a personal computer as an example.

Figure 8A:
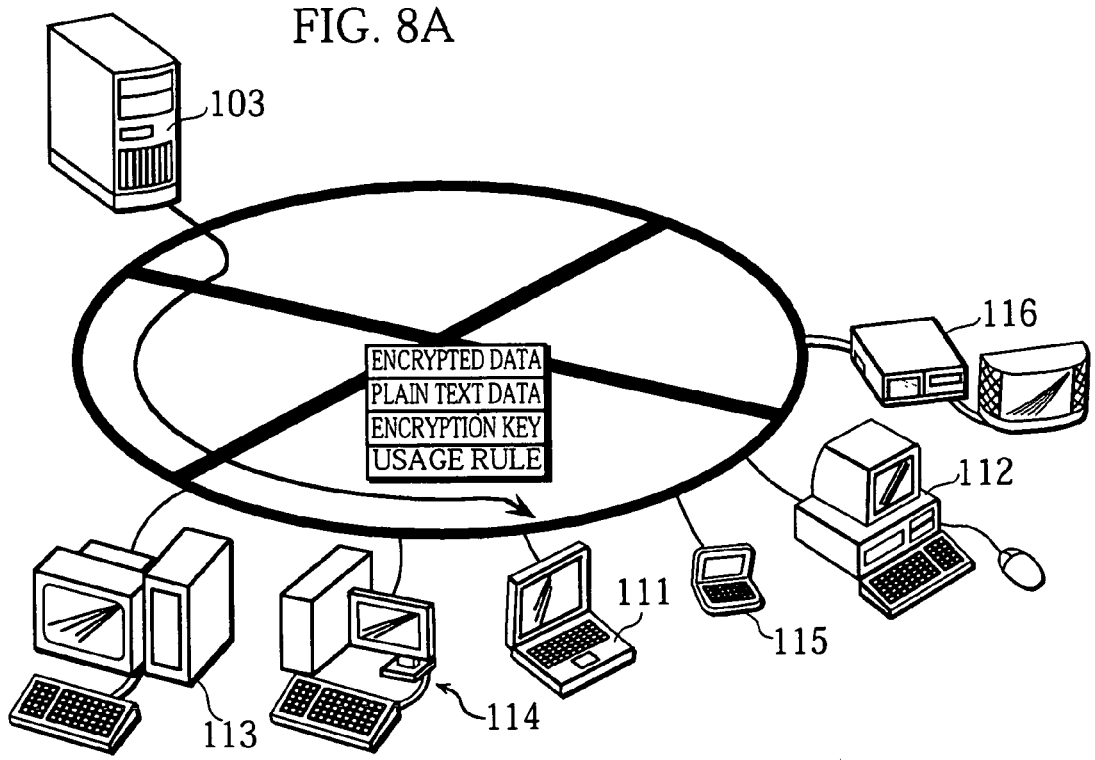
FIG. 8A shows a server computer 103 and customer devices belonging to a plurality of users (personal computers 111 to 116) connected to a network.

First, the method by which customer devices obtain copyrighted materials using the network route is explained. FIG. 8A shows the distribution server 103, and customer devices belonging to a plurality of users (personal computers 111 to 116), all connected to a network. Customer device 111, like a digital terminal, can access the distribution server 103 via the network, and obtain one or more of a plurality of copyrighted materials, accumulating the obtained copyrighted materials in local storage.

Figure 8B:
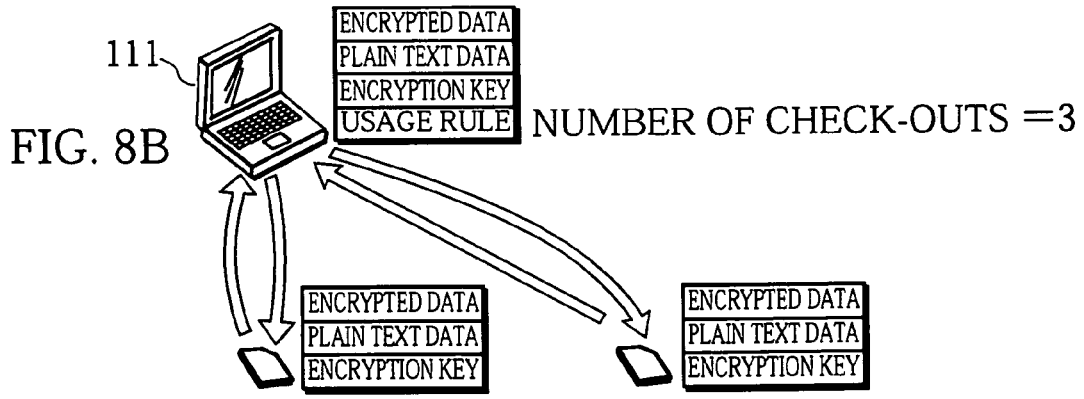
FIGS. 8B and 8C show a situation in which the personal computer 111 performs check-out and check-in three times.
Figure 8C:
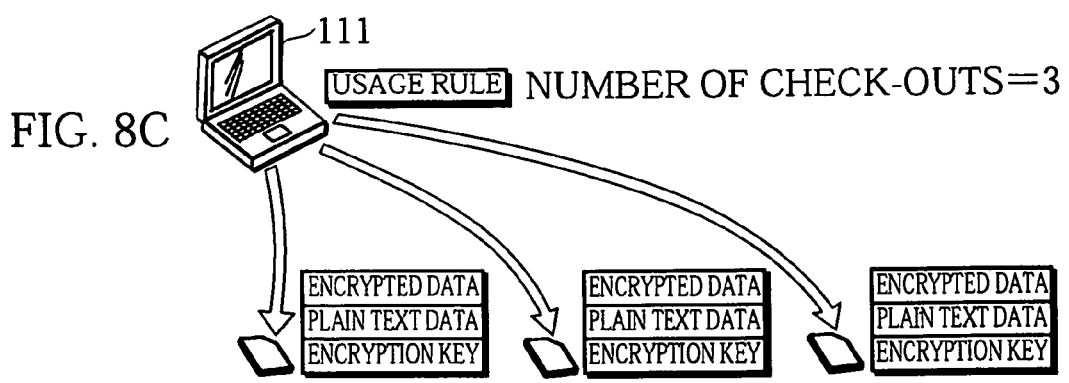

A home music library can be constructed in local storage by repeatedly obtaining copyrighted materials via the network, and check-out and check-in of each copyrighted material can be managed based on the corresponding Usage Rule. FIGS. 8B and 8C show a situation in which the customer device 111 can perform check-out and check-in up to three times. In other words, the Usage Rule shows that check-out is permitted, and if an upper limit is set on the number of check-outs, check-out can be performed until this limit is reached. This process is performed as follows. The SD memory card 100 is connected to the customer device 111, and if a check-out instruction is issued, encrypted data and plain text data are written into the user data area 8 on the SD memory card 100. An encryption key corresponding to the copyrighted material is also written into the protected area 3. Then a number of check-outs is decremented. If the data set forming the copyrighted material is recorded onto three SD memory cards 100, thereby causing the number of check-outs to be decremented to 0, the customer device 111 sets the encryption key, encrypted data, and plain text data stored in local storage in a state that does not permit check-out, as shown in FIG. 8C.

Here, performing check-out enables a data set forming a copyrighted material to be recorded on the SD memory card 100, thereby enabling a compatible device to play back the copyrighted material when connected to the SD memory card 100, but not to copy it to another recording medium. The reason for this is that the compatible device does not have a Usage Rule, and so cannot read the encryption key from the SD memory card 100 and record it onto its own internalized recording medium or another recording medium. If an incompatible device attempts to read and record a data set from the SD memory card 100, such a device cannot access the protected area 3 (see FIG. 4A), and so is unable to obtain the encryption key and the Usage Rule. Therefore, in actual fact, the copyrighted material recorded on the SD memory card 100 cannot be recorded onto another recording medium without the Usage Rule. This means that a first generation copy from the customer device onto the SD memory card 100 is permitted, but a second generation copy from the SD memory card 100 onto another recording medium is not permitted. By preventing second generation copies, unlimited copying is prohibited.

Figure 9:
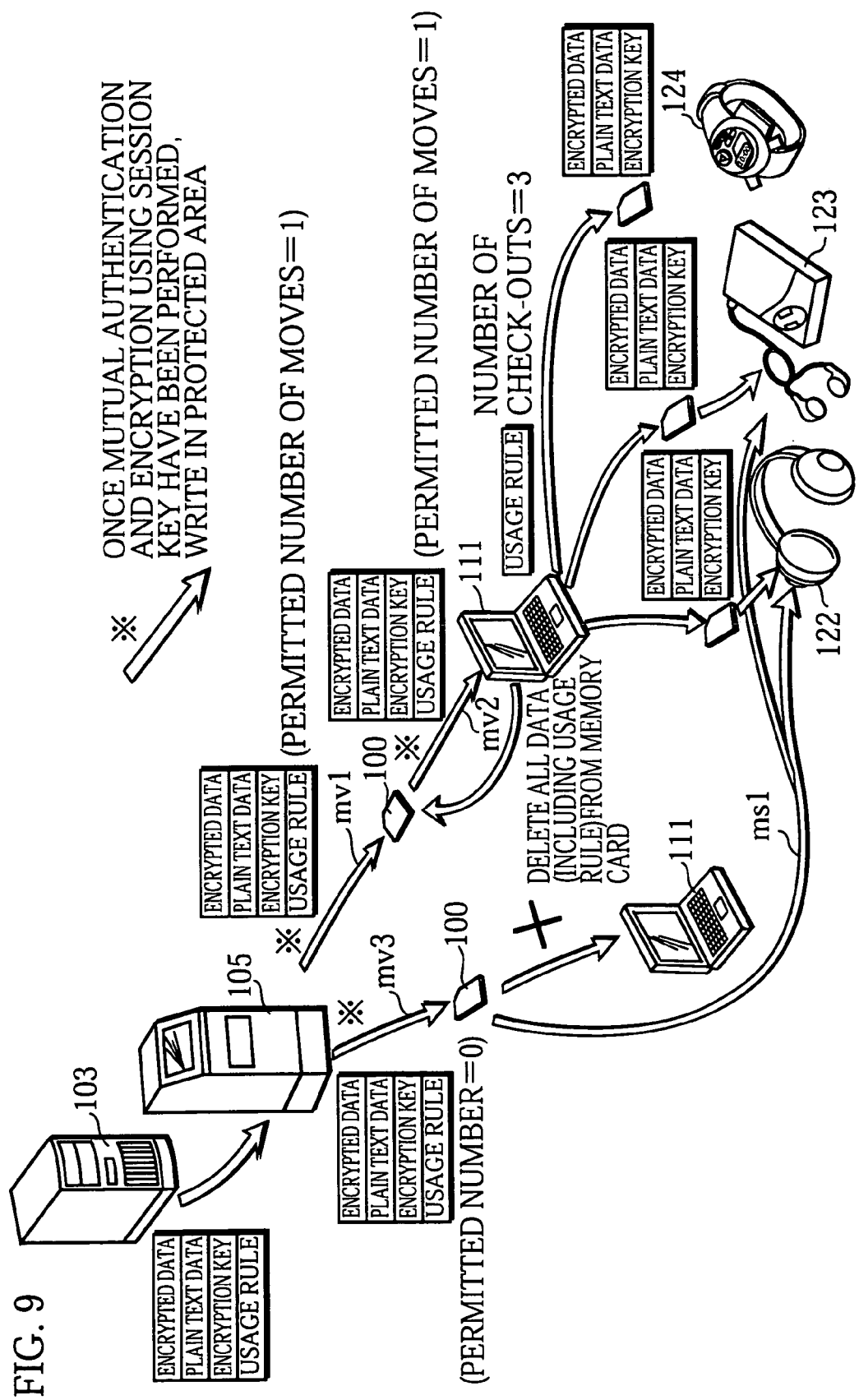
FIG. 9 shows a distribution server included in a track distribution system related to the embodiments, a plurality of devices, and a playback apparatus.

Next, the method by which customer devices obtain copyrighted material via the SD memory card route is explained. FIG. 9 shows a distribution server 103 included in a track distribution system relating to this embodiment, and a plurality of devices and playback apparatuses, when the customer device 111 obtains the copyrighted material via the SD memory card route. Processing performed by the SD memory card 100 to obtain the copyrighted materials is as follows. When, as shown by arrow mv1, the Usage Rule of the copyrighted material stored on the SD memory card 100 includes Move Control Information showing that at least one move is permitted, the customer device 111 reads the data set forming the copyrighted material from the SD memory card 100 as shown by the arrow mv2, and records the read copyrighted material in internalized local storage. Following this, the data set forming the copyrighted material is deleted from the SD memory card 100. By fetching the copyrighted material from the SD memory card 100 and then deleting it, the same conditions are created within the customer device 111 as when the copyrighted material was obtained by the network route. After this, the customer device can perform check-out based on information in the Usage Rule. On the other hand, if the Usage Rule of the copyrighted material recorded on the SD memory card 100 as shown by the arrow mv3 includes Move Control Information showing that moves can be performed 0 times, the customer device 111 cannot read the data set forming the copyrighted material from the SD memory card 100. The SD memory card 100 can be inserted directly into SD-Audio players 122, 123 or 124 bypassing the customer device, as shown by the arrow ms1, and played back. Copyrighted materials whose Usage Rules cannot be moved may be sold at a lower price.

When the permitted number of moves in the Move Control Information has been set at 1 by the distribution server 103 in FIG. 9, the Usage Rule is moved between recording media with the permitted number of moves in the Move Control Information being reduced in the following way.

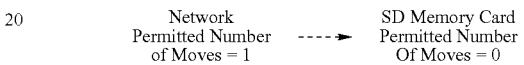

When the permitted number of moves in the Move Control Information has been set at 2 by the distribution server 103, the Usage Rule is moved between recording media with the permitted number of moves in the Move Control Information being reduced in the following way.

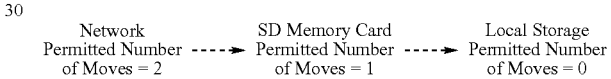

When a customer device obtains, via a network, a Usage Rule with a permitted number of moves set at 2 by the distribution server 103, the Usage Rule is moved between recording media (SD memory card 100, local storage) with the permitted number of moves in the Move Control Information being reduced in the following way.

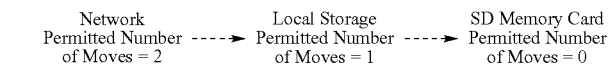

When a Usage Rule is obtained via a network with the number of permitted moves set at 3, the Usage Rule can be moved from the customer device to other local storage. Copyrighted material can be moved via the SD memory card 100, but note that moving copyrighted material directly from one local storage location to another is not permitted.

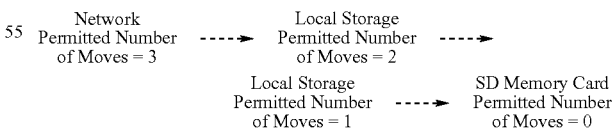

SD-Audio players 122 to 124 perform check-out to play back, using an encryption key, encrypted data recorded on a portable recording medium. SD-Audio player 122 is a set of headphones, SD-Audio player 123 is a portable device, and SD-Audio player 124 is a wristband device. Users can use such devices to play back the encrypted data on the way to work or school. In one example in FIG. 9, if a data set forming a copyrighted material is moved to the customer device 111, the customer device 111 checks out the encrypted data and encryption key based on the details written in the Usage Rule, to, for example, three portable recording media. If the encrypted data and encryption key are checked out to three portable recording media in this way, the SD-Audio players 122 to 124 can reproduce the data that has been checked out.

This completes the explanation of the devices used in EMD. Next, the data set forming the copyrighted material will be explained in detail. First, the format in which copyrighted materials are transferred from the distribution server 103 to a digital terminal, in other words the data structure of the copyrighted material at distribution, is explained. Copyrighted materials in units such as songs are distributed in units called packages, and collections of copyrighted materials such as music albums in units called titles. The data structure of packages and titles is explained with reference to the example shown in FIG. 10. In the drawing, a title is formed from one or more packages #1 to #N. Each package is a distributable file, and includes a header, a Navigation Structure, a plurality of Content Elements (CEL#1, #2, #3 and so on) and a Default Offer.

The Navigation Structure is data showing the playback control procedure, indicating how each Content Element is to be played back. In the example in FIG. 10, the Navigation Structure indicates that the picture object of CEL#3 is to be displayed when CEL#1 is played back.

Figure 10:
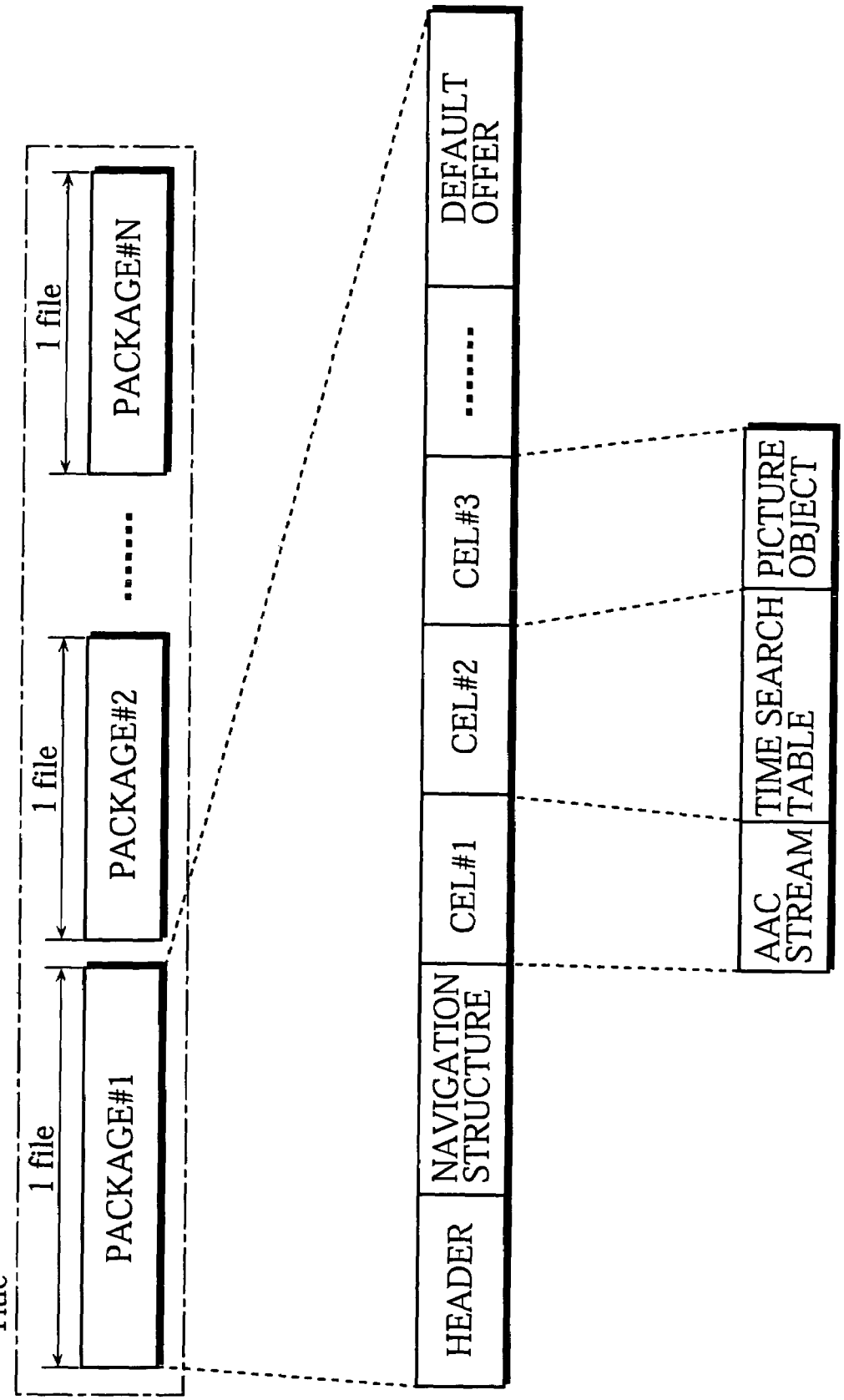
FIG. 10 shows a data structure of title and package for copyrighted data when distribution is performed.

Content Elements (CELs) are information elements which form the copyrighted material, allocated in terms of media type. In this case the copyrighted material is a song, and includes audio, a promotion picture that is to be displayed when the song is played back and the like. A package stores such data as different CELs according to media type. The third level in FIG. 10 shows example CELs. CEL#1 is MPEG-AAC stream data obtained by encoding the sound of a certain song, CEL#2 is a time search table showing data intervals in the MPEG-AAC stream of CEL#1 when that stream is accessed at two-second intervals, and CEL#3 is JPEG still picture data to be displayed as a background image when CEL#1 is played back. Thus, it can be seen that information for each media type relating to a song is stored as an individual CEL inside a package. Of this data, the AAC stream data and the still picture data are encrypted to obtain copyright protection, and stored in the package as encrypted data.

The 'Default Offer' is information showing commercial requirements to be applied when the copyrighted material is sold, and includes a retail price and an encryption key for decrypting encrypted data included in the copyrighted material.

Figure 11:
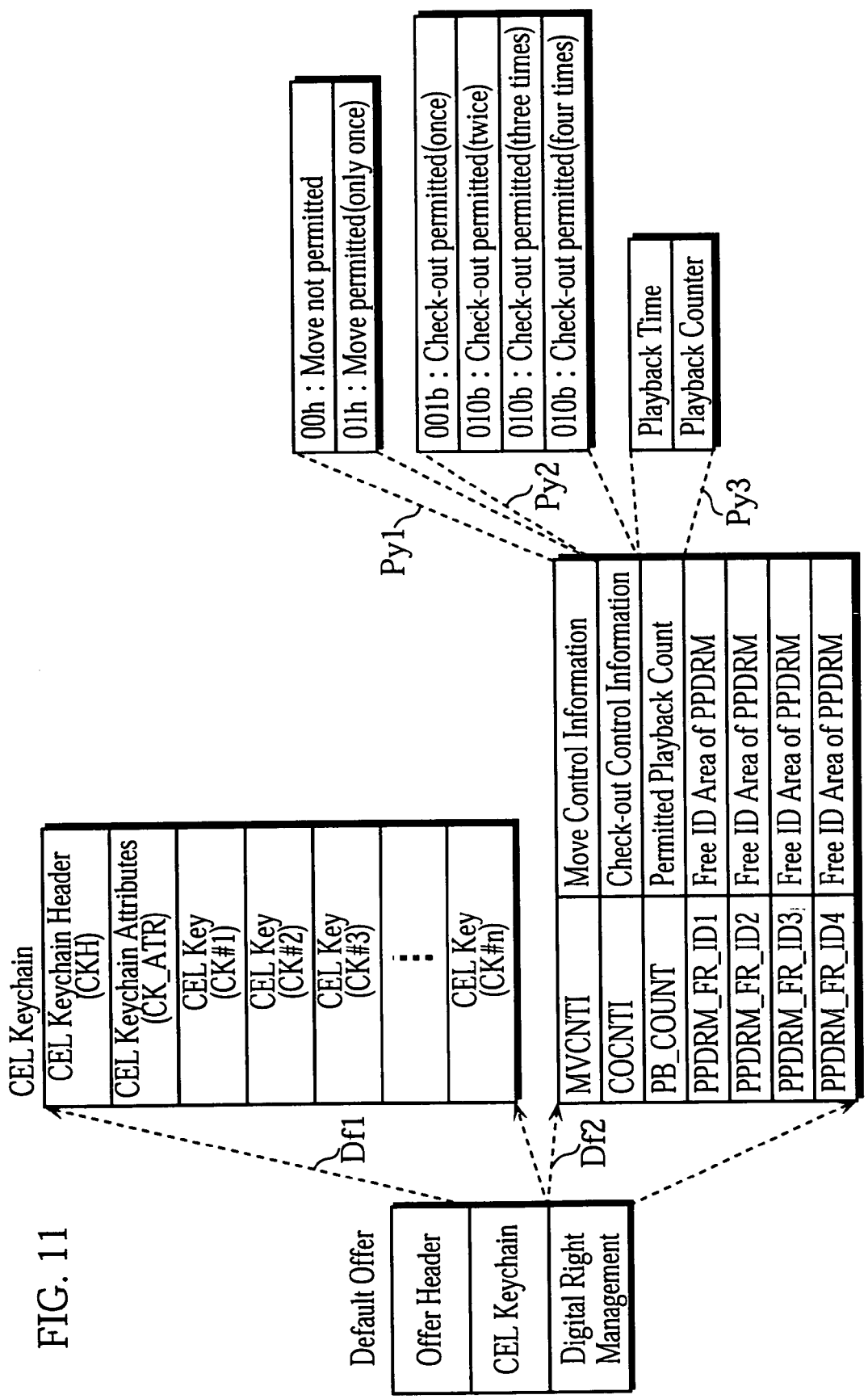
FIG. 11 shows a hierarchical data structure of a Default Offer.

FIG. 11 shows the hierarchical data structure of the Default Offer. In the drawing, the Default Offer includes an 'Offer Header', a 'CEL Keychain', and a 'Digital Right Management' (DRM), which is a Usage Rule indicating the rights to control recording of the copyrighted material. The internal structure of the CEL Keychain is shown within the broken lines Df1, and includes a CEL Keychain Header (CKH), an attribute for the CEL Keychain CK_ATR, and CEL Keys (CKs) #1, #2, #3, #4 to #n, each used to decrypt CELs included in a same package.

The internal structure of the DRM is shown within the broken lines Df2. The DRM includes 'Move Control Information' (MVCNTI), 'Check-Out Control Information' (COCNTI), 'Permitted Playback Count' (PB COUNT), and contents distributer IDs 'PPDRM FR ID1' to 'PPDRM FR ID4'. Move Control Information indicates whether a move from the SD memory card 100 to local storage is permitted when the copyrighted material is already recorded on the SD memory card 100. The Check-Out Control Information indicates the number of times check-out by the customer device is permitted when the copyrighted material is moved to local storage.

The Permitted Playback Count indicates the conditions under which playback of the copyrighted material is permitted.

The detailed setting of the Move Control Information is shown between broken lines py1. A setting of 00h indicates that a move from the SD memory card 100 to local storage is not permitted, while a setting of 01h indicates that one move from the SD memory card 100 to local storage is permitted. The digital terminal that received the package decrements the number of permitted moves shown by the Move Control Information by 1, and then records the decremented information on the SD memory card 100 by the digital terminal.

The detailed setting of the Check-Out Control Information is shown between the broken lines py2. A setting of 001 indicates that check-out of the copyrighted material is permitted only once (to only one recording medium), a setting of 002 indicates that check-out of the copyrighted material is permitted twice (to two recording media), and settings of 3 and 4 indicate that check-out is permitted to three and four recording media respectively.

The detailed setting of PB_COUNT is shown between the broken lines py3. PB_COUNT includes a Playback Time indicating the number of seconds counted during one playback of the copyrighted material, and a Playback Counter indicating the number of times that playback of the copyrighted material is permitted.

Next, the data structure into which the data set forming the copyrighted material is converted when the copyrighted material is recorded onto the SD memory card 100 is explained. When the copyrighted material is recorded onto the SD memory card 100, units such as songs are converted to a track format. A track includes an audio object (AOB) formed from encrypted audio data, a picture object (POB) formed from encrypted picture data, and Track Information (TKI) for controlling track playback. All data forming the copyrighted material is managed in track units, regardless of type.

Figure 12:
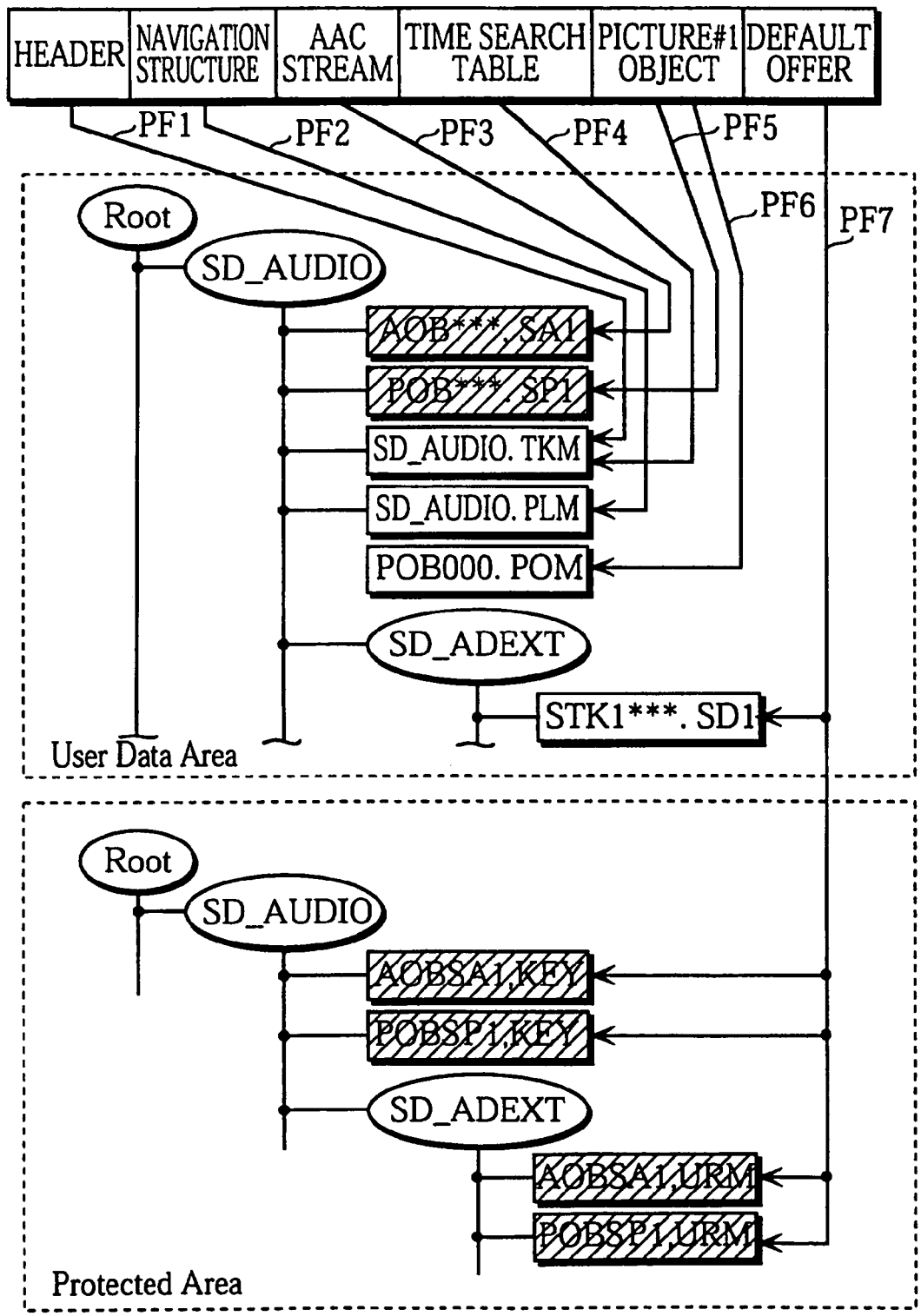
FIG. 12 shows files and directories formed to record a data set for a copyrighted material.

Collections of copyrighted materials such as music albums are converted into a format known as a track sequence when recorded onto the SD memory card 100. A track sequence includes a plurality of tracks and a Playlist defining the order in which the tracks are to be played. A data structure for managing the copyrighted material on the SD memory card 100 as tracks and a track sequence is shown in FIG. 12. FIG. 12 shows files and directories formed in order to record the data set forming the copyrighted material. In the drawing, arrows PF1 to PF7 indicate correspondences between each piece of data included in a package and a file in the application layer.

The user data area 8 in FIG. 12 contains three directories: Root, SD_AUDIO, and SD_ADEXT. The SD_AUDIO directory stores data compliant with the SD-Audio Ver1.0 standard, and the SD_ADEXT directory data unique to the SD-Audio Ver1.1 standard. As a result, devices compliant with the SD-Audio Ver1.0 standard can access the SD_AUDIO directory, but not the SD_ADEXT directory, while devices compliant with the SD-Audio Ver1.1 standard can access both the SD_AUDIO and SD_ADEXT directories. Note that the asterisks in the drawing represent integers between 001 and 999.

The following explanation describes each of the files in the SD_AUDIO directory in turn. As shown in FIG. 12, the SD_AUDIO directory includes five types of file: 'AOB*.SA1', 'POB*.SP1', 'SD_AUDIO.TKM', 'SD_AUDIO.PLM', and 'POB000.POM'.

'AOB***.SA1' are files storing the AAC stream data from the plurality of cells included in a package as AOBs. The extension 'SA' is an abbreviation of Secure Audio, and indicates that the contents of a file require copyright protection.

Figure 13:
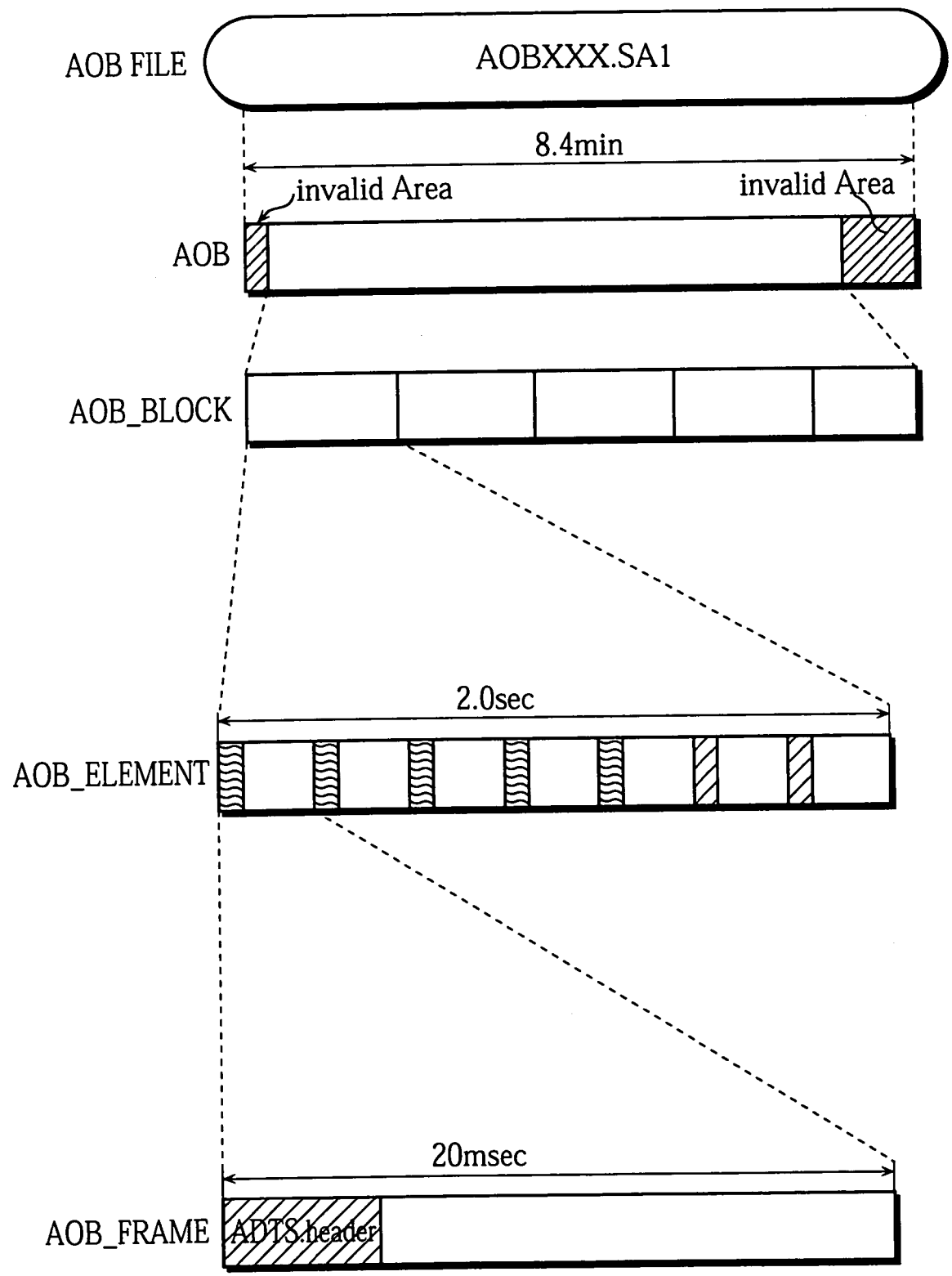
FIG. 13 shows a hierarchical structure of an AOB file.

The following is an explanation of the internal structure of an AOB file. FIG. 13 shows a hierarchical data structure of an AOB file. In the drawing, the first level shows an AOB file, and the second level shows an AOB. The third level shows an AOB_BLOCK, the fourth level shows an AOB_ELEMENT, and the fifth level shows an AOB_FRAME.

The 'AOB_FRAME' in the fifth level of FIG. 13 is the smallest unit making up the AOB, and is a piece of variable-length data with a playback time of approximately 20 milliseconds.

The 'AOB_ELEMENT' in the fourth level is a piece of variable-length data with a playback time of approximately 2 seconds, whose length is shown in the time search table.

The 'AOB_BLOCK' in the third level is the valid data of the AOB excluding any invalid areas which may exist at the start and end of the AOB, and is specified by BIT in the TKI.

The AOB in the second level is a piece of data with a playback-time of no more than 8.4 mins. The reason for limiting the playback time of an AOB to 8.4 mins is that the time search table is restricted to a size of no more than 504 bytes, due to the fact that the number of AOB_ELEMENTs included in an AOB is limited. The following describes in detail why limiting the playback period restricts the size of the time search table.

When a playback apparatus performs a forward or backward search, the playback apparatus skips the reading of two seconds of audio data and then plays back 240 milliseconds. When skipping two seconds of data, the read addresses of data at two second intervals can be written into the time search table, and referred to by the playback apparatus when a forward or backward search is requested. The data size of audio data with a playback time of two seconds depends on the bitrate used when playing back the audio data. As stated above, a bitrate in the range of 16 kbps to 144 kbps is used, so that the amount of data played back in two seconds will be between 4 KB (=16 kbps×2/8) and 36 KB (=144 kbps× 2/8).

Since the amount of data played back in two seconds will be between 4 KB and 36 KB, the data length of each entry in the time search table for recording the data length of audio data needs to be two bytes (=16 bits). This is because a 16 bit value is capable of expressing a number of between 0 KB and 64 KB. On the other hand, if the total data size of the time search table needs to be restricted to 504 bytes (this being the size of the TKTMSRT described later), for example, the maximum number of entries in the time search table can be calculated as 504/2=252. Since an entry is provided every two seconds, the playback time corresponding to this maximum of 252 entries is 504 seconds (=2s× 252), or, in other words, 8 minutes and 24 seconds (=8.4 minutes). As a result, setting the maximum playback period for an AOB_BLOCK at 8.4 minutes limits the data size of the time search table to 504 bytes.

Figure 14:
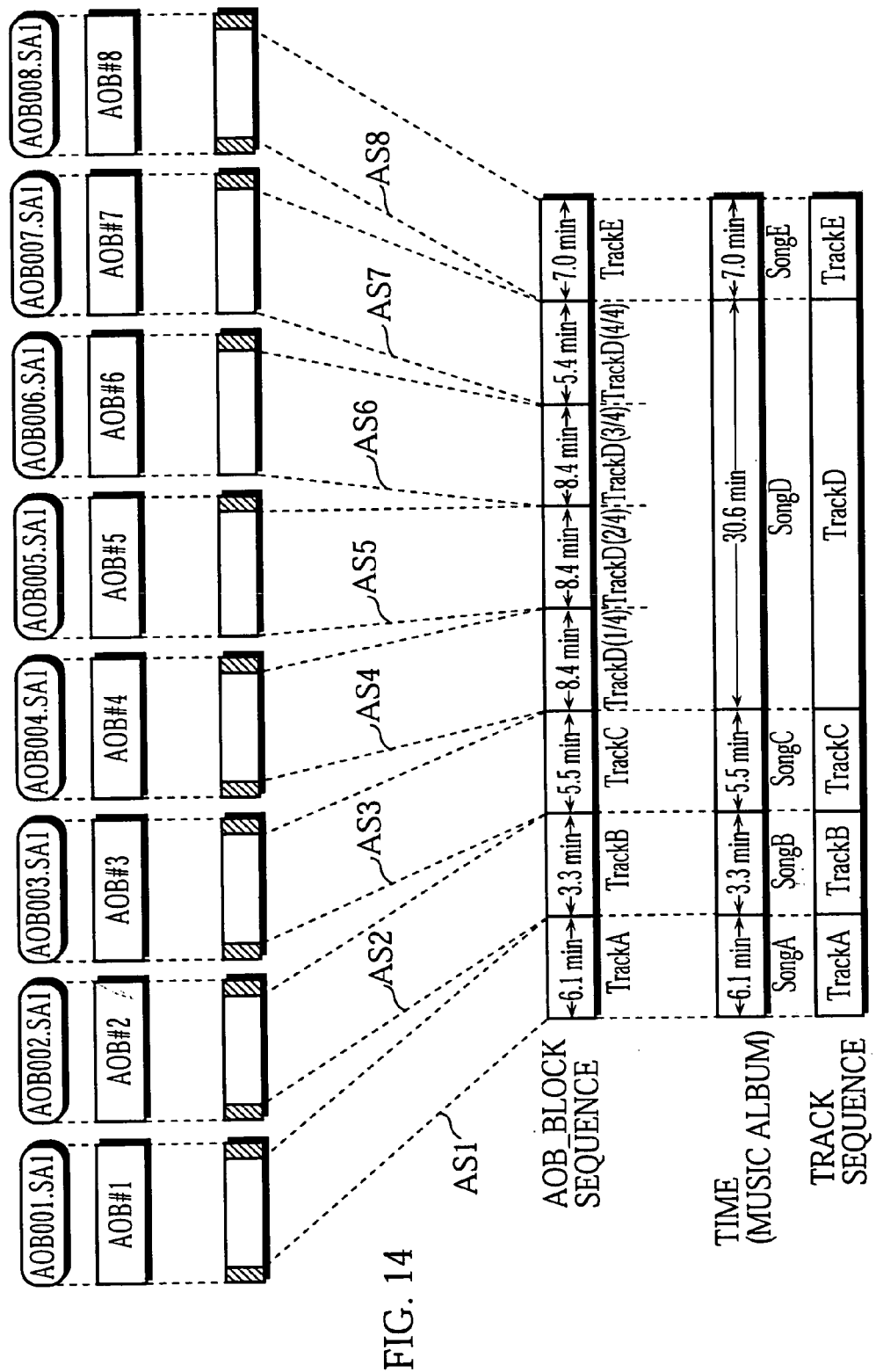
FIG. 14 shows playback contents when each AOB and AOB block recorded in an AOB file is played back in sequence.

FIG. 14 shows the playback content when the AOBs and AOB_BLOCKs in the AOB file are successively read. The first level in FIG. 14 shows the eight AOB files in the user data area 8, while the second level shows the eight AOBs recorded in these AOB files. The third level shows the eight AOB_BLOCKS included in these AOBs.

The fifth level shows a title made up of five packages. The five packages are the five songs Song A, Song B, Song C, Song D, and Song E. The broken lines AS1 to AS8 show the correspondence between the AOB_BLOCKs and the parts into which the album is divided, so that the fourth level in FIG. 14 shows the units used to divide the album shown on the fifth level.

Figure 15:
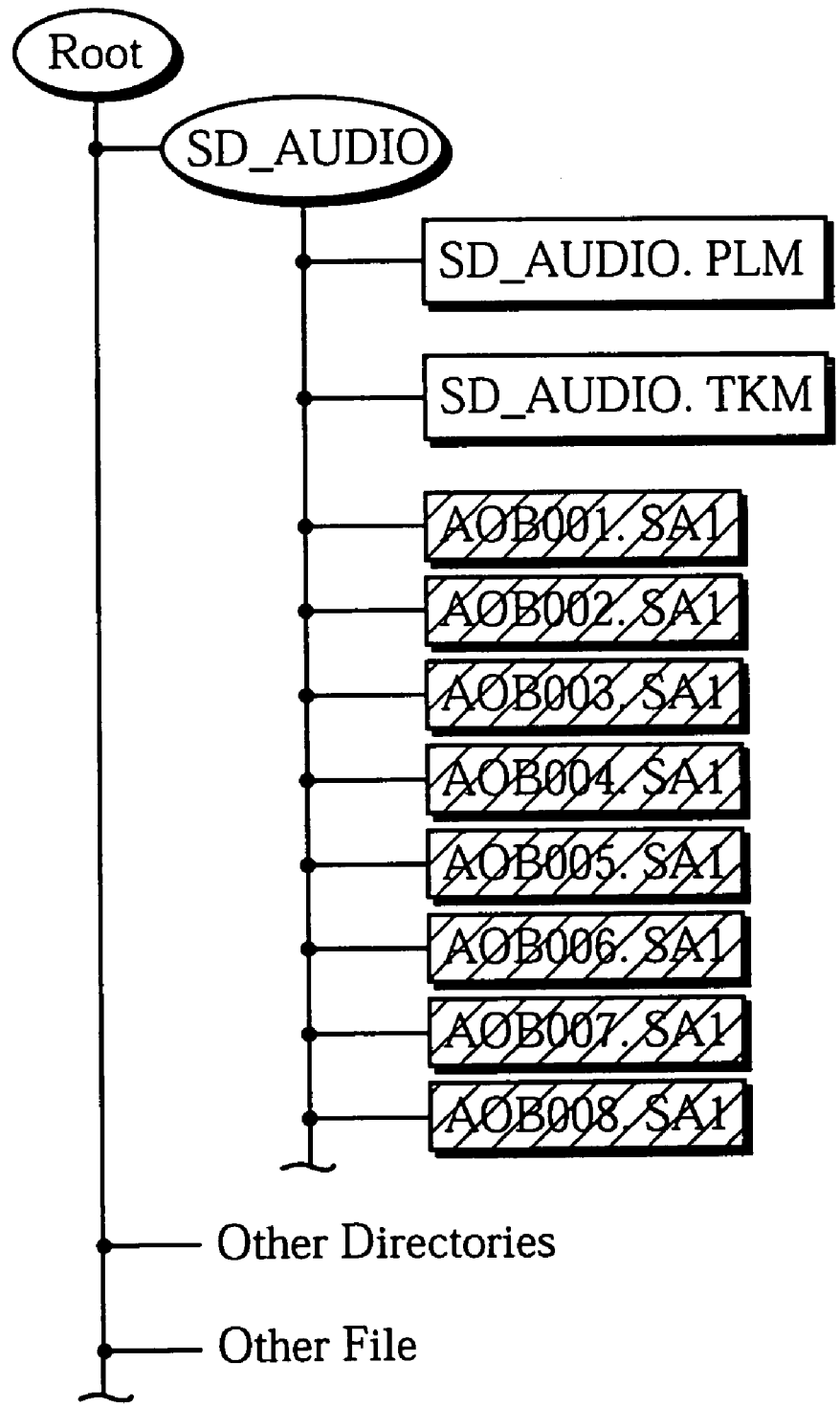
FIG. 15 shows eight AOB files stored in a title (music album) shown in FIG. 14.

AOB#4 has a playback time of 8.4 minutes and is the first (or 'head') part of the Song D that has a playback time of 30.6 minutes. The AOB_BLOCKs included in AOB#5 and AOB#6 are middle parts of the Song D and also have playback periods of 8.4 minutes. The AOB_BLOCK included in AOB#7 is the end part of the Song D and has a playback period of 5.4 minutes. In this way, a song that has a total playback period of 30.6 minutes is divided into (8.4+8.4+8.4+5.4-minute) parts that are each included in a different AOB. As can be seen from FIG. 14, the AOB included in each AOB file is subjected to a maximum playback period of 8.4 minutes. FIG. 15 shows the eight AOB files stored in the title (album) shown in FIG. 14.

'POB*.JPG' and 'POB*.SP1' are files storing still picture data. The difference between the two types of file lies in the area of copyright protection. While a file POB*.JPG simply stores still picture data in JPEG (Joint Photographics Experts Group) format, a file POB*.SP1 stores data that is encrypted to protect the copyright of the still picture (the extension SP1 stands for Secure Picture, indicating that copyright protection is required).

The file 'SD_AUDIO.TKM' contains data that has inherited the content of the package header, Navigation Structure, and time search table, and includes a Track Manager.

Figures 16A, 16B:
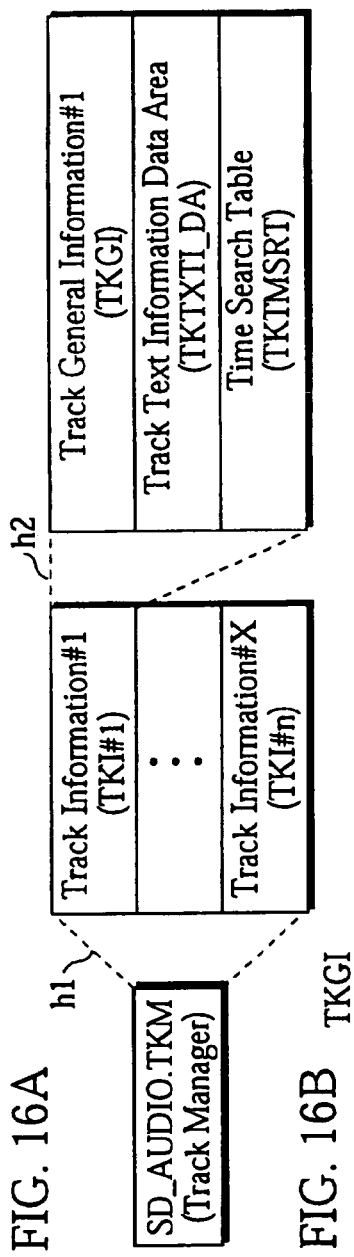
FIG. 16A shows a detailed hierarchical structure of a Track Manager.
FIG. 16B shows a detailed structure of a TKGI.

FIG. 16A shows a detailed hierarchical structure of the Track Manager. In other words, logical formats positioned on the right side of the drawing show the structure of logical formats positioned to their left in the drawing in more detail. Broken lines are used to indicate clearly which part of the logical format on the left side is shown in more detail by the logical format on the right side. If the structure of the Track Manager represented in this way in FIG. 16A is referred to, it can be seen that it is formed from n pieces of Track Information (abbreviated to TKI), #1 to #n, as shown by the broken lines h1. TKIs are information used to manage AOBs recorded in AOB files as tracks, and one TKI corresponds to each AOB file.

Referring to FIG. 16A, it can be seen that each TKI, as shown by the broken lines h2, includes Track_General Information (TKGI), and a Track_Text_Information_Data_Area (TKTXTI_DA) recording text information unique to the TKI, such as an artist name, an album name, an arranger name, and a producer name, and a Track_Time_Search_Table (TKTMSRT) in which the playback time is restricted to 8.4 minutes.

Figure 17:
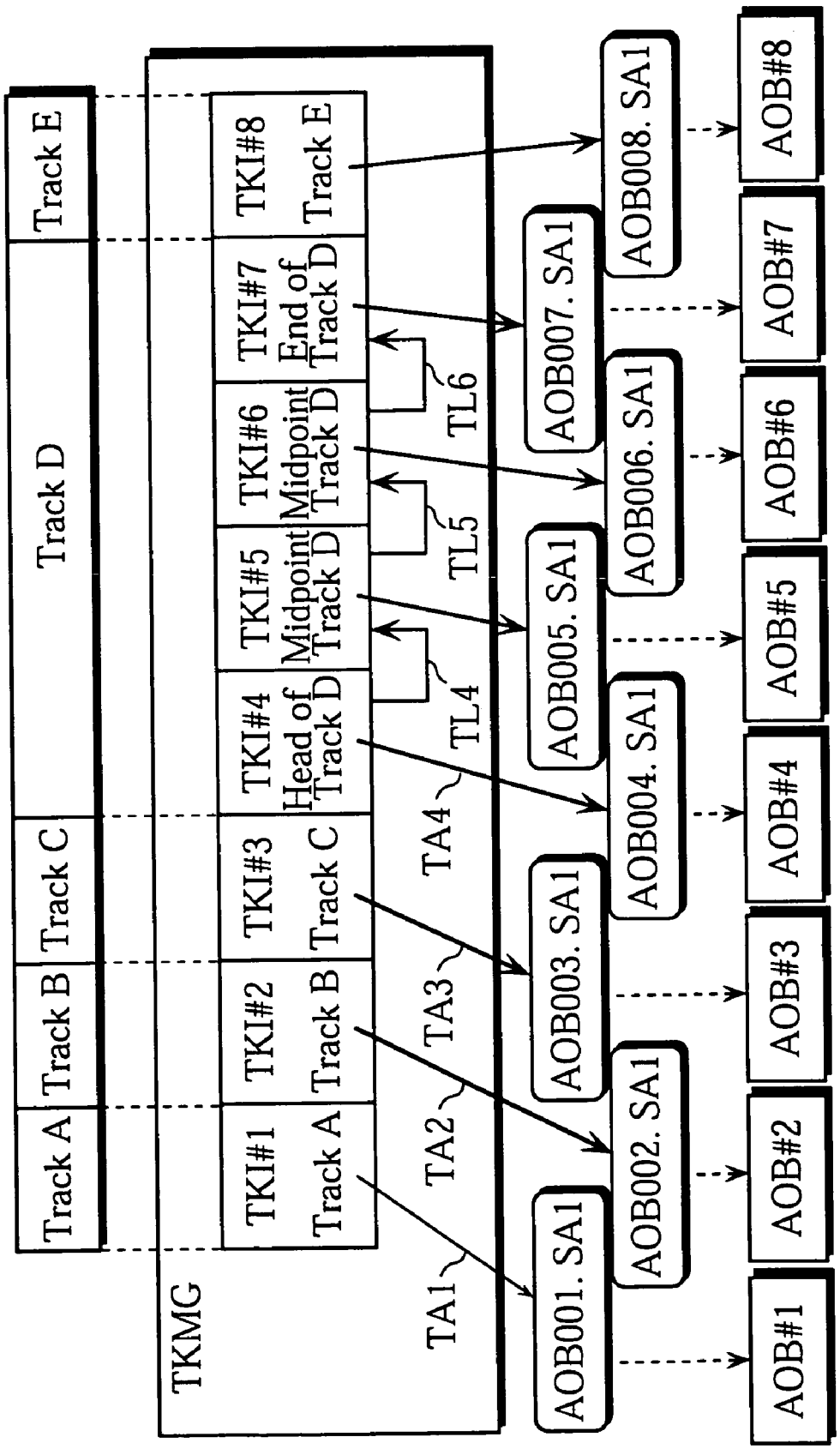
FIG. 17 shows the mutual relationship between TKIs and the AOB files and AOBs shown in FIG. 14.

FIG. 17 shows how the TKIs in FIG. 16 correspond to the AOB files and AOBs in FIG. 14. The boxes on the first level in FIG. 17 show a sequence of tracks Track A to Track E, the large frame on the second level shows the Track Manager, while the third and fourth levels show the eight AOB files given in FIG. 14. The eight AOB files record the eight AOBs shown in FIG. 16, and form a music album including Track A, Track B, Track C, Track D, and Track E. The second level shows the eight TKIs. The numbers '1', to '8' assigned to each TKI are the serial numbers used to identify each TKI, with each TKI corresponding to the AOB file that has been given the same serial number, 001,002, and so on. With this in mind, it can be seen from FIG. 17 that TKI#1 corresponds to the file 'AOB001.SA1', that TKI#2 corresponds to the file 'AOB002.SA1', TKI#3 corresponds to the file 'AOB003.SA1', and TKI#4 corresponds to the file 'AOB004.SA1'. The correspondence between TKIs and AOB files is shown by the arrows TA1 to TA8 in FIG. 17. In this way, each TKI corresponds to a different AOB recorded in an AOB file and gives detailed information that applies only to the corresponding AOB.

The detailed structure of a TKGI is shown in FIG. 16B. As shown in the drawing, a TKGI includes 'TKI_ID', 'TKIN', 'TKI_BLK_ATR', 'TKI_LNK_PTR', 'TKI_SZ', 'TKI_PB_TM', 'TKI_AOB_ATR', 'TKI_POB_ATR', 'TKI_TI1_ATR', 'TKI_TI2_ATR', 'TKI_TMSRT_SA', 'ISRC', 'TKI_APP_ATR', 'BIT', and 'TKI_POB_ESRP'.

An ID from which the TKI can be instantly distinguished is written in 'TKI_ID' (in the embodiments the ID is a 2-byte code 'A4').

TKI numbers in a range between 1 and 999 are written in 'TKIN'.

An attribute for the TKI is written in 'TKI_BLK_ATR'.

The following describes the settings of the TKI_BLK_ATR for each TKI in the example shown in FIG. 17. By referring to the TKI_BLK_ATR of each TKI, it can be seen that since the four pairs TKI#1/AOB001.SA1, TKI#2/AOB002.SA1, TKI#3/AOB003.SA1, and TKI#8/AOB008.SA1 each correspond to separate tracks, the TKI_BLK_ATR of each of TKI#1, TKI#2, TKI#3, and TKI#8 is set as 'Track'. The TLK_BLK_ATR of TKI#4 is set at 'Head_of_Track', the TLK_BLK_ATR of TKI#7 is set at 'End_of_Track', and the TLK_BLK_ATR of TKI#5 and TKI#6 is set at 'Midpoint_of_Track'. This means that the AOB file 'AOB004.SA1' corresponding to TKI#4 is the start of a track, the AOB files 'AOB005.SA1' and 'AOB006.SA1' corresponding to TKI#5 and TKI#6 are midpoints of the track, and the AOB file 'AOB007.SA1' corresponding to TKI#7 is the end of a track.

TKI_BLK_ATR can be set so that combine editing, in which any two of a plurality of tracks are combined to form a single track, and divide editing, in which one track is divided into a plurality of new tracks, can be easily performed. The following explains the change in TKI when two tracks are combined.

Figure 18A:
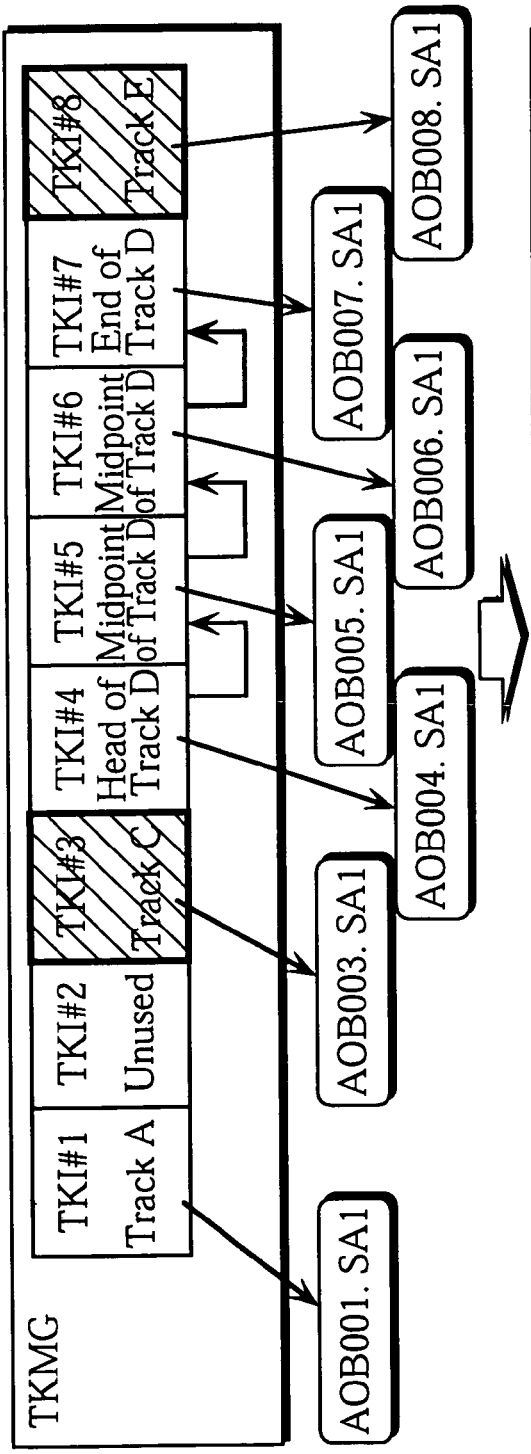
FIGS. 18A and 18B show the setting of TKIs when two tracks are combined into one.
Figure 18B:
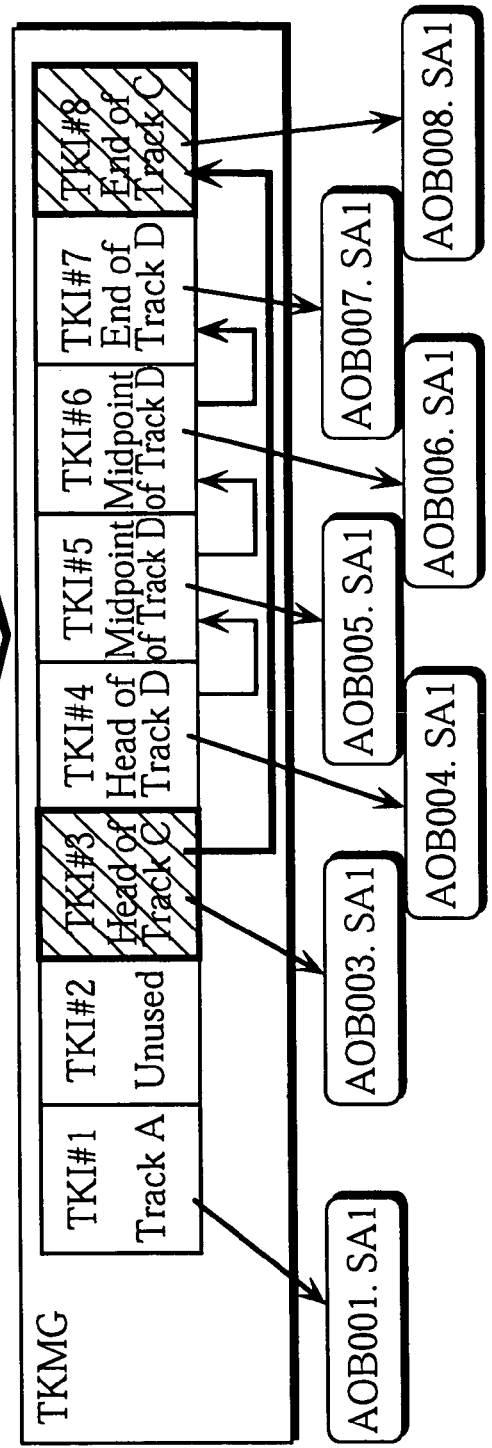

FIGS. 18A and 18B show how the TKIs are set when two tracks are combined to produce a new track. The example in FIG. 18A shows a case when the user performs an editing operation to combine Track C and Track E into a single track.

In this case, the AOBs that correspond to Track C and Track E are recorded in the AOB files AOB003.SA1 and AOB008.SA1 which correspond to TKI#3 and TKI#8, so that the TKI_BLK_ATRs of TKI#3 and TKI#8 are rewritten. FIG. 18B shows the TKI_BLK_ATR of these TKIs after rewriting. In FIG. 18A, the TKI_BLK_ATRs of TKI#3 and TKI#8 are written as 'Track', but in FIG. 18B the TKI_BLK_ATR of TKI#3 is rewritten as 'Head_of_Track' and the TKI_BLK_ATR of TKI#8 is rewritten as 'End_of_Track'. By rewriting the TKI_BLK_ATRs in this way, the AOB files AOB003.SA1 and AOB008.SA1 which correspond to TKI#3 and TKI#8 end up being treated as parts of a single track, the new Track C.

Figure 19A:
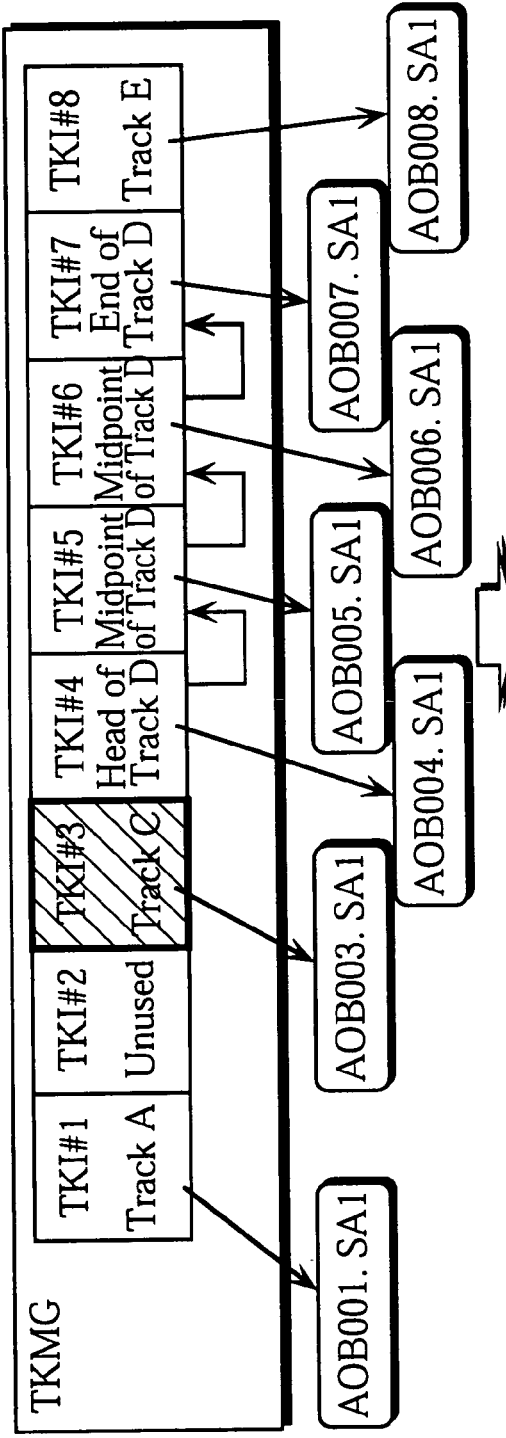
FIGS. 19A and 19B envisage a situation when one track is divided-into two.
Figure 19B:
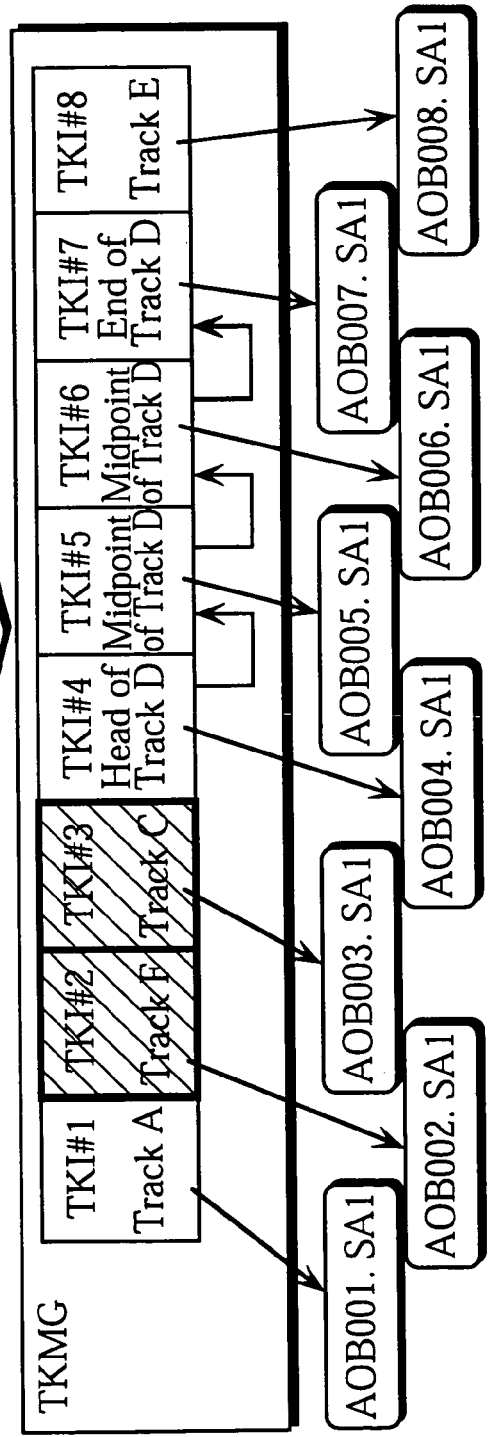

The following is an explanation of the change in TKI when a track is divided. FIGS. 19A and 19B show an example in which a single track is divided to produce two new tracks. In the drawing, the user is assumed to have performed an editing operation that divides Track C into two new tracks, Track C and Track F. When Track C is to be divided into a new Track C and Track F, the AOB file 'AOB002.SA1' is generated corresponding to Track F. FIG. 19A shows that TKI#2 is set as 'Unused', with this TKI#2 being assigned to the newly generated AOB file 'AOB002.SA1'.

'TKI_LNK_PTR' contains TKIN for a link target TKI. As shown by arrows TL4, TL5, and TL6 in FIG. 17, the TKI_LNK_PTR for each of TKI#4, TKI#5, TKI#6, and TKI#7 corresponding to the four AOB files forming Track D are set so as to indicate a next TKI_LNK_PTR.

'TKI_SZ' contains the data size of the TKI is written in byte units.

'TKI_PB_TM' contains the playback time of the track formed from an AOB in an AOB file corresponding to the TKI.

'TKI_AOB_ATR' contains encoding requirements that must be followed when an AOB is generated. These include the frequency at which the AOB recorded in the AOB corresponding to the TKI should be sampled, the bitrate at which it should be transferred, and the number of channels.

'TKI_POB_ATR' contains fields in which the POB mode (sequential mode, random mode, shuffle mode), POB display, and a mode showing whether the POB is to be synchronized with the AOB file corresponding to the TKI (slide show mode, browsable mode) are set.

'TKI TI1 ATR' and 'TKI TI2 ATR' show the types of text information to be displayed together with the copyrighted material, for example IS0646, JISX0201, IS08859, Music Shift JIS (Japan Industrial Standard) characters and the like.

'TKI_TMSRT_SA' contains the start address of TMSRT.

'ISRC' contains the ISRC (International Standard Recording Code) of the TKI.

'TKI_APP_ATR' contains the genre of the application stored on the SD memory card 100. This may be, for example, a music type, karaoke software, or presentation data.

The block information table ('BIT') manages AOB_BLOCKs. The right side of FIG. 16B shows a detailed structure of the BIT. As shown in the drawing, the BIT includes a DATA_Offset field, an SZ_DATA field, a Fns_1st_TMSRTE field, a Fns_Last_TMSRTE field, a Fns_Middle_TMSRTE field, and a TIME_LENGTH field. Each of these fields is described in detail below.

The relative address of the start of an AOB_BLOCK from the boundary between clusters is written in the 'DATA_Offset' as a value given in byte units. This expresses the size of an invalid area between an AOB and the AOB_BLOCK. As one example, when a user records a radio broadcast on the SD memory card 100 as AOBs and wishes to delete an intro part of a track over which a DJ has spoken, the DATA_Offset in the BIT can be set to have the track played back without the part including the DJ's voice.

'SZ_DATA' contains the data length of an AOB_BLOCK expressed in byte units. By subtracting a value produced by adding the SZ_DATA to the DATA_Offset from the file size (an integer multiple of the cluster size), the size of the invalid area that follows the AOB_BLOCK can be found. In other words, when a section which does not need to be played back exists in the latter part of the AOB, the SZ_DATA can be adjusted to prevent this invalid section from being played back. Thus, sections at the start and end of the AOB can be deleted by operating DATA_Offset and SZ_DATA.

'Fns_1st_TMSRTE' contains the number of AOB_FRAMEs included in the AOB_ELEMENT positioned at the start of a present AOB_BLOCK.

'Fns_Last_TMSRTE' contains the number of AOB_FRAMEs included in the AOB_ELEMENT positioned at the end of the present AOB_BLOCK.

'Fns_Middle_TMSRTE' contains the number of AOB_FRAMEs included in each AOB_ELEMENT apart from those at the start and the end of the present AOB_BLOCK, which is to say AOB_ELEMENTs in the middle of the AOB_BLOCK.

The 'TIME_LENGTH' field contains the playback period of an AOB_ELEMENT is written correct to the nearest millisecond. The 'TIME_LENGTH' field is 16 bits long. When the encoding method used is MPEG-ACC or MPEG-Layer3, the playback period of an AOB_ELEMENT is two seconds, so that the value '2000' is written in the 'TIME_LENGTH' field.

Figure 20:
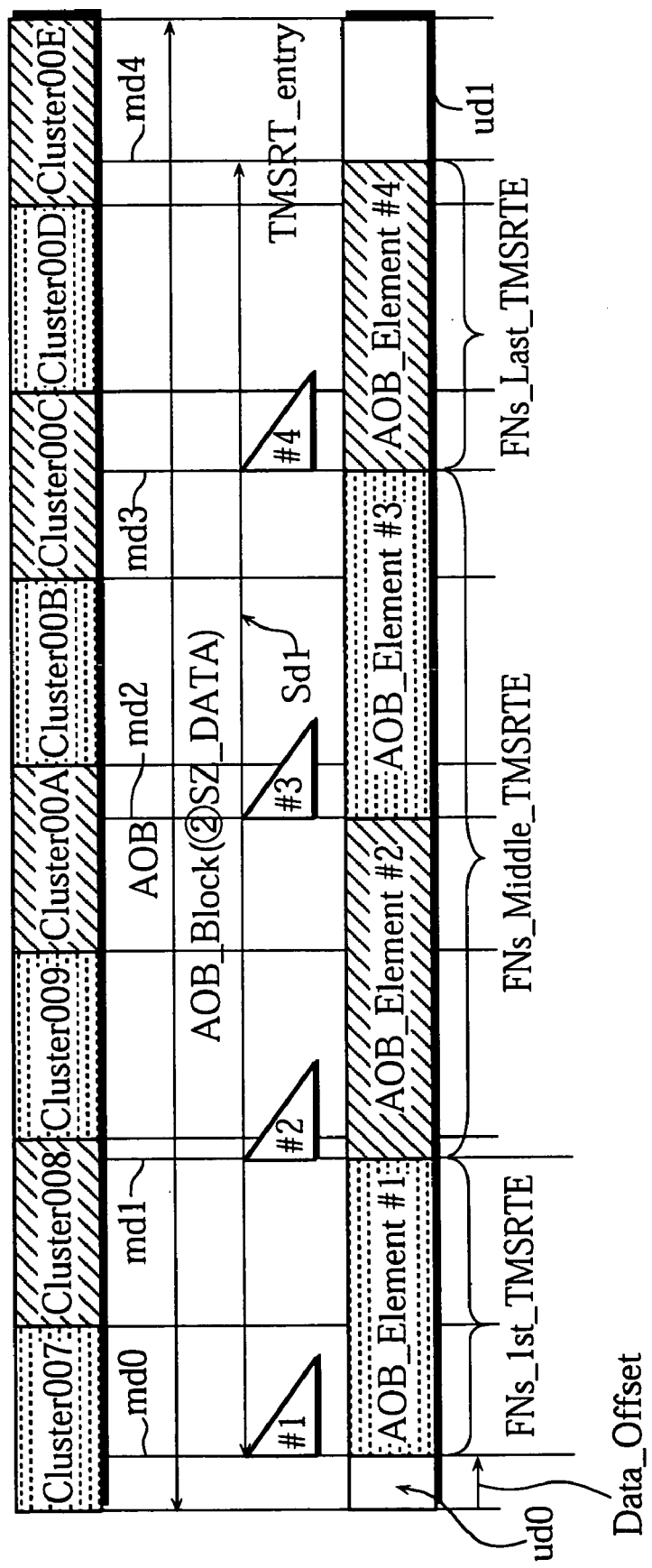
FIG. 20 shows clusters 007 to 00E stored in an AOB formed from AOB_ELEMENTs #1 to #4.

FIG. 20 shows the clusters 007 to 00E that store the AOB composed of AOB_ELEMENT#1 to AOB_ELEMENT#4. The following describes the settings in the BIT when an AOB is stored as shown in FIG. 20. The AOB_ELEMENTs #1 to #4 occupy the region between md0 in cluster 007 to md4 in cluster 00E. This regions is indicated by the SZ_DATA in the BIT, as shown by arrow sd1 in FIG. 20. The DATA_Offset given in the BIT gives the length of an unoccupied region ud0, which is to say, a position value for the start of the AOB_ELEMENT#1 relative to the start of cluster 007. Thus, it can be seen that the BIT manages the offset between the cluster boundary and the AOB_ELEMENT.

The field 'TKI_POB_SRP' indicates the POB to be displayed during the playback period of a specific AOB, a playback period being one of the time periods during which playback is performed according to a playback order specified in the Playlist information. In other words, the Track Manager can indicate the POB to be displayed for each tracks by setting the TKI_POB_SRP.

Figure 21:
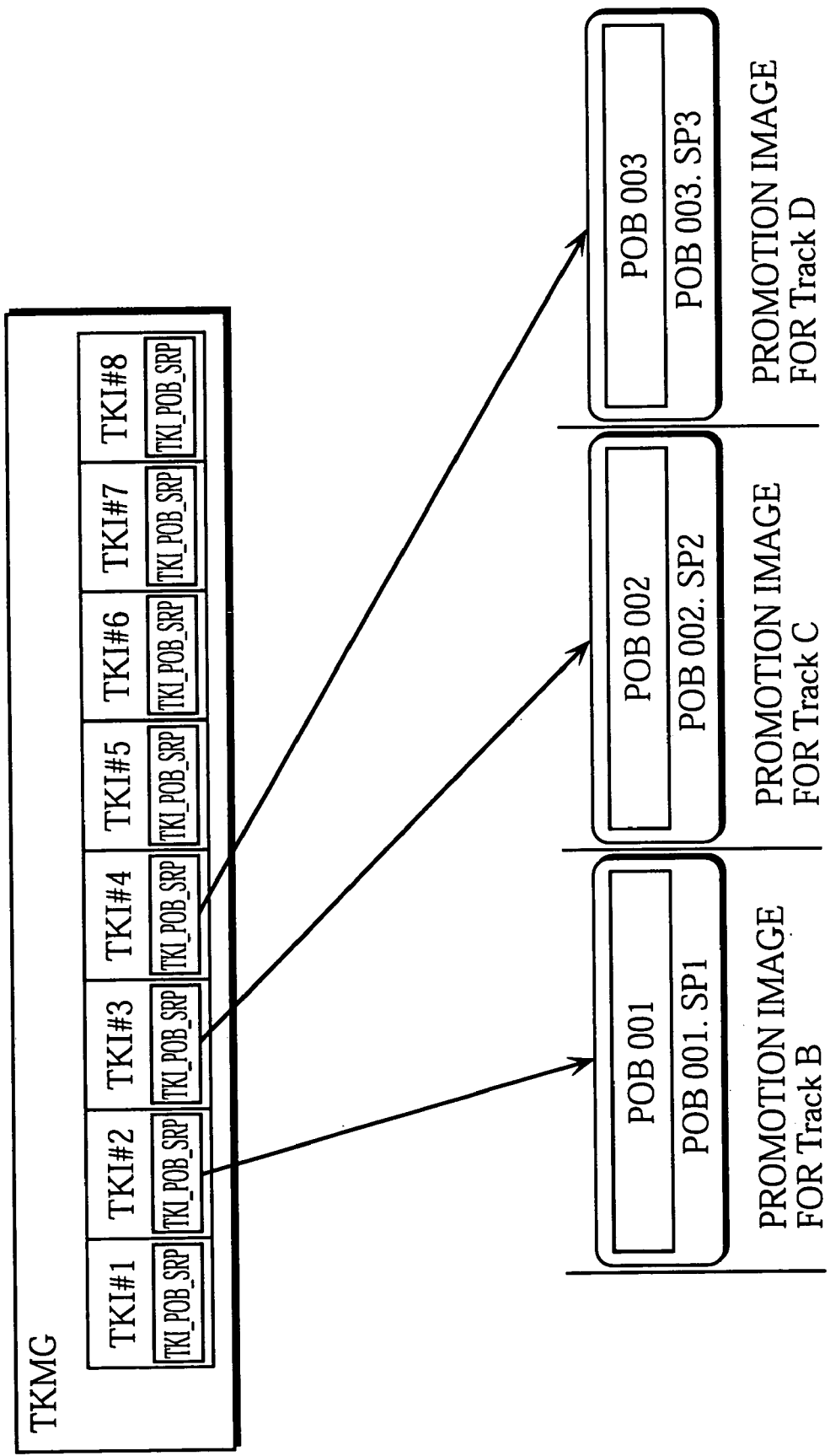
FIG. 21 shows an example TKI_POB_SRP settings for tracks TK#1 to TK#4 included in the Track Manager.

FIG. 21 shows an example of a setting of TKI_POB_SRPs for TKI#2 to TKI#4 included in the Track Manager. The first level shows the Track Manager, and the second level three POB files. The Track Manager on the first level includes eight TKIs, and arrows indicate which of the TKI_POB_SRPs in TKIs reference the POBs. According to the reference relationships indicated by the arrows, the TKI_POB_SRPs in TKI#2, TKI#3, and TKI#4 indicate POB001, POB002, and POB003 respectively. The data in POB001 to POB003 is linked to Tracks B, C, and D respectively. Since it would be meaningless if at least one POB were not to be reproduced when each track is played back, the TKI_POB_SRP in the TKIs ensure that the POBs are set so as to be reproduced during the entire time that the tracks are played back.

This completes the explanation of the TKGI. Next, the remaining files shown in FIG. 12 will be explained.

Figure 22:
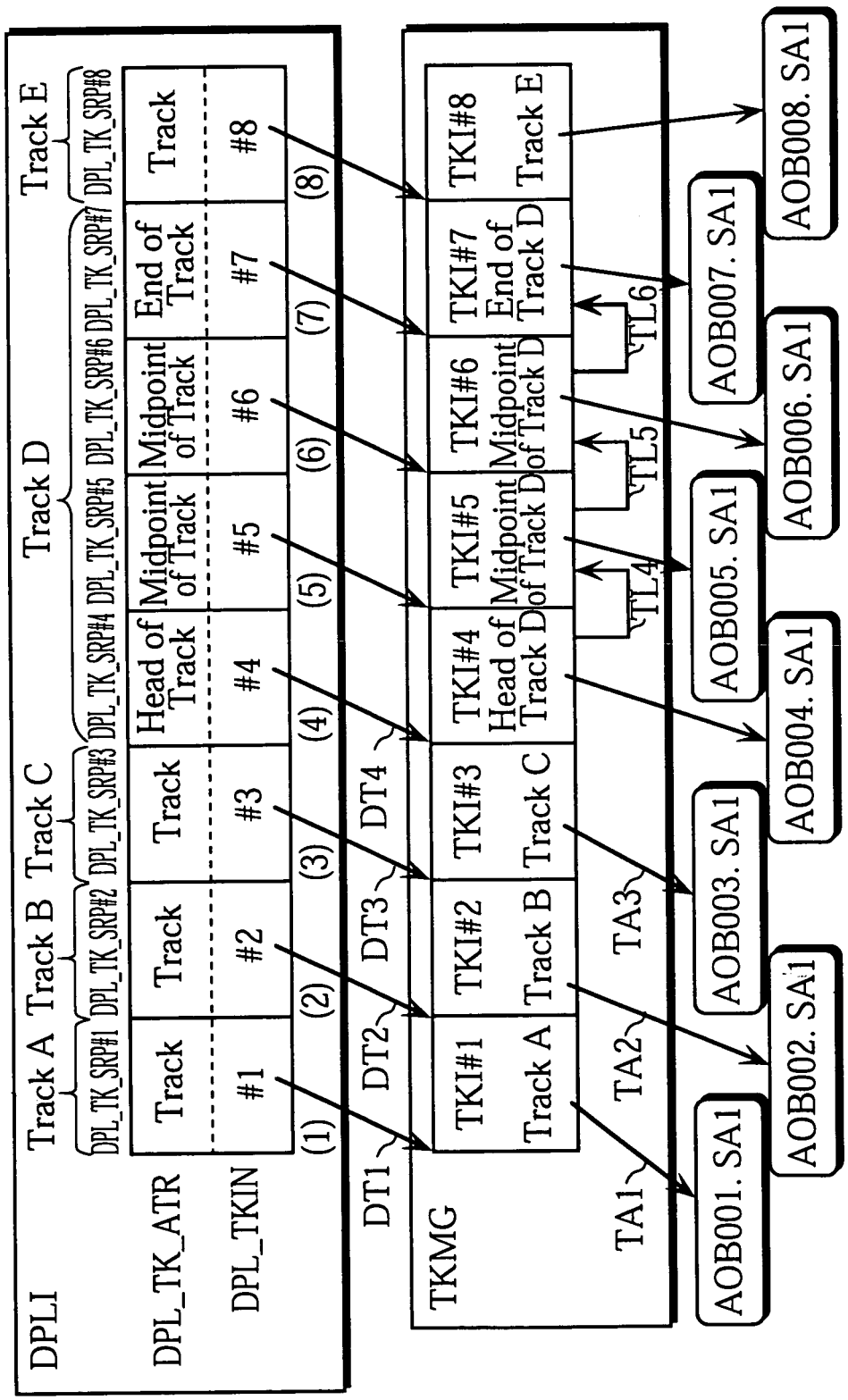
FIG. 22 shows the mutual relationship between Default_Playlist information, TK1s, and AOB files.
Figure 23A:
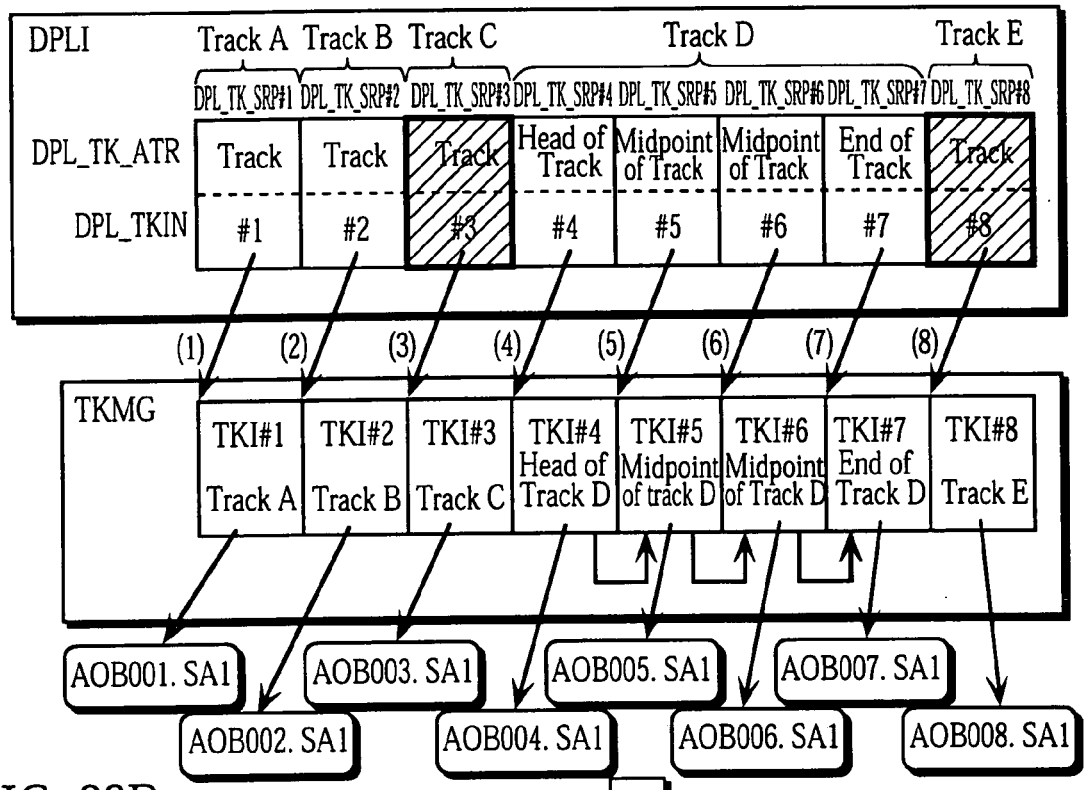
FIGS. 23A and 23B envisage a situation in which track order is changed.
Figure 23B:
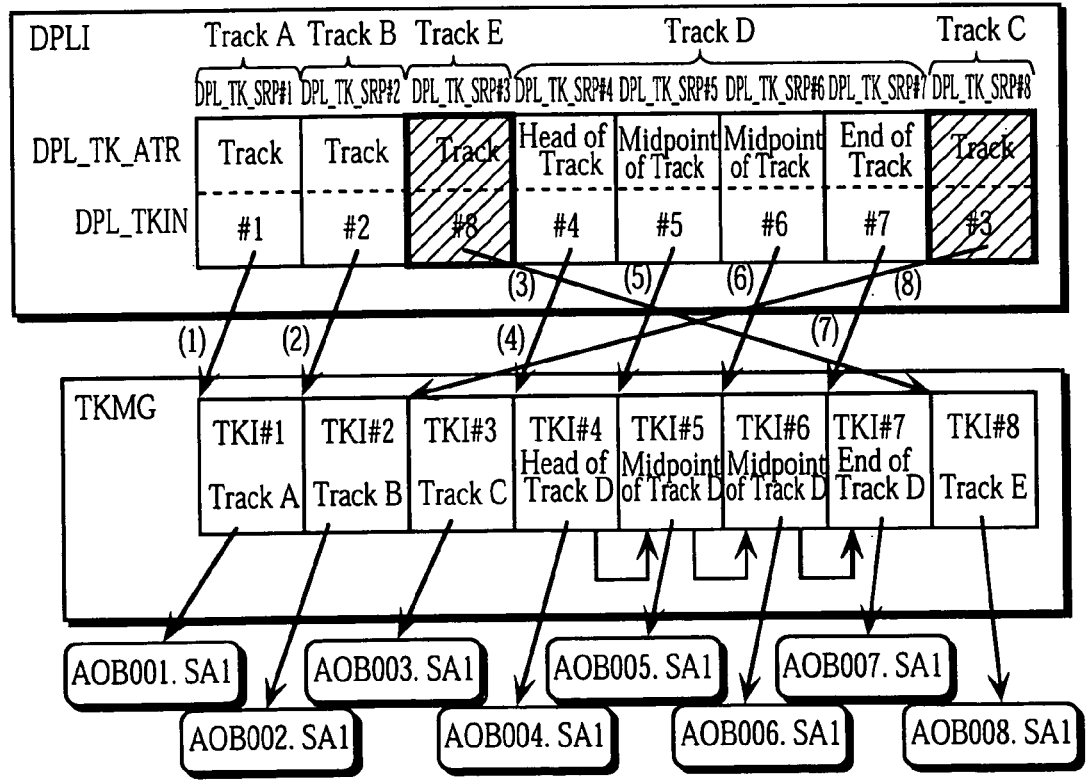

The file 'SD_AUDIO.PLM' contains information defining the playback order of a plurality of tracks, and includes Default_Playlist_Track_Search_Pointers ('DPL_TK_SRP') #1 to #m. FIG. 22 shows correspondences between Default Playlist Information, TKIs, and AOB files. The DPL_TKINs in DPL_TK_SRP #1 to #8 in the Default Playlist Information indicate TKIs #1 to #8 respectively, so that each AOB file is played back as shown by the arrows (1) to (8). The following explains how an editing operation to change the playback order of tracks is performed by changing the order of DPL_TK_SRPs in the Default Playlist. FIGS. 23A and 23B illustrate a situation in which track order has been changed. The setting of DPL_TK_SRPs and TKIs in FIG. 23A is the same as that in FIG. 22. The playback order in FIG. 23A is Track A, Track B, Track C, Track D, and Track E. In the Default Playlist Information in FIG. 23B, however, the DPL_TKINs for DPL_TK_SRP#3 and DPL_TK_SRP#8 have been interchanged, so the playback order is Track A, Track B, Track E, Track D, and Track C. Interchanging the order of DPL_TKINS in the Default Playlist Information in this way enables the track playback order to be easily changed.

The file 'POB000.POM' contains control information for each POB, such as whether a POB is indicated by TKGI, and if it is indicated, the number of indications.

This completes the explanation of files included in the SD_AUDIO directory. Next, files included in the SD_A-DEXT directory are explained. The directory name 'SD_A-DEXT' stands for SD-AUDIO EXTENSION, indicating that the directory is an extension that has been added for data compliant with the SD-Audio Ver1.1 standard.

Figure 24:
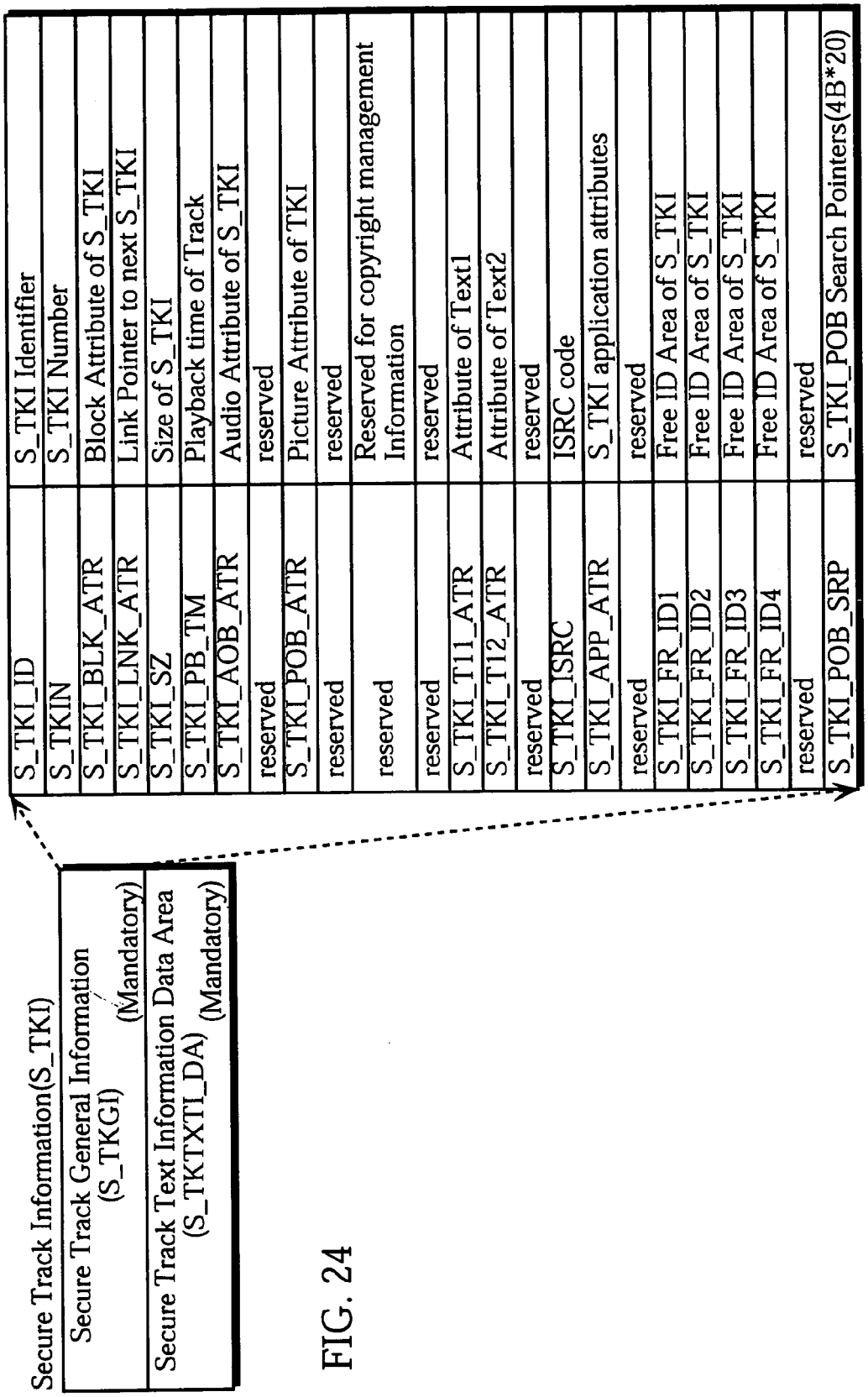
FIG. 24 shows the internal structure of 'STKI***.SDT'.

The file 'STKI*.SDT' contains Secure Track Information with an internal structure as shown in FIG. 24. From the drawing, it can be seen that the STKI includes 256 bytes of Secure Track General Information (S_TKGI), and a 256-byte Secure Track Text Information Data Area (S_TKTX-TI_DA). Comparison of the STKI*.SDT file with TKI reveals that the TKTMSRT present in the TKI is not present in the STKI. In addition, comparison of the TKGI in the TKI and the STKI reveals that the TKI_TMSRT_SA, and BIT present in the TKI, have been replaced by Free ID areas 1 to 4 (S_TKI_FR_ID 1 to 4). S_TKI_FR_ID 1 to 4 are fields in which ID information such as IDs for individual KIOSK terminals, distribution formats and individual users are written.

The following explains the differences between the TKI and STKI. Unlike the TKI, the STKI is moved together with the AOB from the SD memory card 100 to local storage when the Usage Rule for the copyrighted material is moved from the SD memory card 100 to local storage. The STKI contains S_TKI_FR_ID 1 to 4, and since these record IDs for individual KIOSK terminals, distribution formats, and individual users, the STKI is used as a kind of proof of purchase for distributed contents.

Figure 25:
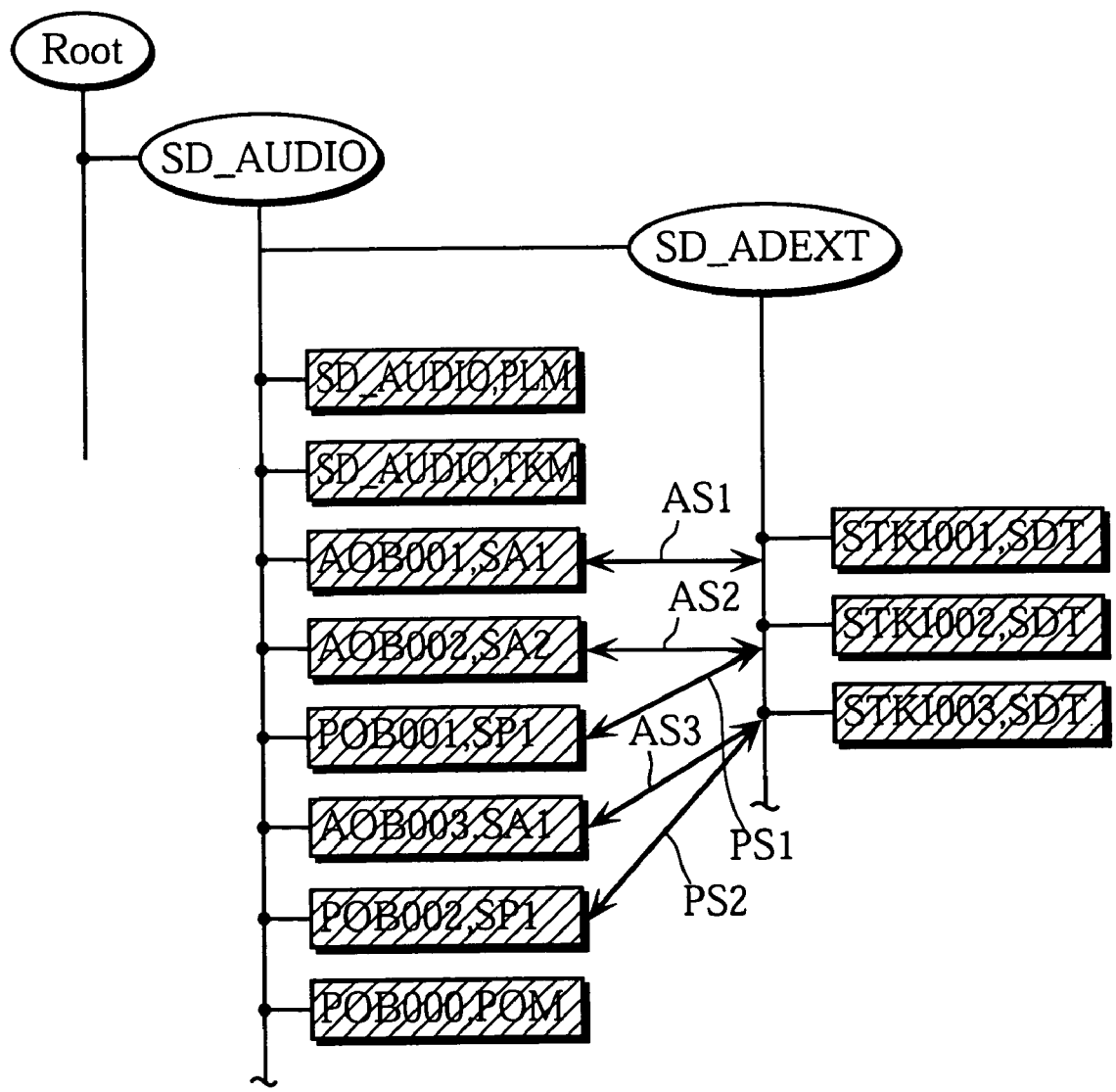
FIG. 25 shows correspondences between AOB#1, AOB#2, AOB#3, POB001.SA1, and POB002.SA1 included in a directory SD_AUDIO, and STKI001.SDT, STKI002.SDT, and STKI003.SDT included in a directory SD_ADEXT.

S_TKI files and AOB files have a one-to-one correspondence, files with the same three numbers in the file name being corresponding files. FIG. 25 shows the relationship between AOB files AOB001.SA1, AOB002.SA1, and AOB003.SA1, POB files POB001.SP1, and POB002.SP1 included in the SD_AUDIO directory on the one hand, and STKI files STKI001.SDT, STKI002.SDT, and STKI003.SDT included in the SD_ADEXT directory on the other hand. AOBs and STKIs with matching serial numbers correspond, as shown by the arrows AS1, AS2, and AS3. POBs correspond to STKI as indicated by the arrows PS1 and PS2, this relationship being determined by the S_SKI_POB_SRP in each S_TKI file. In the example of FIG. 25, S_TKI_POB_SRP in the file STKI002.SDT indicates POB001.SP1, and S_TKI_POB_SRP in the file STKI003.SDT indicates POB002.SP1.

This completes the explanation of files contained in the user data area 8. Next, the files contained in the protected area 3 are explained. The protected area 3 in FIG. 12 has an SD_AUDIO directory containing files 'AOBSA1.KEY' and 'POBSP1.KEY', and an SD_ADEXT directory containing files 'AOBSA1.URM' and 'POBSP1.URM'.

The file 'AOBSA1.KEY' is an encryption key storage file recording encryption keys (Title Keys) for decrypting AOBs. These encryption keys each correspond to one of the plurality of CEL Keys included in the Default Offer area of a package.

The file 'POBSP1.KEY' is an encryption key storage file recording encryption keys (Title Keys) for decrypting POBs. These encryption keys each correspond to one of the plurality of CEL Keys included in the Default Offer area of a package.

Figure 26:
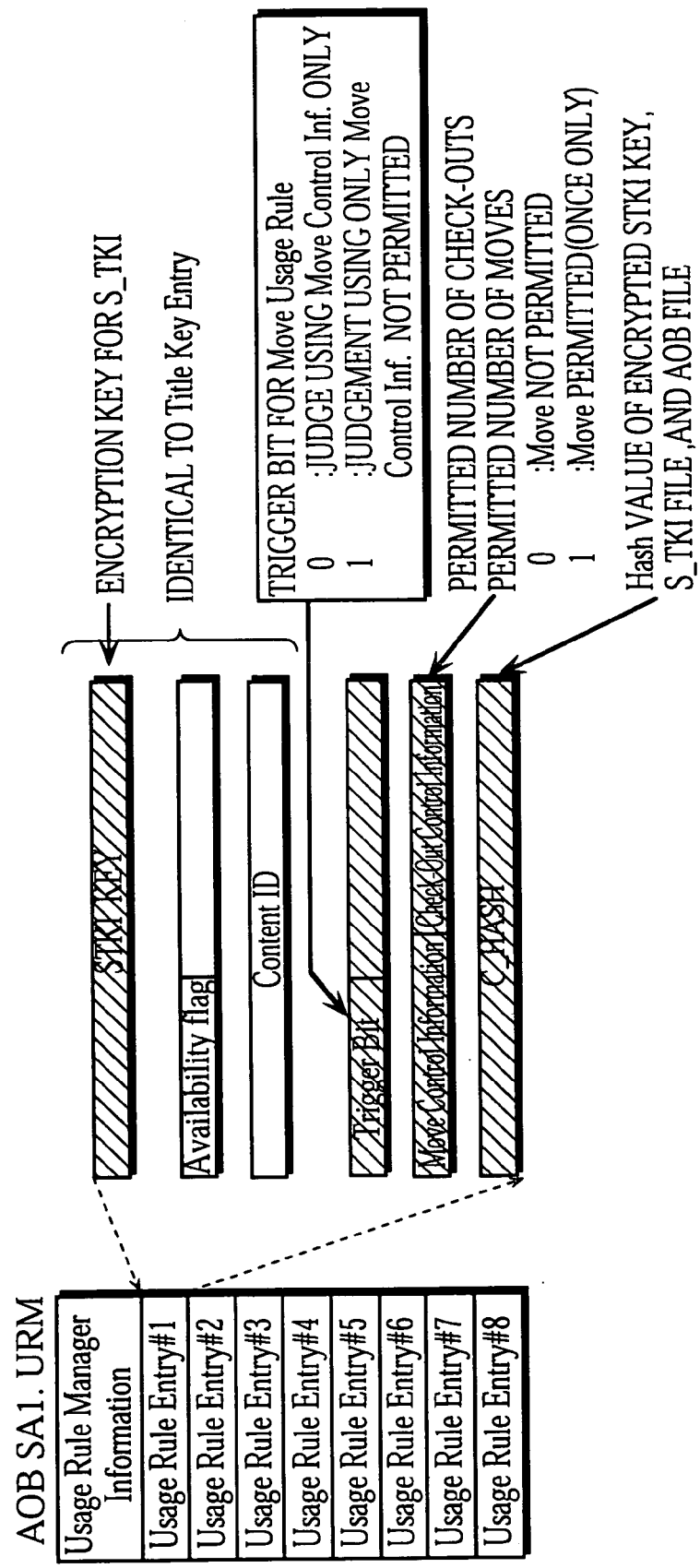
FIG. 26 shows a structure of AOBSA1.URM.

The file 'AOBSA1.URM' is a usage rule storage file recording Usage Rules corresponding to each AOB. FIG. 26 shows the structure of the file AOBSA1.URM. In the drawing, the file AOBSA1.URM includes 'Usage Rule Manager Information', that is a header section recording information such as ID information, version number, and file size, and Usage Rule Entries #1 to #n (in the drawing n=8).

The file 'POBSP1.URM' is a usage rule storage file recording Usage Rules corresponding to each POB on a one to one basis. The corresponding data is POBs rather than AOBs, but the data structure is the same as that of the file AOBSA1.URM.

Figure 27:
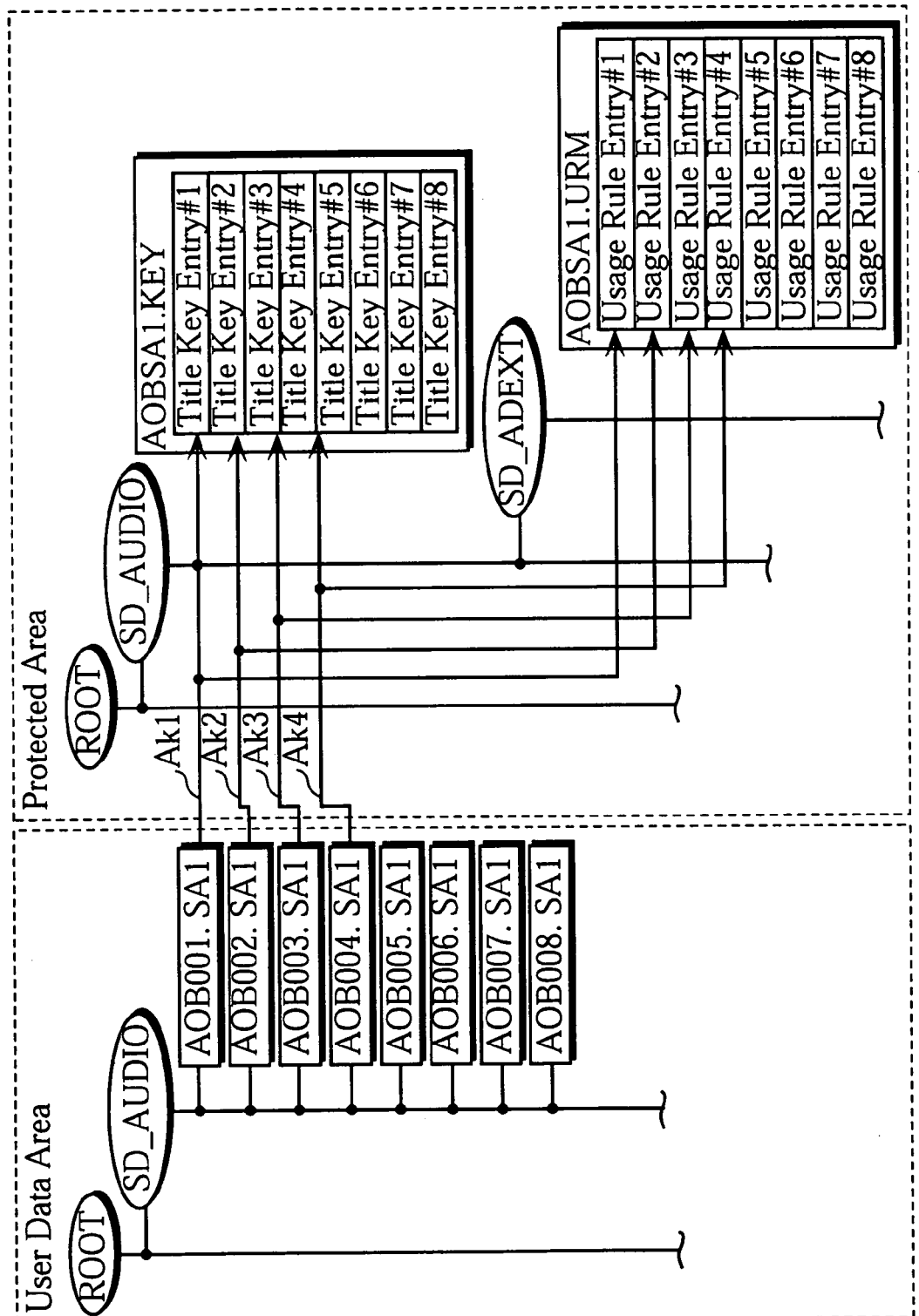
FIG. 27 shows correspondences between AOBSA1.KEY, AOBSA1.URM, and AOB files, when the SD_AUDIO directory contains eight files, eight corresponding encryption keys are recorded in AOBSA1.KEY, and eight corresponding usage rule entries are recorded in AOBSA1.URM.

FIG. 27 shows the correspondences between AOBSA1.KEY, AOBSA1.URM, and AOB files when the SD_AUDIO directory has eight AOB files, eight encryption keys corresponding to these files are recorded in AOBSA1.KEY and eight Usage Rules corresponding to these files are recorded in AOBSA1.URM.

The encrypted AOB files, the encryption key storage file, and the Usage Rule storage file correspond according to the predetermined rules (1), (2), and (3) described below.

(1) The encryption key storage file and the Usage Rule storage file are arranged into a directory with the same directory name as the directory in which the encrypted file is stored. In FIG. 27, AOB files are arranged into the SD_AUDIO directory in the user data area 8. The encryption key storage file is also arranged into the SD_AUDIO directory. The usage rule storage file is arranged into a directory SD_ADEXT that is a sub-directory of the SD_AUDIO directory.

(2) The encryption key storage file and usage rule storage file are given a filename produced by combining the first three letters of the filename of the AOB files in the data region with one of the predetermined '.KEY' or '.URM' extensions. FIGS. 28A and 28B show the correspondence between AOBSA1.KEY, AOBSA1.URM, and AOB files. When the filename of an AOB file is 'AOB001.SA1', the encryption key storage file is given the filename 'AOBSA1.KEY' produced by adding the first three characters 'AOB', 'SA1', and the extension '.KEY', as shown by the arrows nk1 and nk2. The usage rule storage file is given the filename 'AOBSA1.URM' produced by adding the first three characters 'AOB', 'SA1', and the extension '.URM', as shown by the arrows nk3 and nk4.

(3) The filenames of AOB files are assigned the serial numbers '001', '002', '003', '004', and so on, showing the position of the Title Key and the Usage Rule corresponding to each audio object in the sequence of encryption keys given in the encryption key storage file, and the sequence of Usage Rules given in the usage rule storage file. As a result, the Title Key and the Usage Rule that were used to encrypt each AOB file will be present in the 'Title Key Entry' and the 'Usage Rule Entry' with the same serial number. In FIG. 27, the arrows Ak1, Ak2, Ak3, and Ak4 show the correspondence between AOB files, Title Keys, and Usage Rules.

Figure 29:
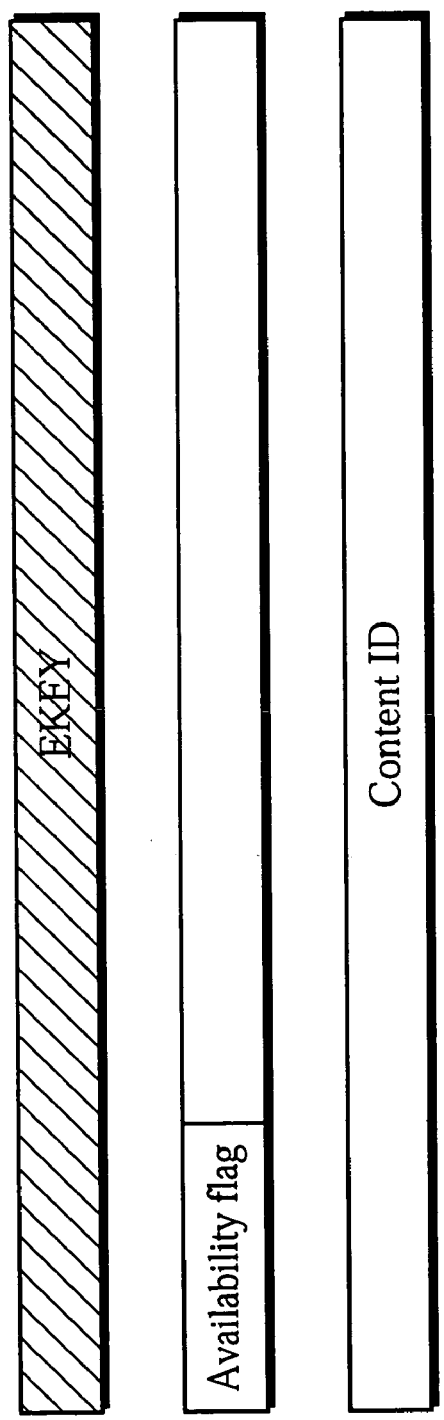
FIG. 29 shows an internal structure of a Title Key Entry.

The following is an explanation of the internal structure of Title Key Entries, with reference to FIG. 29. In the drawing, a Title Key Entry includes a 7-byte encryption key 'EKEY', an 'Availability Flag', and a 'Content ID'.

The 'Availability Flag' is set at 1 when a copyrighted material exists on the SD memory card 100, and the corresponding Title Key Entry contains a valid encryption key, and at 0 when the copyrighted material is moved from the SD memory card 100 to local storage.

The 'Content ID' is information assigned uniquely to each content. The Availability Flag is used in combination with the Content ID in the following way. The Content ID for an empty Title Key Entry is 0, and the Content ID for a Title Key Entry that is not empty, that is one that has a corresponding AOB file, is set at between 1 and 999. When a track and TKIs (AOBs) exist in a one to many correspondence, the Content IDs in the Title Key Entries corresponding to the AOBs all have the same value. Meanwhile, when the track and TKI have a one to one correspondence the Availability Flag is set at 1, and when the track and TKI have a one to many correspondence, the Availability Flag for one of the plurality of Title Key Entries is set at 1, and that for the remaining Title Key Entries at 0. If the Content ID is not 0, and the Availability Flag set at 0, a plurality of TKIs (AOBs) having the same Content ID exist, so all Title Key Entries having the same Content ID are detected. This means that it is possible to perform a search specifying a plurality of TKIs (AOBs) corresponding to one Content ID.

Next, Usage Rules are explained. The right half of FIG. 26 illustrates the structure of the Usage Rules. The format of the Usage Rule corresponding to each AOB is shown here. This includes a 'C_HASH field', 'Check-Out Control Information', 'Move Control Information', a 'Trigger Bit', a 'Content ID Field', an 'Availability Flag', and an 'STKI Key'. As shown by the '}' symbol in the drawing, the structure of the encryption key EKEY shown in FIG. 29 is identical, also including a Content ID, an Availability Flag, and an encryption key.

The lower 64 bits of a calculation result obtained by applying a Secure Hash Algorithm (SHA-1) to a concatenated (linked) Enc-STKI, Enc-STI_KEY, Enc_AOB ('Enc' indicates that the data has been encrypted) is written in 'C_HASH field'. A hash function is a one-way function, characterized by the fact that changing even one part of the input value causes the output value to differ markedly. Furthermore, it is extremely difficult to deduce the output value (hash value) from the input value. The value written in the C_HASH field is used when the customer device accesses the SD memory card 100, to verify whether the Enc-STKI, the Enc-STI_KEY, and the Enc_AOB have been replaced by other data.

In other words, when the SD memory card 100 is connected to the customer device, the customer device concatenates the Enc-STKI, Enc-STI_KEY, Enc_AOB together, and applies the SHA-1 algorithm to obtain a 64-bit C_HASH-Ref value, as below. The C_HASH-Ref value and the C_HASH written in the C_HASH field of the Usage Rule are compared. If the Enc-STKI, the Enc-STI_KEY, and the Enc_AOB are the same as when recorded on the SD memory card 100, the C_HASH-Ref value will be the same as the value written in the Usage Rule, but if the Enc-STKI, the Enc-STI_KEY, and Enc_AOB have been tampered with, or replaced by other data, the C_HASH-Ref value calculated will differ markedly from the C_HASH in the Usage Rule. The C_HASH field is included in the Usage Rule with the object of having the customer device perform such a check.

The 'Check-Out Control Information' shows the number of recording media on which the paired AOB and Title Key corresponding to a Usage Rule may be recorded, when the SD memory card 100 is connected to a customer device and the Usage Rule moved from the SD memory card 100 to local storage.

The 'Move Control Information' shows whether the movement of the right to control recording from the SD memory card 100 to local storage is permitted. If 1 is set, only one move is permitted, while if 0 is set, the movement of rights is not permitted. The number of permitted moves shown in the Move Control Information is decremented by 1 by the customer device connected to the SD memory card 100 having the Usage Rule. Following this, the decremented number is stored in local storage by the customer device.

If the 'Trigger Bit' is set at 0, movement of rights can be judged by referring to the Move Control Information alone, while if it is set at 1, movement of rights is judged by referring to other information together with the Move Control Information. The Trigger Bit is provided in order to prepare for future feature expansions of the Usage Rule. In other words, judgement of whether a copyrighted material can be moved may need to be performed in future by referring to other conditions in combination with the Move Control Information. If such a requirement exists, the Trigger Bit is set at 1, and the copyrighted material can be moved provided that the conditions are satisfied and that the Move Control Information is set at 1.

This completes the explanation of the application layer of the data. The following explanation focuses on how each of the files described above is moved when a copyrighted material is moved from the SD memory card 100 to local storage.

FIGS. 30A and 30B show how a data set forming a copyrighted material is moved from the SD memory card 100 to local storage. Of the files arranged in the user data area 8, an AOB file, a POB file, and an STKI file are fetched into the user data area in local storage, as shown by the arrows MY1, MY2 and MY3. Following this, the AOB file, the POB file, and the STKI file on the SD memory card 100 are deleted. Meanwhile the files AOBSA1.KEY, POBSA1.KEY, AOBSA1.URM, and POBSP1.URM in the protected area 3 of the SD memory card 100 are fetched to the protected area in local storage, as shown by the arrows MY4, MY5, MY6 and MY7.

FIGS. 30A and 30B are based on the assumption that all the audio objects in the user data area 8 of the SD memory card 100 are moved to local storage. FIGS. 31A and 31B, however, show how files are arranged when only three of the eight AOBs are moved to local storage. In FIG. 31A, AOBs #1 to #3, Title Key Entries #1 to #3, and Usage Rule Entries #1 to #3 are deleted from the user data area 8 and protected area 3 on the SD memory card 100, and arranged instead in the user data area and protected area in local storage, as shown in FIGS. 31A and 31B.

Figure 32:
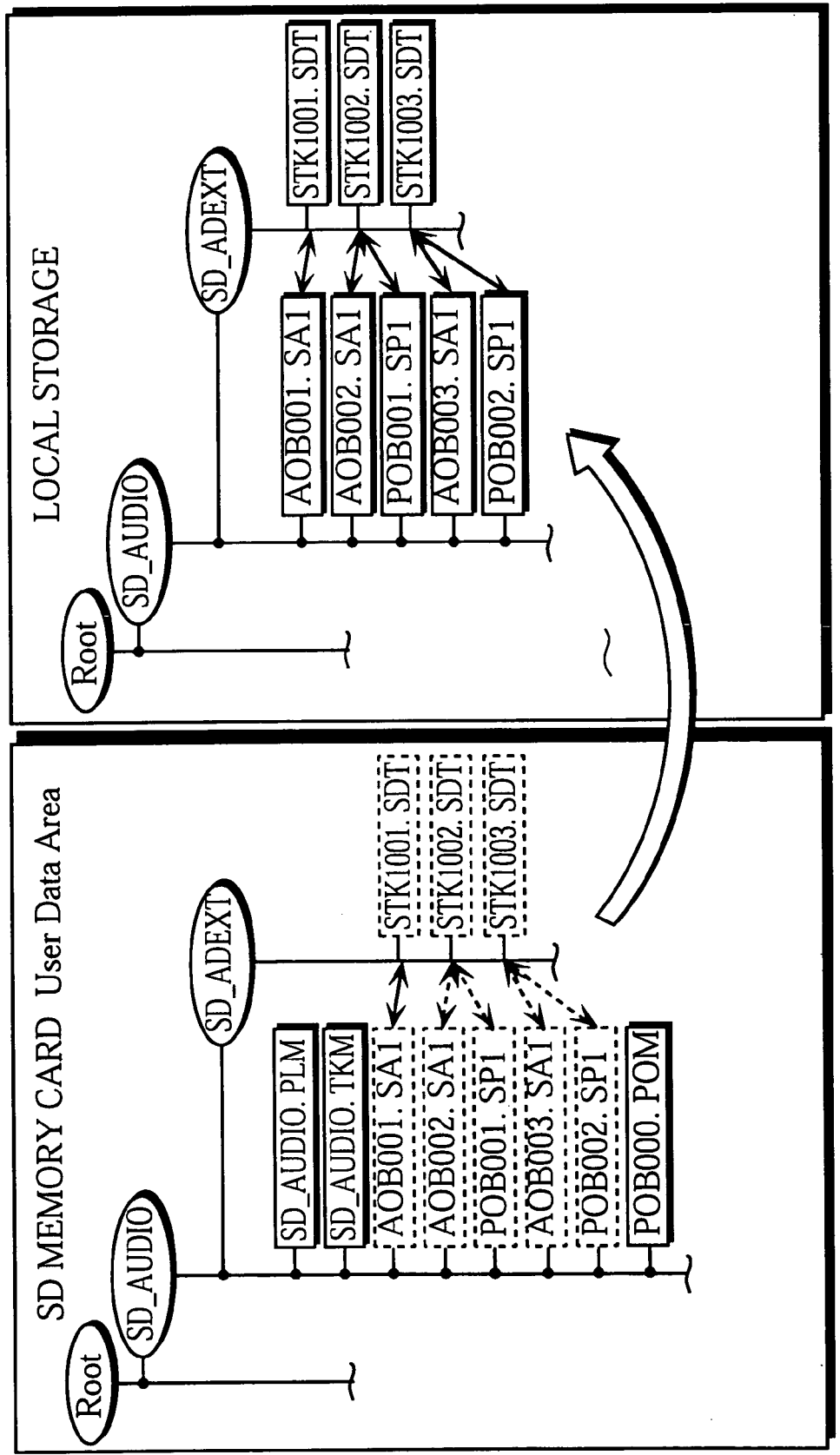
FIG. 32 shows how AOB files, POB files, and STKI files are moved from the SD memory card 100 to local storage.

FIG. 32 shows how AOB files, POB files, and STKI files shown in FIG. 25 are moved from the SD memory card 100 to local storage. In the drawing, AOB001.SA1, AOB002.SA1, AOB003.SA1, POB001.SP1, POB002.SP1, STKI001.SDT, STKI002.SDT, and STKI003.SDT are deleted from the SD memory card 100, and these files are instead arranged in local storage. This completes the explanation of the structure of directories and files in the application layer. In local storage, directories have the same structure as on the SD memory card 100, but data may be converted to a distribution format, that is the format consisting of titles and packages shown in FIG. 10, and stored. The following is an explanation of the structure of a digital terminal.

FIG. 33 shows the structure of a KIOSK type digital terminal. As shown in the drawing, the KIOSK terminal includes a released contents browser 21 for viewing a home music library composed of copyrighted materials that have been released by a record company, a touch panel 22 for receiving search requests and purchase requests for copyrighted materials, a communication unit 23 connected to a dedicated line such as a fiber-optic cable for transmitting and receiving copyrighted materials, a card connector 24 for performing input from and output to the SD memory card 100, a billing unit 25 for billing users by receiving cash payment using a coin vender or online payment using a cash card or IC card, a secure processing unit 26 for executing any required encryption and decryption when accessing the protected area 3 of the SD memory card 100, and a sales service control unit 27 for performing combined control of sales services in the KIOSK terminal.

Figure 34A:
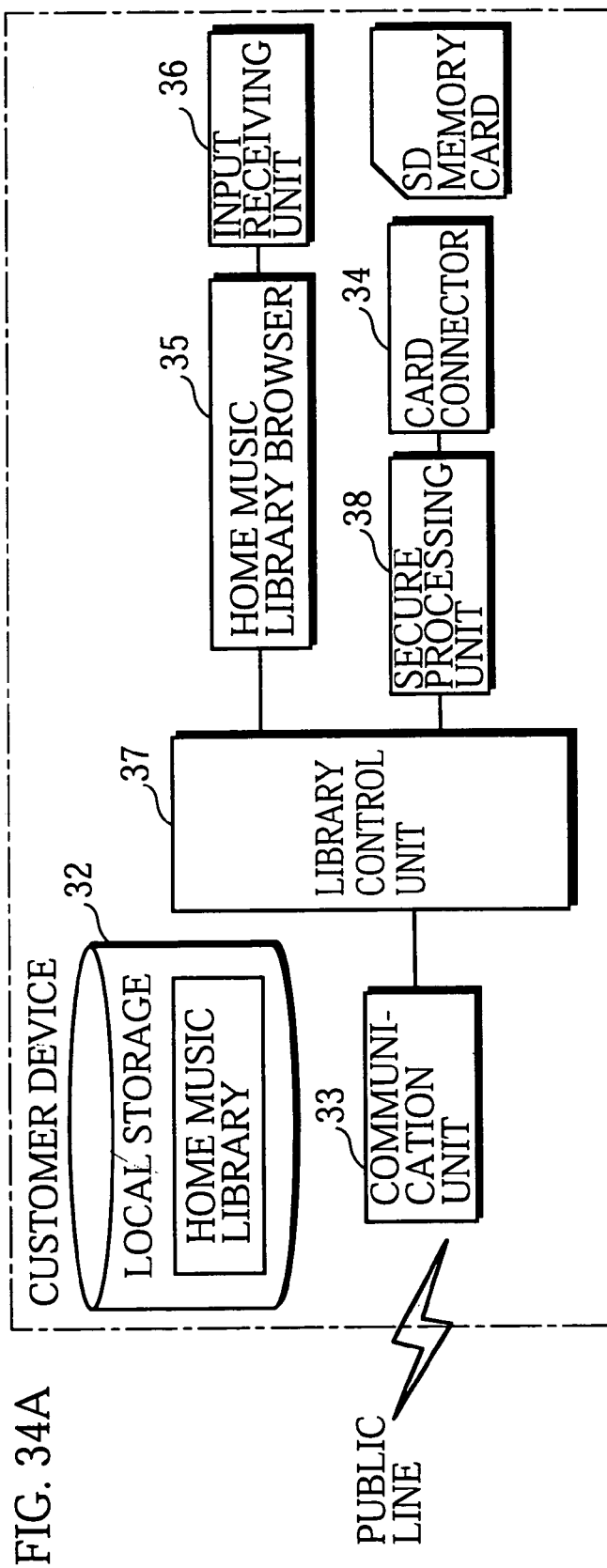
FIG. 34A shows a structure of a customer device.

FIG. 34A shows the structure of a customer device, in this case a personal computer. The customer device includes a local storage 32 for recording a home music library composed of copyrighted materials that the user has purchased from the KIOSK terminal, or downloaded via a network using the network route, a communication unit 33 connected to a public line for transmitting and receiving copyrighted materials, a card connecter 34, here a PCMCIA (Personal Computer Memory Card International Association) card adapter, for performing input from and output to the SD memory card 100, a home music library browser 35 for browsing the home music library, an input receiving unit 36 for receiving user operations, a library control unit 37 for performing, according to user operations, processing for adding a new copyrighted material to the home music library in the local storage 32, and checking-out copyrighted materials included in the local storage 32 to another recording medium, and a secure processing unit 38 for executing encryption and decryption required when accessing the protected area 3 of the SD memory card 100.

Figure 34B:
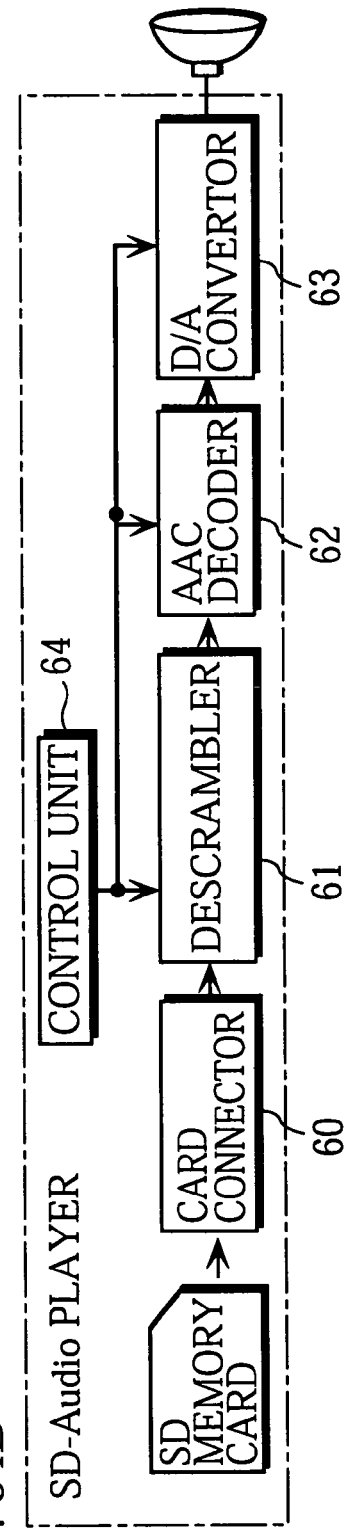
FIG. 34B shows a structure of SD-Audio players 122 to 124.

Next, the internal structure of the SD-Audio players 122 to 124 is explained with reference to FIG. 34B. In FIG. 34B each of the SD-Audio players 122 to 124 is a PCMCIA card adapter, including a card connecter 60 for performing input to and output from the SD memory card 100, a descrambler 61 for decrypting AOB files using a Title Key, an AAC data decoder 62 for decoding AOB files to obtain PCM data, a D/A converter 63 for converting the PCM data from digital to analog, and outputting the converted data to speakers via a headphone terminal, and a control unit 64 for performing combined control of processing in the SD-Audio players 122 to 124. The SD-Audio players 122 to 124 play back tracks recorded on the SD memory card 100 by a customer device using check-out, or tracks recorded on the SD memory card 100 together with a Usage Rule that indicates whether moving is permitted. Here, playback of copyrighted materials is explained as being performed by the SD-Audio players 122 to 124, but the customer device may be given the same internal structure as that shown in FIG. 34B and perform playback of copyrighted materials itself.

Furthermore, user operations may be received by a digital terminal or customer device by using, instead of a touch panel, a keyboard, a trackball, a trackpad, or any combination of these. Contents may be viewed on the released contents browser 21 and the home music library browser 35 via, for example, a CRT (cathode ray tube), a plasma display, or an LCD (liquid crystal display).

Figure 35:
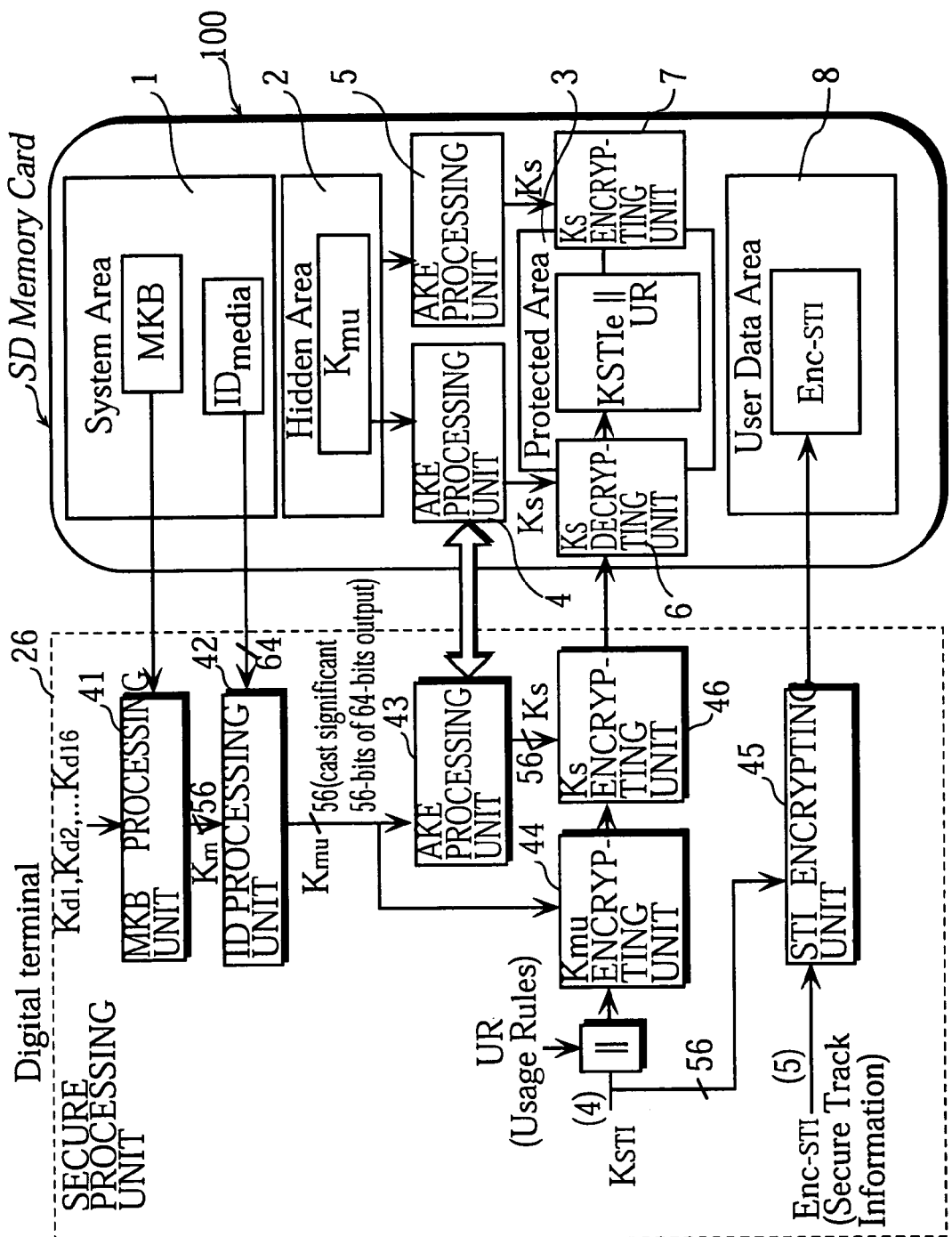
FIG. 35 shows an internal structure of a secure processing unit 26 in a digital terminal.

The following is an explanation of the secure processing unit 26 inside the digital terminal. As shown in FIG. 35, the secure processing unit 26 includes an MKB processing unit 41, an ID processing unit 42, an AKE processing unit 43, a Kmu encrypting unit 44, an STI encrypting unit 45, and a Ks encrypting unit 46.

The MKB processing unit 41 reads an MKB stored in the system area 1 of the SD memory card 100, and a device key Kd attached by the manufacturer of the digital terminal, and obtains a 56-bit encryption key Km by performing a specific calculation using the MKB and the device key Kd, then outputs the encryption key Km to the ID processing unit 42.

Upon receiving the encryption key Km from the MKB processing unit 41, the ID processing unit 42 reads a Media-ID from the system area 1 of the SD memory card 100, and performs a specific calculation to obtain a 64-bit calculation result, the lower 56-bits of which are output to the AKE processing unit 43 and the Kmu encrypting unit 44 as the encryption key Kmu.

The AKE processing unit 43 performs AKE processing using the encryption key Kmu calculated by the ID processing unit 42, and the encryption key Kmu on the SD memory card 100. The AKE processing unit then outputs the 56-bit session key Ks resulting from this calculation to the Ks encrypting unit 46.

The Kmu encrypting unit 44 randomly selects an STI_KEY (in the drawing KSTI is indicated), encrypts this STI_KEY using the encryption key Kmu output from the ID processing unit 42, and outputs it to the Ks encrypting unit 46. The Kmu encrypting unit 44 also concatenates the Enc-STKI, the Enc-STKI_KEY, and the Enc_AOB and calculates a C_HASH value by applying the algorithm SHA-1. Upon obtaining the encrypted STI_KEY and C_HASH value, the Kmu encrypting unit 44 writes the C_HASH value in a Usage Rule, encrypts this Usage Rule using the encryption key Kmu and outputs it to the Ks encrypting unit 46.

The STI encrypting unit 45 encrypts an STKI using the STI_KEY, outputs the encrypted STKI to the SD memory card 100 and writes it in the user data area 8.

The Ks encrypting unit 46 encrypts a paired STKI and Usage Rule using the 56-bit session key Ks output from the AKE processing unit 43, outputs the encrypted pair and writes it in the protected data area 3.

Figure 36:
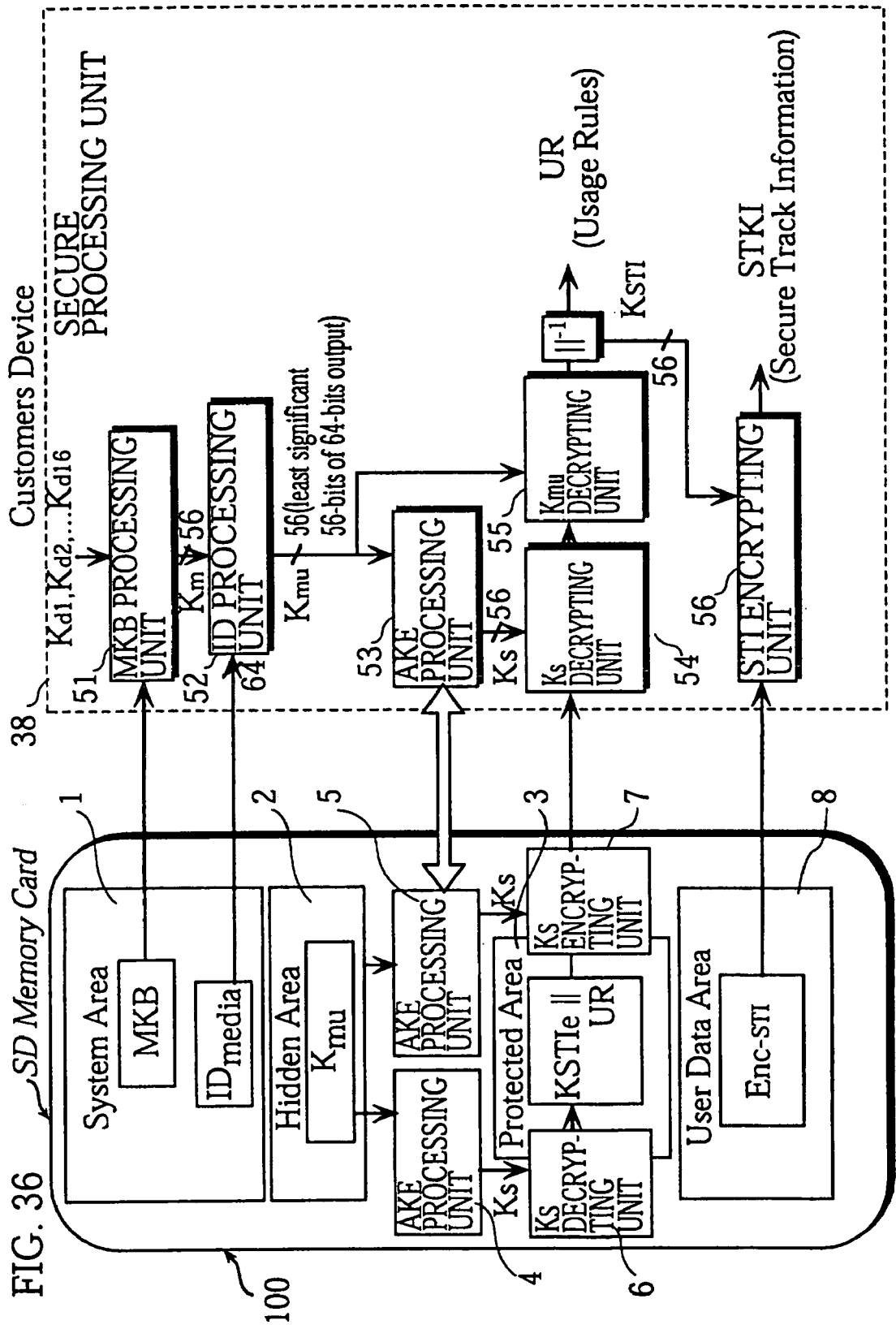
FIG. 36 shows an internal structure of a secure processing unit 38 in a customer device.

This completes the explanation of the structure of the secure processing unit 26 in the digital terminal. The following explanation deals with the structure of the secure processing unit 38 in the customer device. The internal structure of the secure processing unit 38, as shown in FIG. 36, includes an MKB processing unit 51, an ID processing unit 52, an AKE processing unit 53, a Ks decrypting unit 54, a Kmu decrypting unit 55, and an STI decrypting unit 56.

Once the customer device is connected to the SD memory card 100, the MKB processing unit 51 reads an MKB from the system area 1, and performs a specific calculation on the read MKB using a device key Kd, thereby obtaining a 56-byte encryption key Km.

The ID processing unit 52 reads a Media-ID from the system area 1 of the connected SD memory card 100, performs a specific calculation using the encryption key Km calculated by the MKB processing unit 51 and the read Media-ID, obtaining a 64-bit calculation result, the lower 56 bits of which it outputs to the AKE processing unit 53 and the Kmu decrypting unit 55 as an encryption key Kmu.

The AKE processing unit 53 performs AKE processing with the AKE processing unit 43 of the SD memory card 100, using the encryption key Kmu output from the Ks decrypting unit 54, and outputs the 56-bit calculation result to the Ks decrypting unit 54 as a session key Ks.

The Ks decrypting unit 54 reads an encrypted pair of Enc_STKI and Enc-Usage Rule stored in the protected area 3 of the SD memory card 100, and decrypts the encrypted pair using the 56-bit session key Ks output from the AKE processing unit 53. Then the Ks decrypting unit 54 outputs the decryption result to the Kmu decrypting unit 55.

The Kmu decrypting unit 55 performs decrypting using the 56-bit encryption key Kmu calculated by the ID processing unit 52, thereby obtaining an STKI and Usage Rule pair.

The STI decrypting unit 56 reads the Enc-STI_KEY from the user data area and decrypts the read Enc-STKI using the STI_KEY, thereby obtaining an STKI.

The encryption and decryption performed by the secure processing units 26 and 38 is performed in Converted Cipher Block Chaining Mode (C_CBC mode). Suppose that the encrypted data is 512 bytes. In C_CBC mode, each 8-byte section of this data is treated as one block, and the first 8-byte block is decrypted using a 7-byte encryption key Mk. The 8-byte calculation result is held as a section key, and used to decrypt the next 8-byte block, and so on. The 512 bytes of data is decrypted in 8-byte units in this way.

Furthermore, the processing sequence in which the session key Ks is shared via the AKE processing, encrypted data read from the SD memory card 100, encrypted data decrypted using the session key Ks, and then further decrypted using the encryption key Kmu is referred to as a secure read. This processing sequence is performed when a specified read command (the secure read command) is issued to the SD memory card 100 by a connected device.

In addition, the processing sequence in which data is encrypted using the encryption key Kmu, and then encrypted again using the session key Ks obtained via the AKE processing, and the encrypted data transmitted is referred to as a secure write. This processing sequence is performed when a specified write command (the secure write command) is issued to the SD memory card 100 by a connected device. This completes the explanation of the secure processing units 26 and 38.

The following is an explanation of the sales service control unit 27 and the library control unit 37, which are control units performing combined processing control for the digital terminal and the customer device respectively.

Figure 37:
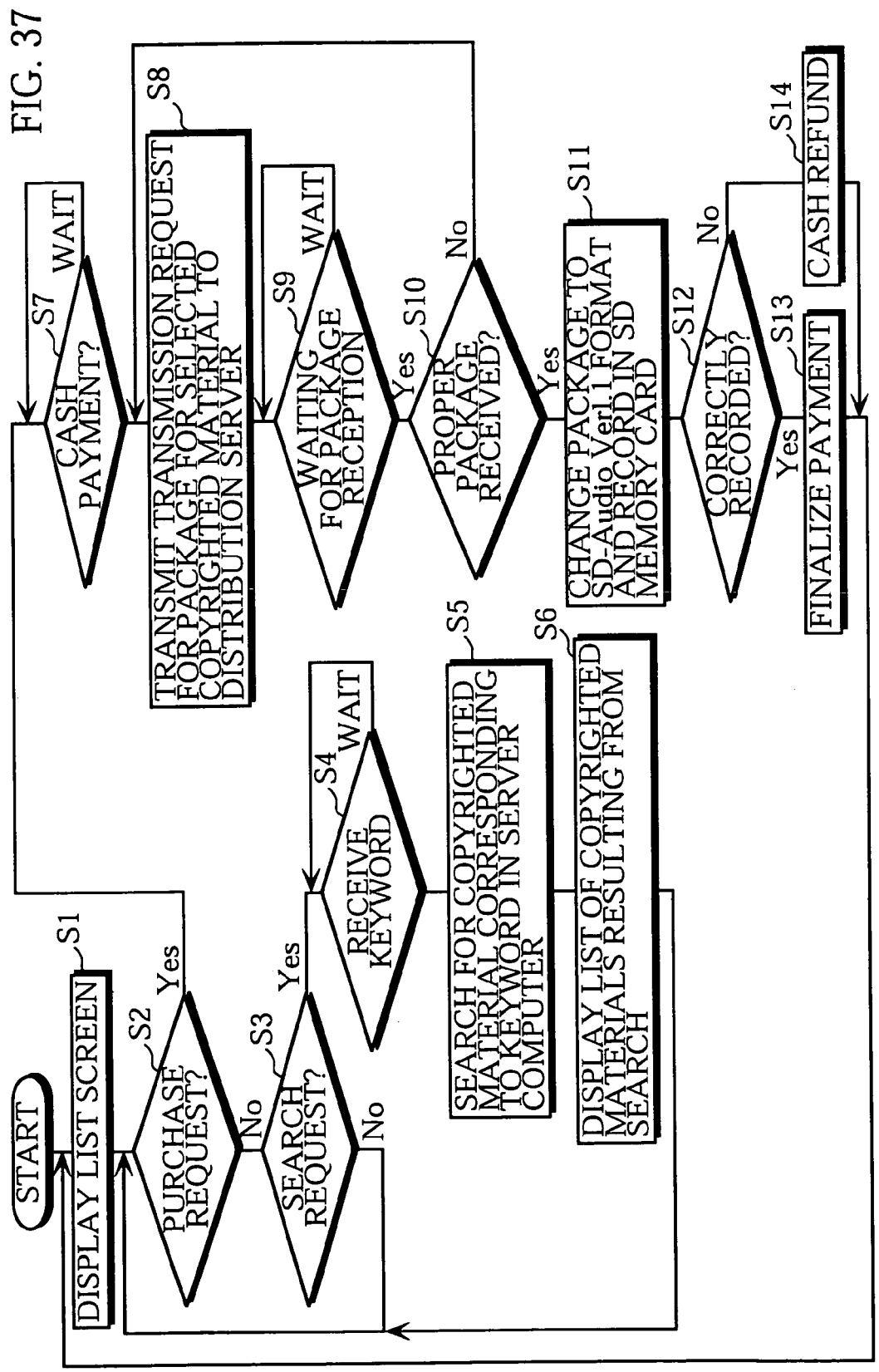
FIG. 37 is a flowchart showing the procedure performed by a sales service control unit 27.
Figure 38:
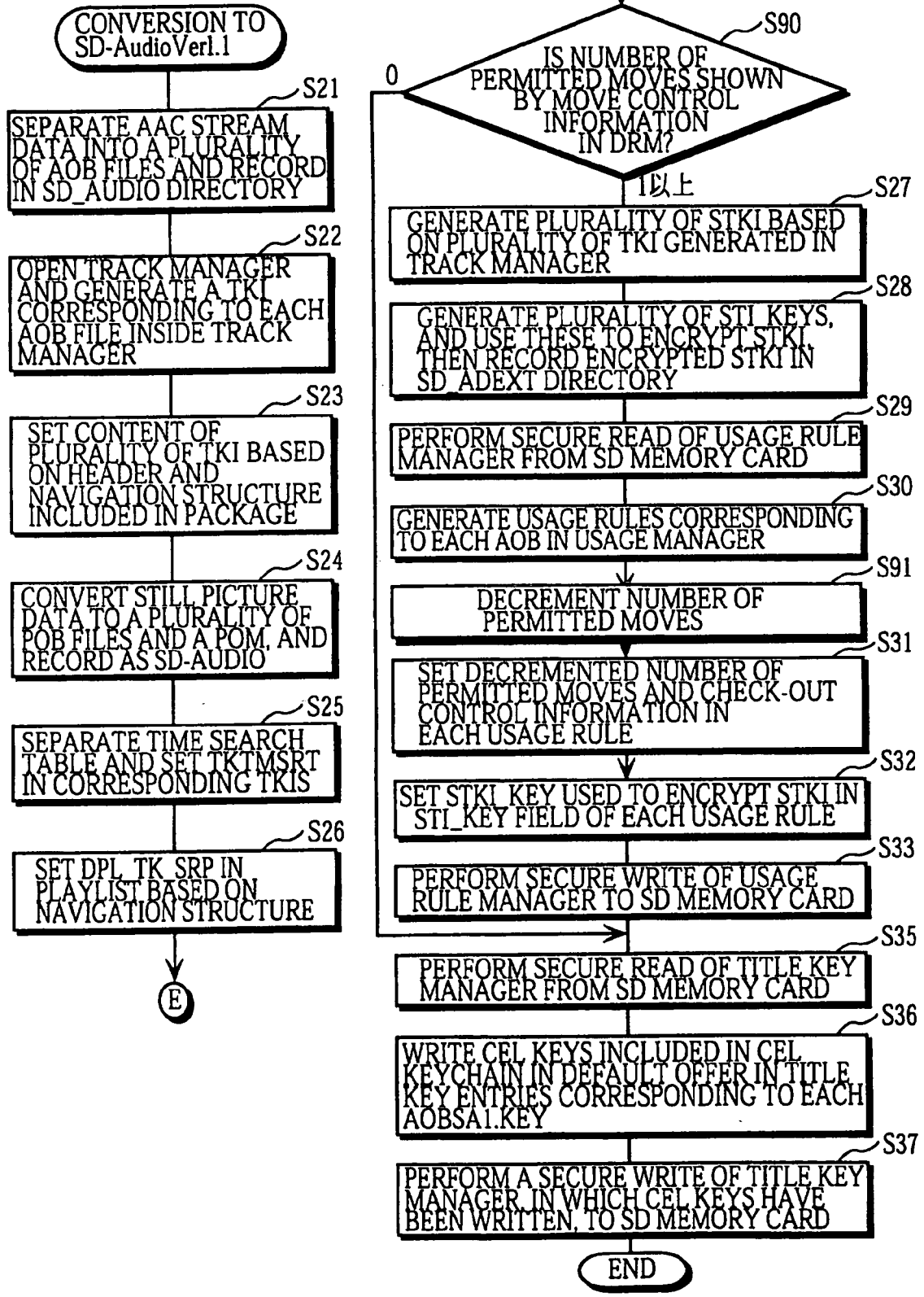
FIG. 38 is a flowchart showing the procedure performed by a sales service control unit 27.

The sales service control unit 27 includes ROM (read-only memory) storing an executable program written so as to perform combined control of the digital terminal, RAM (random access memory), and a CPU (central processing unit). The flowcharts of FIGS. 37 and 38 show the procedure performed by this executable program. The control content of the sales service control unit 27 is explained with reference to these flowcharts. When the processing of the flowchart in FIG. 37 is initiated, at step S1, the sales service control unit 27 has a list, introducing copyrighted materials that have been released by the record company, displayed on the screen of the released contents browser 21, and then moves to the loop processing of steps S2 and S3. At step S2, the sales service control unit 27 determines whether a user has made a purchase request for a copyrighted material and, at step S3, determines whether a user has made a search request for a copyrighted material. If a search request has been made, step S3 is Yes, and processing moves to step S4. At step S4, the sales service control unit 27 receives a keyword input such as an artist name or song title from the user via the touch panel 22, and at step S5, searches for information regarding copyrighted materials relating to the keyword from the distribution server 103 by accessing the distribution server 103 via the communication unit 23. Then, at step S6, the sales service control unit 27 has a viewing screen showing the copyrighted materials resulting from the search displayed by the released content browser 21, and then returns to the loop processing of steps S2 and S3.

If a purchase request is made by the user, step S2 is Yes, and processing moves to step S7, where the sales service control unit 27 waits for cash payment to be made to the billing-unit 25. If money is inserted into the coin vender, the sales service control unit 27, at step S8, has a transmission request for a package corresponding to a selected copyrighted material transmitted by the communication unit 23. Next, at step S9, the sales service control unit 27 waits for the package to be received, and at step S10, determines whether the package has been properly received. If the package has not been properly received, processing moves to step S8, and the sales service control unit 27 has the communication unit 23 issue another transmission request. If the communication unit 23 receives the package properly, the sales service control unit 27, at step S11, converts the package to data compliant with the SD-Audio Ver1.1 standard and records it on the SD memory card 100. At step S12, the sales service control unit 27 determines whether data has been properly recorded on the SD memory card 100, and if not, gives a cash refund, at step S14. If data has been properly recorded, the sales service control unit 27, at step S13, has the billing unit 25 finalize payment. Then processing moves to step S1, the sales service control unit 27 has an initial screen displayed by the released contents browser 21, and moves to the loop processing of steps S2 and S3.

The following is a detailed explanation of how data is converted into data compliant with the SD-Audio Ver1.1 standard at step S11, with reference to the flowchart in FIG. 38. When recording a copyrighted material onto the SD memory card 100, the sales service control unit 27 accesses the SD_AUDIO directory in the user data area 8 of the SD memory card 100, reads the AOB*.SA1 files, and performs a search to determine whether an unused file number exists. If 999 AOB*.SA1 files already exist, the sales service control unit 27 displays a message indicating that no more contents can be recorded, and processing ends. If the number of AOB***.SA1 files is less than 999, the sales service control unit 27, at step S21, divides AAC stream data included in the CELs of the package into a plurality of AOB files, and records the AOB files in the SD_AUDIO directory. Next, at step S22, the sales service control unit 27 opens the Track Manager stored in the user data area 8 of the SD memory card 100 and generates TKI corresponding to each AOB inside the Track Manager. At step S23, the sales service control unit 27 sets data based on the header and Navigation Structure included in the package in the plurality of TKIs inside the Track Manager. Next, at step S24, it converts still picture data into POB files and a POM file, and records these converted files onto the SD memory card 100. At step S25, the sales service control unit 27 divides-up a time search table, and sets it as the TKTMSRT of corresponding TKIs, and at step S26, it sets DPL_TK_SRPs in the Playlist based on the Navigation Structure. This completes the setting of the data set to be arranged in the SD_AUDIO directory in the user data area 8 of the SD memory card 100.

Next, the sales service control unit 27 moves to step S90, and determines whether the number of permitted moves shown in the Move Control Information of the DRM is 0. If the number is 0, the processing of steps S27 to S33 and S91 is skipped, and the processing moves to step S35. If the number is 1 or more, processing moves to step S27. Next, at step S27, the sales service control unit 27 generates a plurality of STKIs based on the plurality of TKIs generated in the Track Manager. At step S28, the sales service control unit 27 generates a plurality of STI_KEYs and uses the generated keys to encrypt each STKI, storing the encrypted STKIs in the SD_ADEXT directory. At step S29, the sales service control unit 27 performs a secure read of the Usage Rule Manager from the SD memory card 100, and at step S30, generates a Usage Rule corresponding to each AOB in the Usage Rule Manager. At step S91, the sales service control unit 27 decrements the number of permitted moves, and at step S31, sets the decremented number of permitted moves, with the Check-Out Control Information, in each Usage Rule. At step S32, the sales service control unit 27 sets the STI KEYs used to encrypt the STKIs in step S32 in the STI_KEY field of the Usage Rules. At step S33, it performs a secure write of the Usage Rule Manager onto the SD memory card 100. The STKIs and the Usage Rule Manager are recorded by the above processing, so that data compliant with the SD-Audio Ver1.1 standard is set on the SD memory card 100.

Next, at step S35, the sales service control unit 27 performs a secure read of the Title Key Manager from the SD memory card 100, and at step S36, writes CEL Keys included in the CEL Keychain of the Default Offer in the Title Key Entry corresponding to each AOB in AOBSA1.KEY. At step S37, the sales service control unit 27 performs a secure write of the Title Key Manager, into which the CEL Keys have been written, onto the SD memory card 100.

This completes the explanation of the sales service control unit 27 in the digital terminal. Next, the library control unit 37 in the customer device is explained in detail.

Figure 39:
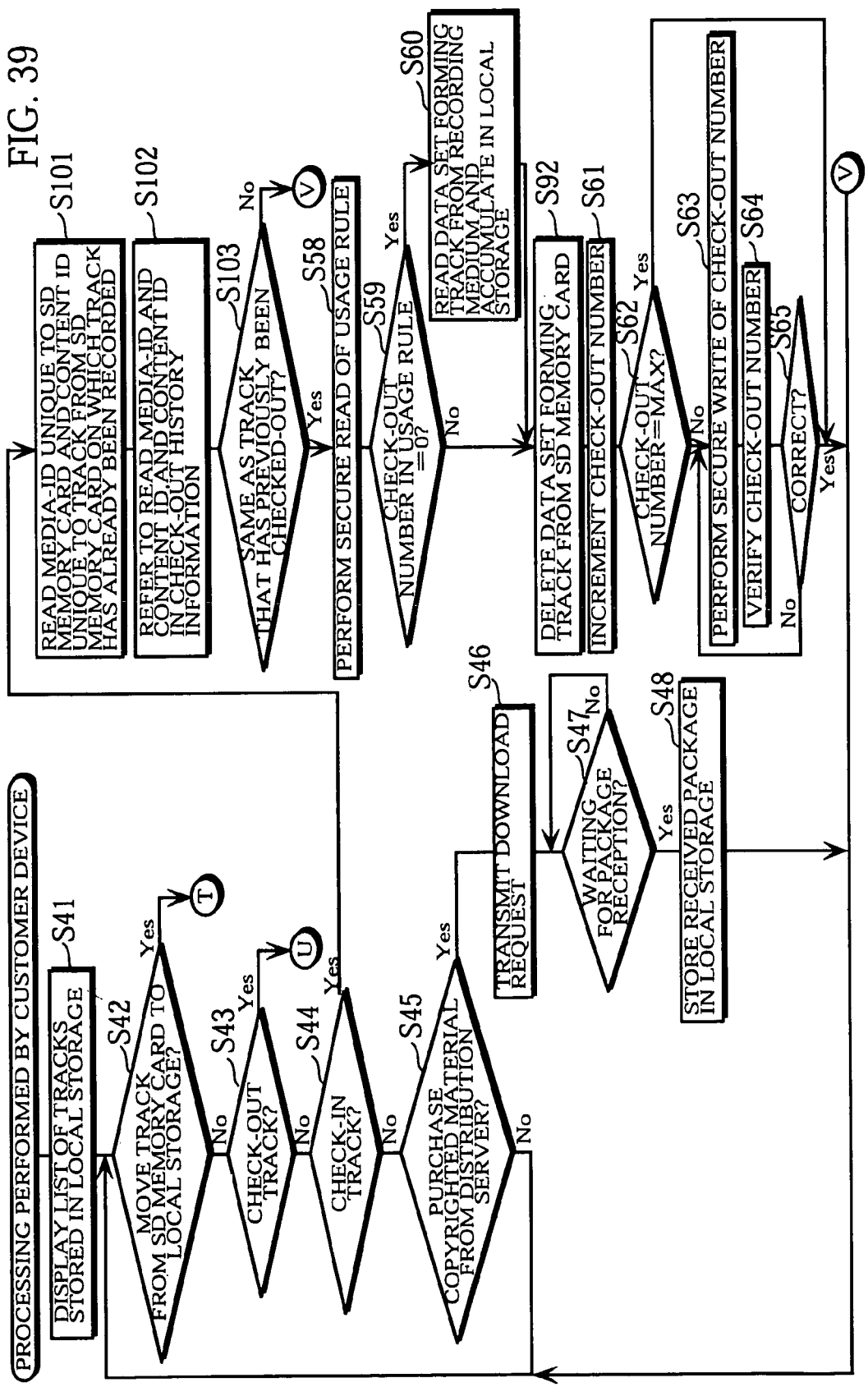
FIGS. 39 to 41 are flowcharts showing the procedure performed by a library control unit 37.
Figure 40:
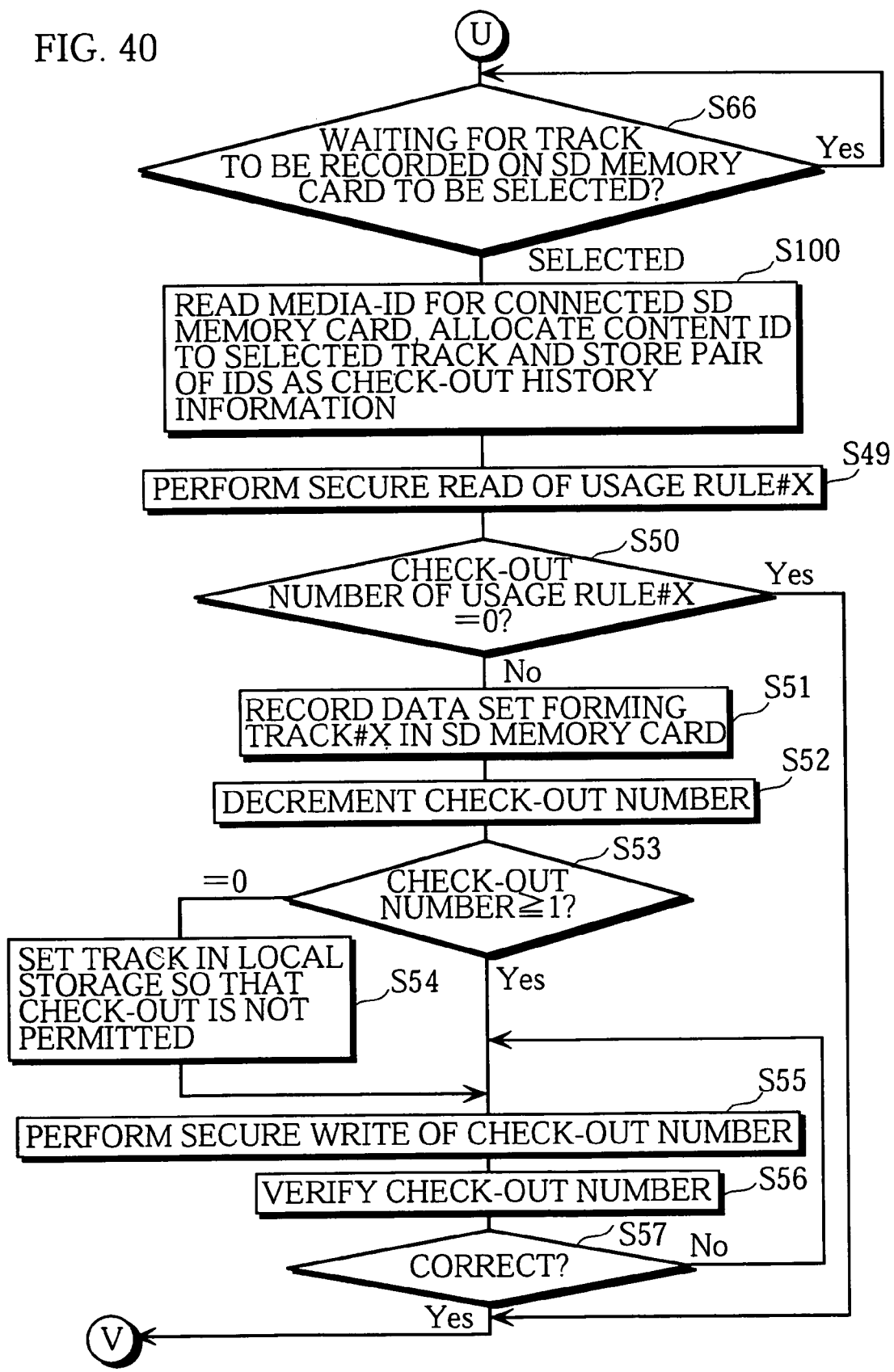
Figure 41:
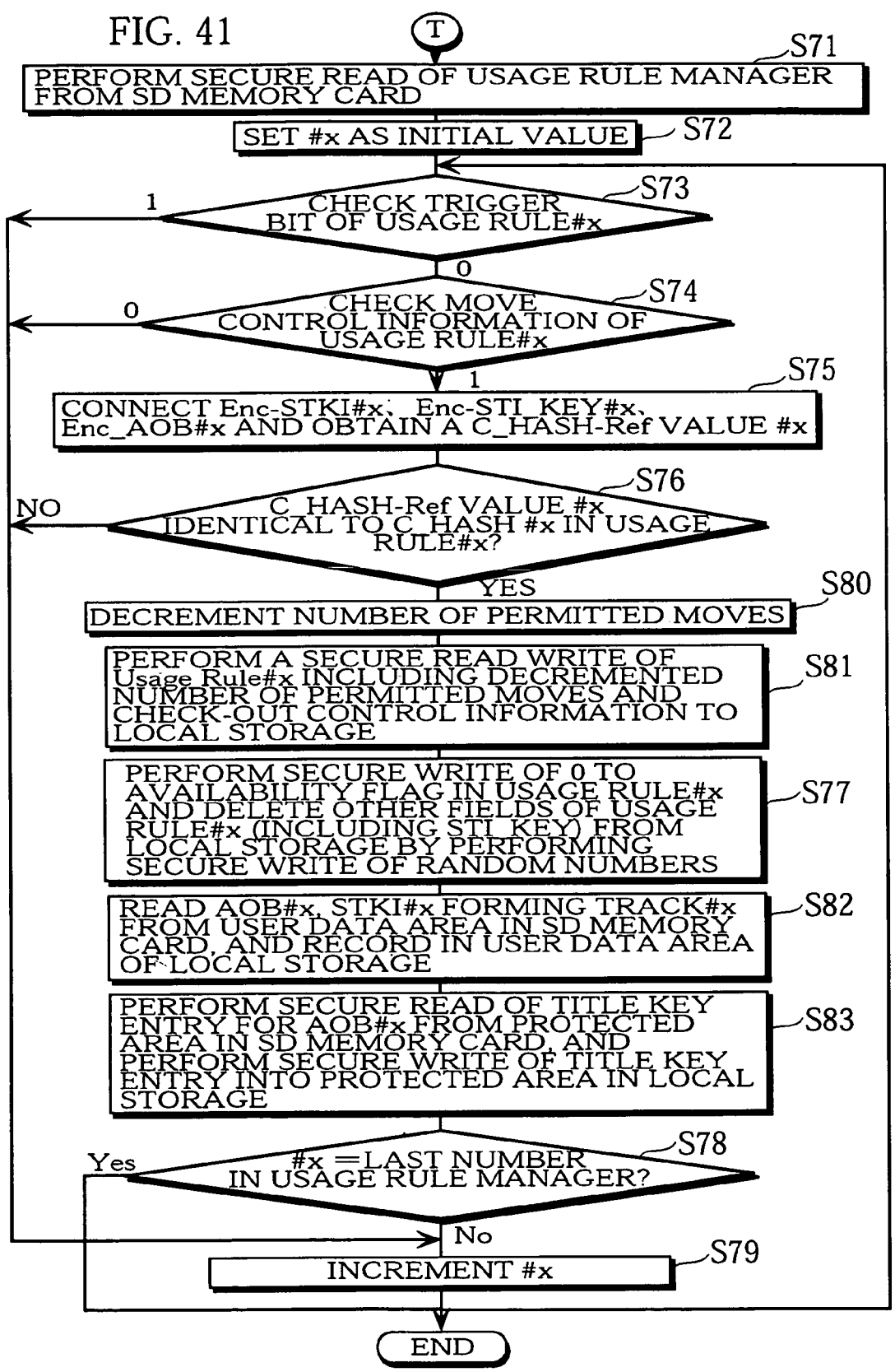

The library control unit 37 includes ROM (read-only memory) storing an executable program written so as to perform combined control of the digital terminal, RAM (random access memory) and a CPU (central processing unit). The flowcharts of FIGS. 39 to 41 show the procedure performed by this executable program. The control content of the library control unit 37 is explained with reference to these flowcharts. When the processing of the flowchart in FIG. 39 is initiated, at step S41, the library control unit 37 displays a list of tracks stored in the local storage 32, and then moves to the loop processing of steps S42 and S43. At step S42, the library control unit 37 determines whether a track move has been requested, and, at step S43, whether a track check-out has been requested. At step S44, the library control unit 37 determines whether a track check-in has been requested, and at step S45 whether a purchase of copyrighted material from a server computer has been requested. If a request to purchase copyrighted material from the server computer has been made, step S45 is Yes and processing moves to step S46. At step S46, the library control unit 37 has a download request transmitted to the communication unit 33, and at step S47 waits to receive a package. If the package is received, the same processing as the processing of the flowchart of FIG. 37 performed by the digital terminal is performed, and at step S48, the library control unit 37 stores the received package in the local storage 32. Processing then moves to steps S42 to S45.

If a request to move a track from the SD memory card 100 to the local storage 32 is made, step S42 is Yes, processing moves to step S71 shown in FIG. 41, and the library control unit 37 performs a secure read of the Usage Rule Manager from the SD memory card 100. In the following explanation, a plurality of tracks stored on the SD memory card 100 are each indicated by a variable #x. At step S72, the library control unit 37 writes an initial value into #x, and at step S73, checks the Trigger Bit of Usage Rule#x. If the Trigger Bit is 1, processing is moved to the next track by moving to step S79 and incrementing the variable #x. Then processing moves to step S73. If the Trigger Bit is 0, at step S74, the library control unit 37 checks the Move Control Information of Usage Rule#x. If the number of permitted moves shown in the Move. Control Information is 0, moving the track from the SD memory card 100 to local storage 32 is prohibited, so that processing is moved to the next track by moving to step S79 and incrementing the variable #x. Then, processing moves to step S73. If the Move Control Information is 1, processing moves to step S75.

At step S75, the library control unit 37 concatenates Enc-STKI#x, Enc-STI_KEY#x, Enc_AOB#x, and obtains C_HASH-Ref value #x. Then, at step S76, the library control unit 37 determines whether the value #x of the C_HASH-Ref is identical to C_HASH#x in the Usage Rule#x. If the two are not identical, processing moves to step S79, but if they are identical, at step S80, the library control unit 37 decrements the number of permitted moves shown in the Move Control Information of the Usage Rule#x, and at step S81, performs a secure write of the Usage Rule#x including the decremented number of permitted moves, and the Check-Out Control Information to the local storage 32. Next, at step S77, the library control unit 37 performs a secure write of 0 into the Availability Flag in Usage Rule#x on the SD memory card 100 and into the Content ID, and performs a secure write of random numbers into the other fields of the Usage Rule#x, including STI_KEY, thereby deleting Usage Rule#x from the SD memory card 100. In addition, the library control unit 37 makes the TKI#x in the SD_AUDIO.TKM file invalid, and deletes all information relating to TKI#x from the default Playlist in the SD_AUDIO.PLM file. Then, the library control unit 37 subtracts 1 from a POB file reference counter included in the file POB000.POM referenced by TKI#x. If the reference counter is 0 when data is moved, the library control unit 37 deletes the POB file.

Following this, at step S82, the library control unit 37 reads an AOB#x and an STKI#x forming a track#x from the user data area 8 on the SD memory card 100, and records the read data in the user data area of the local storage 32. At step S83, the library control unit 37 performs a secure read of a Title Key Entry for AOB#x from the protected area 3 of the SD memory card 100, and then performs a secure write of the read Title Key Entry into the protected area of the local storage 32. Thus, the data set forming the track#x is stored into the local storage 32.

Following this, at step S78, the library control unit 37 determines whether the variable #x is the last number in the Usage Rule Manager, and if it is not the last number, at step S79, increments #x. Then processing moves to step S73.

Once this processing has been repeated for all of the Usage Rules in the Usage Rule Manager, the library control unit 37 moves all of the tracks on the SD memory card 100 for which a move is permitted to the local storage 32. A large number of copyrighted materials are accumulated in the local storage 32 in the customer device when the user purchases copyrighted materials from the distribution server 103 or moves copyrighted materials from the SD memory card 100. These accumulated copyrighted materials form a home music library.

If a track check-out is requested, step S43 is Yes, and processing moves to step S66 in FIG. 40. At step S66, the library control unit 37 waits for the user to select a track to be recorded onto a recording medium other than the SD memory card 100. Once a track is selected (the selected track is called track #x), at step S100, the library control unit 37 reads a unique Media-ID from the SD memory card 100 connected to the customer device, searches for an unused Content ID, which it then assigns to the content and stores the Media-ID and Content ID for the Title Key Entry as a pair as check-out history information. Then, at step S49, the library control unit 37 performs a secure read of the Usage Rule#x corresponding to the track#x. At step S50, the library control unit 37 determines whether the number of times check-out is permitted (the number of check-outs) shown in the Check-Out Information of the Usage Rule#x is 0. If the number is 0, the library control unit 37 skips the processing of steps S51 to S57, and moves to the steps S42 to S45. If the number is not 0, however, at step S51, the library control unit 37 records the data set forming the track #x (apart from the Usage Rule) onto another recording medium. When check-out is performed, data from the directory and file structure shown in FIG. 12 compliant with the SD-Audio Ver1.0 is recorded on a portable recording medium, in other words the files 'AOB*.SA1', 'POB*.SP1', 'SD_AUDIO.TKM', 'SD_AUDIO.PLM', 'POB000.POM', 'AOBSA1.KEY', and 'POBSP1.KEY'. A track is recorded by this process, allowing track editing, such as combining and dividing, and forward and backward searches to be performed.

Next, the library control unit 37 decrements the number of check-outs, and at step S53, determines whether the number of check-outs is 0, or 1 or more. If the number of check-outs is 0, the library control unit 37, at step S54 sets the track as 'check-out not permitted' and then moves to step S55. If the number of check-outs is 1 or more, the library control unit 37, at step S55, performs a secure write of the decremented number of check-outs to a Usage Rule in the local storage 32. Then, at step S56, the library control unit 37 verifies the number of check-outs in the Usage Rule, and at step S57 determines whether the number of check-outs has been properly written in the Usage Rule. If the number of check-outs has been properly written, processing moves to the loop processing of steps S42 to S45.

If the user requests check-in, step S44 is Yes, and at step S101, the library control unit 37 reads a Media-ID unique to the SD memory card 100, and a Content ID unique to a track from the SD memory card 100, tracks already having been recorded on the SD memory card 100. At step S102, the library control unit 37 compares the paired Media-ID and Content ID, and the Media-ID and Content ID in the Check-Out history information, and at step S103 determines whether the tracks recorded on the SD memory card 100 are identical to tracks that have already been checked out. If a track is identical, in other words the same as a track that has been checked out, processing moves to step S58, but if the track is not identical, in other words not the same as a track that has been checked out, the library control unit 37 moves to steps S42 to S45 without performing check-in processing.

As step S58, the library control unit 37 performs a secure read of a Usage Rule from the protected area of the local storage 32, and, at step S59, determines whether the number of check-outs in the Usage Rule is 0. If the number of check-outs is 0, at step S60, the library control unit 37 reads the data set forming the track, apart from the Usage Rule, to a recording medium to perform check-in, and, once the data set has been accumulated in the local storage 32, moves to step S92. If the number of check-outs is 1 or more, processing moves to step S92. At step S92, the library control unit 37 deletes the data set forming the track from the other recording medium. As step S61, the library control unit 37 increments the number of check-outs, and at step S62, determines whether the number of check-outs has reached a maximum number Max. If the number of check-outs is Max, processing moves to the loop of steps S42 to S45, but if the number of check-outs is not Max, at step S63, it performs a secure write of the number of check-outs and, at step S64, verifies the number of check-outs. At step S65, the library control unit 37 determines whether the secure write of the number of check-outs was properly performed, and if so moves to the processing loop of steps S42 to S45.

In the first embodiment, management of recording of copies of copyrighted materials recorded in a KIOSK terminal can be performed using a personal computer, so a user who has paid the correct charge to purchase a copyrighted material from a KIOSK terminal can perform check-out and check-in of the copyrighted material using their own personal computer.

SECOND EMBODIMENT

Figure 42:
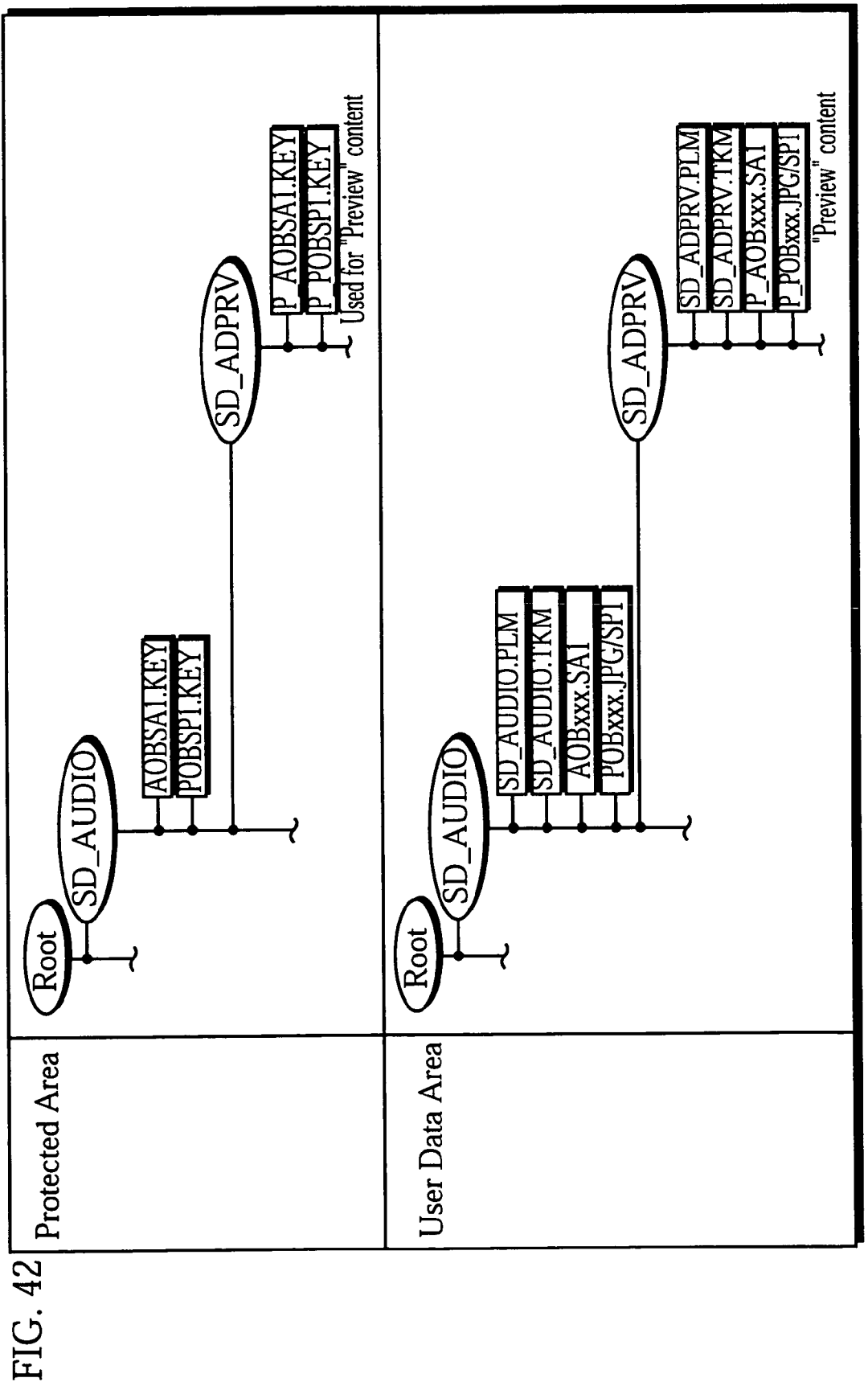
FIG. 42 shows a directory structure of a protected area and user data area related to a second embodiment.

A second embodiment relates to an improvement in the SD memory card 100 that securely stores copyrighted materials, which allows copyrighted materials to be previewed. FIG. 42 shows the structure of directories in a protected area 3 and user data area 8 relating to the second embodiment. When compared to the directory structure in FIG. 12, the new matter introduced in FIG. 42 is that the SD_AUDIO directory in both the protected area 3 and the user data area 8 has a sub-directory SD_ADPRV. Files 'SD_ADPRV.PLM', 'SD_ADPRV.TKM', 'P_AOB*.SA1', and 'P_POB*.JPG/SP1' used to perform preview are arranged in the SD_ADPRV directory in the user data area 8. The files 'SD_ADPRV.PLM' and 'SD_ADPRV.TKM' have an identical data structure to the files 'SD_AUDIO.PLM' and 'SD_AUDIO.TKM' in the SD-Audio standard, and differ only in that they are arranged in a different directory. The files 'P_AOB*.SA1' and 'P_POB*.JPG/SP1' are arranged in a different directory and use a different encryption key for encryption from corresponding files in the SD-Audio standard, but are otherwise identical.

Figure 43:
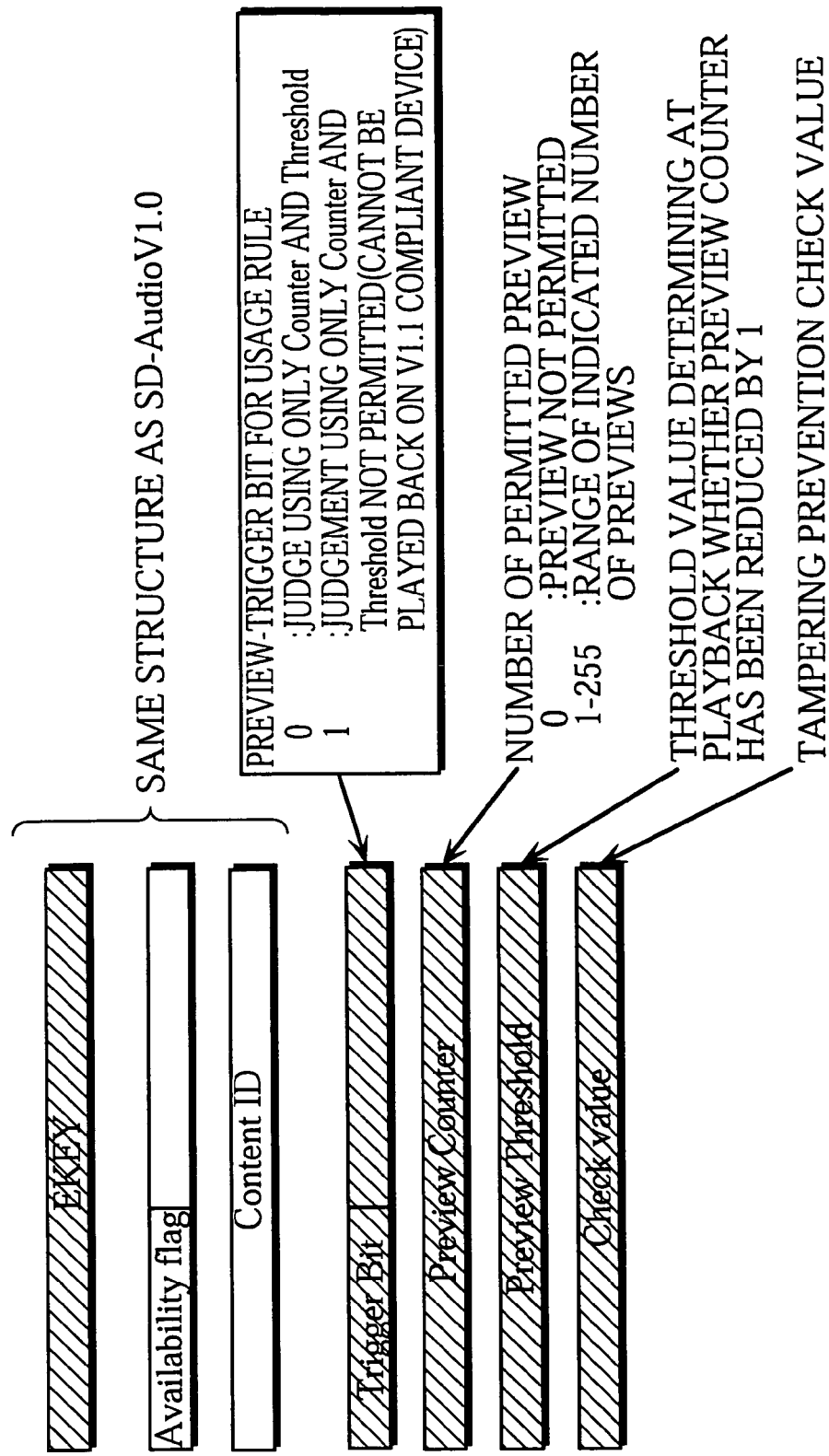
FIG. 43 shows a data structure of Extended Title Key Entry included in P_AOBSA1.KEY.

Files 'P_AOBSA1.KEY' and 'P_POBSP1.KEY' are arranged in the directory SD_ADPRV in the protected area 3. The file 'P_AOBSA1.KEY' includes a plurality of Extended Title Key Entries. The data structure of these Extended Title Key Entries is shown in FIG. 43. Part of the data structure in the drawing is the same as that for Title Key Entries, but it differs in having an additional preview fields. In the format for the Extended Title Key Entries shown in FIG. 43, these preview-fields include 'Trigger Bit', 'Preview Counter', 'Preview Threshold', and 'Check-Value Field'.

The 'Trigger Bit' field is a flag having the same purpose as the Trigger Bit in the Usage Rules. When this flag is set at 0, this indicates that judgement of whether to preview a copyrighted material should be performed by referring to the pair of Preview Counter and Preview Threshold, while if the flag is set at 1, this indicates that judgement should be performed by referring to other information in addition to the pair of Preview Counter and Preview Threshold.

The 'Preview Counter' field shows a number of permitted previews in a range of between 1 and 255, and is set based on the Playback Counter in DRM of the Default Offer shown in FIG. 11.

The 'Preview Threshold' field indicates that a number of previews should be increased by 1 once the copyrighted material has been played back for a certain number of seconds, and is set based on the Playback Time in the DRM of the Default Offer shown in FIG. 11.

The 'Check-Value Field' records a character string pattern for checking. If decryption of the Extended Title Key Entries is properly obtained in C_CBC mode, the device can obtain the character string pattern properly from this field, but if the Extended Title Key Entries have been tampered with while still encrypted, the device cannot obtain the character string pattern from the field. The reason for this is described below.

The decryption performed in C_CBC mode is performed in 8-byte units using a 7-byte Media-ID and a section key. Here, suppose an ill-intentioned user tampers with the Preview Counter and Preview Threshold while they are still encrypted, changing them to a different value. In this case, the section key obtained by using the section key of the 8-bit block including the Preview Counter and Preview Threshold will differ markedly from that which should be used. If decryption of a following block is performed using this section key, the calculation result finally obtained by decrypting the block including the character string pattern differs markedly from the character string pattern described above. In this way, a proper character string pattern can only be decrypted when the encrypted Preview Counter and Preview Threshold are in a normal state. If the Preview Counter and Preview Threshold have been tampered with, a tampered AOB file will be received, and the character string pattern in the Check-Value Field will be completely different. Thus, the characteristics of the character string pattern can be used to check whether the Preview Counter and Preview Threshold have been tampered with.

Figure 44:
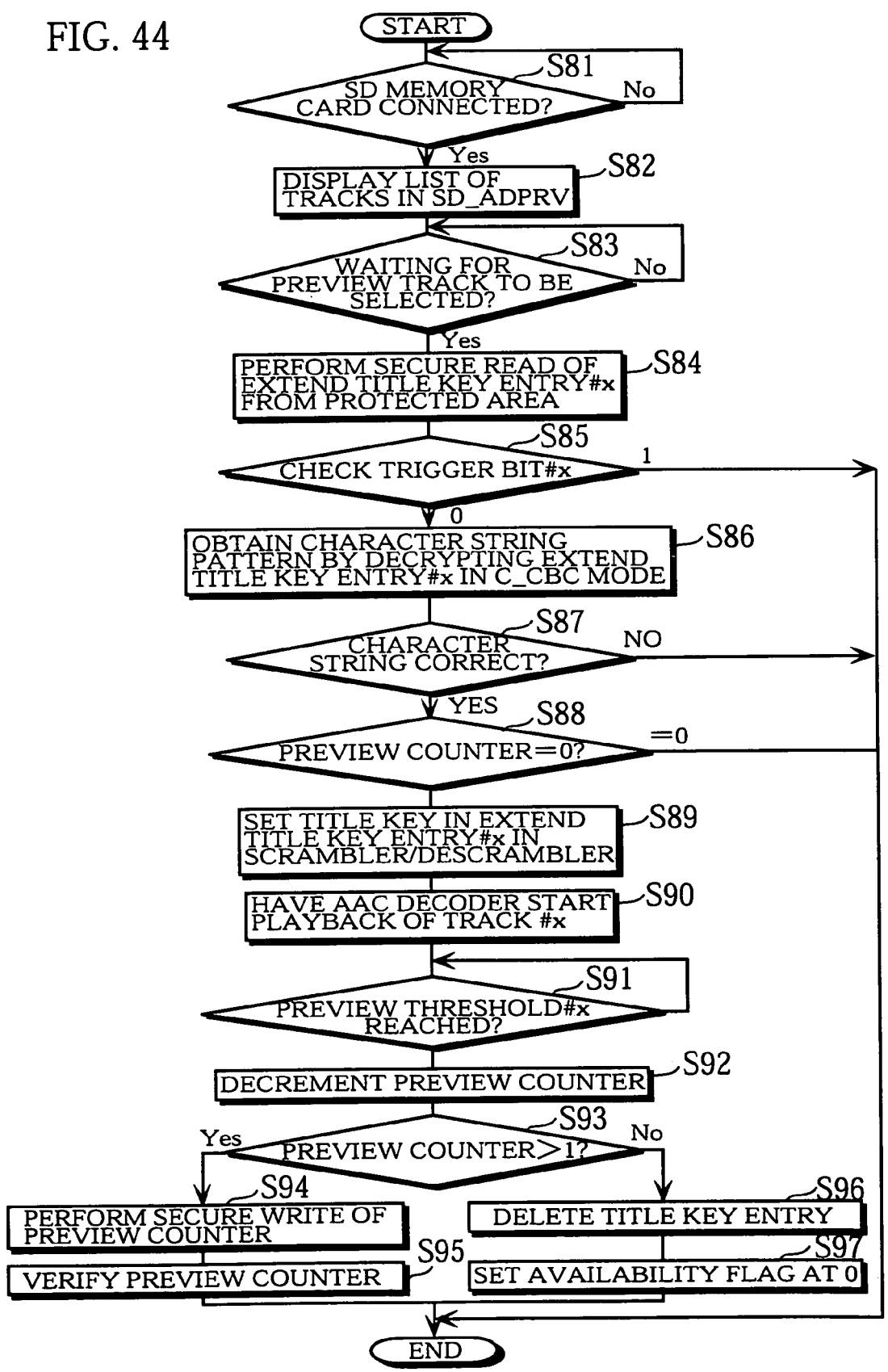
FIG. 44 is a flowchart showing the content of processing performed by the library control unit 37 when previewing.

Next, the processing performed by SD-Audio players 122 to 124 in the second embodiment is explained. The flowchart of FIG. 44 shows the processing performed by the control unit 64 in the SD-Audio players 122 to 124 when a copyrighted material is previewed using an Extended Title Key Entry shown in FIG. 43. The following is an explanation of the processing performed by the control unit 64 in the second embodiment, with reference to FIG. 44.

At step S81, the control unit 64 determines whether the SD memory card 100 is connected to the card connecter 34 and, if the answer is Yes, at step S82, displays a list of the tracks in the SD_ADPRV directory of the SD memory card 100. At step S83, the control unit 64 waits for the user to select a track to be previewed. Here, the track selected by the user is a track #x, and at step S84, the control unit 64 performs a secure read of an Extended Title Key Entry#x for the track #x from the protected area 3. Following this, the control unit 64, at step S85, checks Trigger Bit#x, and if Trigger Bit#x is 1, ends processing without performing steps S86 to S96. If the Trigger Bit#x is 0, at step S86, the control unit 64 obtains a character string pattern by performing C_CBC mode decryption on the Extended Title Key Entry#x. At step S87, the control unit 64 determines whether the character string pattern is normal. If it is abnormal, processing ends, but if it is normal, at step S88, the control unit 64 determines whether the Preview Counter is 0. If the Preview Counter is 0, processing ends, but if it is not, the control unit 64, at step S89, sets the Title Key of the Extended Title Key Entry#x in the descrambler 61 of the SD memory card 100. Following this, the control unit 64, at step S90, plays back track#x. At step S92, the control unit 64 waits until the playback time has reached the time shown by the Preview Threshold#x, and once the time has been reached, at step S92, decrements the Preview Counter. Next, at step S93, the control unit 64 determines whether the Preview Counter is 1 or more, or 0. If it is 1 or more, the control unit 64, at step S94, performs a secure write of the Preview Counter, and then, at step S95, verifies the Preview Counter. If the Preview Counter is 0, however, at step S96, the control unit 64 deletes the Extended Title Key Entry, and at step S97, sets the Availability Flag at 0.

In the second embodiment, the Preview Counter and Preview Threshold are recorded in the protected area 3, making it difficult to tamper with them. This allows users to preview copyrighted materials, while ensuring that those same copyrighted materials remain properly protected.

These embodiments describe the maximum effects that can be expected under current conditions, but the invention need not be limited to the structure described herein. The following alternatives are also possible.

(a) The SD memory card in the first and second embodiments has a user data area 8 and a protected area 3, but the invention need not be limited to this, and the entire memory area of the SD memory card 100 may be a protected area. The SD memory card 100 is used as a recording medium, but the recording medium need not be limited to semiconductor memory such as this, and an optical disc, HD or the like may be used provided that it has a protected area.

(b) In the first and second embodiments, a single copyrighted material corresponds to a package and a collection of copyrighted materials such as an album corresponds to a title, but a collection of copyrighted materials may be transmitted as a single package.

(c) The following may be used as requirements when previewing tracks: date (preview can be performed until a certain date), number of preview days (preview can be performed for a certain time or a certain number of days), preview range (preview can be performed on a specified section of the track), or any combination of the above.

(d) The data described as being recorded and played back in the first and second embodiments is limited to music and still picture data, but such limitations need not apply. The data may be any kind of reproduceable digital data, such as moving picture data, text data or any combination of the two.

(e) The digital terminal in the first embodiment refers to the Move Control Information in the DRM and sets the Move Control Information in the Usage Rule based on the DRM, but the digital terminal may refer to other information, and set the Move Control Information in the Usage Rule according to other criteria. For example, the Move Control Information may be set by considering information such as the hit chart ranking of copyrighted materials, whether the copyrighted material is a new release, and the sales figures for the copyrighted material.

(f) The encrypted data, plain text data, encryption key, and Usage Rule written in local storage may be read, and determination of whether the number of permitted moves in the Usage Rule is 0, or 1 or more performed, and if the number of permitted moves is 1 or more, the data may be stored on the SD memory card 100.

Figure 45:
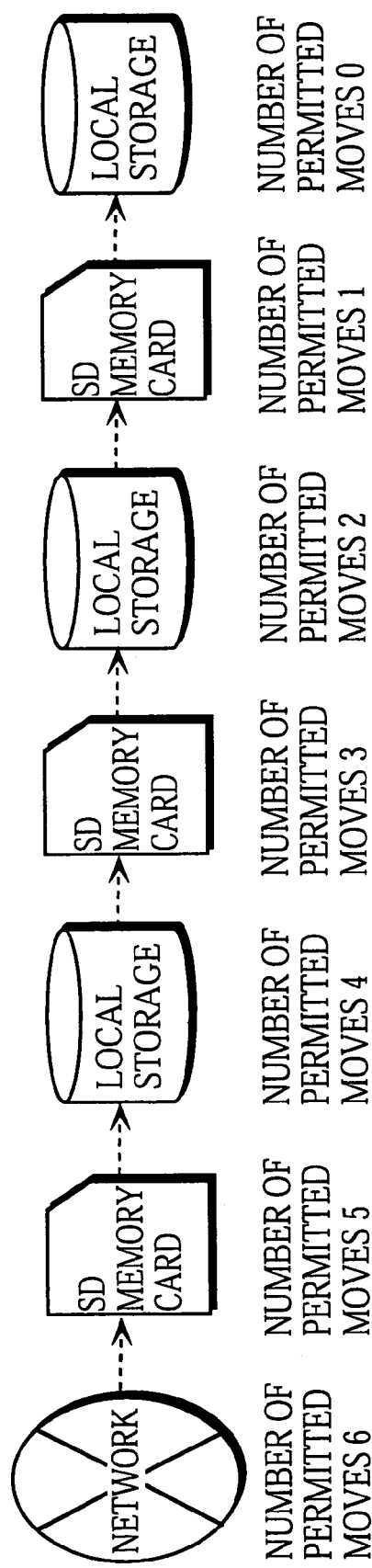
FIG. 45 shows a situation in which a copyrighted material is moved the permitted number of moves, when the permitted number of moves is set at six.

(g) In the first embodiment, the setting of the permitted number of moves on the SD memory card 100 is assumed to be either 1 or 0, but other settings are also possible. If the permitted number of moves in the Move Control Information is set at 6 by the distribution server 103, the permitted number of moves shown in the Move Control Information is changed and the Usage Rule is moved between each of the recording media, as shown in FIG. 45.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A distribution system for recording a copy of compressed audio content using variable-length encoding onto a recording medium and supplying the content to a playback apparatus, said distribution system comprising:

a distribution server operable to distribute the content via a network;

a first receiving apparatus operable to receive the content via the network, said first receiving apparatus comprising a first receiving unit operable to receive, via the network, a data set including the content and control information controlling copying of the content onto the recording medium, and to hold the received data set, and a recording unit operable to generate authorization information showing whether moving the data set to another receiving apparatus is permitted, and to record the content onto a distribution medium together with corresponding usage rule information including (1) the authorization information, and (2) the control information included in the data set; and a second receiving apparatus operable to receive the content via the network, said second receiving apparatus comprising a second receiving unit operable to receive the data set from said distribution server via the network, and to hold the received data set, a data set moving unit operable to read authorization information from the distribution medium, and (a) to move the data set from the distribution medium to the inside of said second receiving apparatus by removing the data set from the distribution medium, and (b) to hold the data set, only when the read authorization information shows that moving the data set is permitted, and a check-out unit operable to perform check-out when the data set is held by one of said second receiving unit and said data set moving unit, to perform the check-out based on the control information in the held data set by generating a copy of the content included in the held data set and recording the copy onto the recording medium, the copy recorded onto the recording medium being supplied to the playback apparatus, wherein said recording unit is further operable to record, into a rule management file provided in the distribution medium, the content as a plurality of contents together with corresponding usage rule information, wherein the entirety of at least one of the plurality of contents is contained in a single object file, and at least one of the plurality of contents is divided to be contained in a plurality of object files, wherein each object file has an assigned serial number that uniquely identifies the object file, wherein the rule management file contains a plurality of rule entries that are in one-to-one correspondence with the object files, wherein each rule entry has a same serial number as a serial number of a corresponding object file, wherein a rule entry that corresponds to the object file containing the entirety of the content includes corresponding usage rule information and a content identifier for the content, wherein each of a plurality of rule entries that corresponds to an object file containing a part of the at least one of the plurality of contents, which is divided, includes a content identifier for the at least one of the plurality of contents, which is divided, and one of the plurality of the rule entries includes corresponding usage rule information, wherein the distribution medium has recorded thereon pieces of track information that are in one-to-one correspondence with the object files, wherein the track information includes a time search table that shows a plurality of read addresses specifying data located in a corresponding object file at predetermined time intervals, and wherein each part of the divided content has such a length that a corresponding time search table includes at most a predetermined number of read addresses.

2. The distribution system of claim 1, wherein the control information indicates a number of remaining check-outs, wherein said check-out unit includes a connecting unit operable to connect to a recording medium, and is operable to record a copy of the content included in the data set held by said data set moving unit onto the recording medium when a copy of the held content is not already recorded on the connected recording medium, and the number of remaining check-outs shown by the control information held by one of said second receiving unit and said data set moving unit is at least one, and wherein said second receiving apparatus further comprises a check-in unit operable to delete, when a copy of the content is already recorded on the connected recording medium, the copy of the content recorded on the connected recording medium, and an updating unit operable to update the control information of the held content by decrementing the number of remaining check-outs when a copy of the held content is newly recorded on the recording medium, and incrementing the number of remaining check-outs when the copy of the held content is deleted from the recording medium.

3. The distribution system of claim 2, wherein the recording medium has an assigned unique recording medium identifier, wherein said check-out unit includes an allocation unit operable to allocate a unique content identifier to the held content, the unique content identifier being recorded onto the recording medium with the content when check-out is performed, and a storage unit operable to read the unique recording medium identifier for the recording medium connected to said connecting unit from the recording medium, and to store the read unique recording medium identifier as a pair with the allocated unique content identifier, and wherein said check-in unit includes a read unit operable to read, when a copy of the content has already been recorded on a recording medium connected to said connecting unit, the unique identifiers for the connected recording medium and the content, a comparing unit operable to compare the pair of identifiers read by said read unit with the pair of identifiers stored by said storage unit to determine whether the copy recorded on the connected recording medium was previously produced by said second recording apparatus, and a holding unit operable to read, when the copy was previously produced by said second recording apparatus, the copy from the connected recording medium, to hold the read copy, and then to delete the copy from the recording medium.

4. The distribution system of claim 3, wherein, when the authorization information recorded on the distribution medium shows that moving a corresponding data set is not permitted, said reading unit is not operable to read the content and the usage rule information, and wherein the playback apparatus is operable to play back the corresponding content directly from the distribution medium, when the authorization information indicates that moving a corresponding data set is not permitted.

5. A semiconductor memory card used as a distribution medium in a distribution system, the distribution system including a distribution server for distributing a compressed audio content using variable-length coding via a network, a first receiving apparatus for receiving the content via the network and recording the content onto a distribution medium, a second receiving apparatus for receiving the content via the distribution medium and recording a copy of the content onto a recording medium by removing the content from the distribution medium, and a playback apparatus for receiving the copy of the content via the recording medium and playing back the received content, said semiconductor memory card comprising:

a volume area in which the content and usage rule information are recorded, the usage rule information including control information controlling copying of the content recorded onto the recording medium, and authorization information showing whether moving the control information and the content to the second receiving apparatus is permitted, wherein the content comprises a plurality of contents that are recorded onto the semiconductor memory card together with corresponding usage rule information, the usage rule information being contained in a rule management file that is provided in the semiconductor memory card, wherein the entirety of at least one of the plurality of contents is contained in a single object file, and at least one of the plurality of contents is divided so as to be contained in a plurality of object files, wherein each object file has an assigned serial number that uniquely identifies the object file, wherein the rule management file contains a plurality of rule entries that are in one-to-one correspondence with the object files, wherein each rule entry has a same serial number as a serial number of a corresponding object file, wherein a rule entry that corresponds to the object file containing the entirety of the content includes corresponding usage rule information and a content identifier for the content, wherein each of a plurality of rule entries that corresponds to an object file containing a part of the at least one of the plurality of contents, which is divided, includes a content identifier for the at least one of the plurality of contents, which is divided, and one of the plurality of the rule entries includes corresponding usage rule information, wherein the semiconductor memory card has recorded thereon pieces of track information that are in one-to-one correspondence with the object files, wherein the track information includes a time search table that shows a plurality of read addresses specifying data located in a corresponding object file at predetermined time intervals, and wherein each part of the divided content has such a length that a corresponding time search table includes at most a predetermined number of read addresses.

6. The semiconductor memory card of claim 5,
wherein each of the plurality of contents includes encrypted audio data and a corresponding encryption key used to encrypt the encrypted audio data,
wherein said volume area includes
a user data area that stores (1) the object file containing the entirety of encrypted audio data included in a corresponding content and (2) the plurality of object files each containing a part of encrypted audio data, the part of encrypted audio data together constituting the entirety of encrypted audio data included in a corresponding content, and that can be accessed by a device connected to the semiconductor memory card regardless of whether the authenticity of the device has been recognized, and
a protected area that stores the rule management file containing the usage rule information and the encryption keys and that can only be accessed by a device connected to the semiconductor memory card when the authenticity of the device has been recognized, and
wherein the track information shows an attribute indicating whether the encrypted audio data in a corresponding object file constitutes an entire track, a start part of a track, a middle part of a track, or an end part of a track.

7. The semiconductor card of claim 5, wherein the authorization information shows that moving a corresponding content and control information is permitted by indicating a number of permitted moves.

8. A first receiving apparatus in a distribution system, the distribution system including a distribution server for distributing a compressed audio content using variable-length coding via a network, said first receiving apparatus for receiving the content via the network and recording the content onto a distribution medium, a second receiving apparatus for receiving the content via the distribution medium and recording a copy of the content onto a recording medium by removing the content from the distribution medium, and a playback apparatus for receiving the copy of the content via the recording medium and playing back the received content, said first receiving apparatus comprising:
a first receiving unit operable to receive via the network a data set including the content and control information controlling copying of the content onto the recording medium, and to hold the received data set; and
a recording unit operable to generate authorization information showing whether moving the data set to another receiving apparatus is permitted, and to record the content onto a distribution medium together with corresponding usage rule information including (1) the authorization information, and (2) the control information included in the data set,
wherein the content comprises a plurality of contents that are recorded onto the distribution medium together with corresponding usage rule information, the usage rule information being contained in a rule management file that is provided in the distribution medium,
wherein the entirety of at least one of the plurality of contents is contained in a single object file, and at least one of the plurality of contents is divided so as to be contained in a plurality of object files,
wherein each object file has an assigned serial number that uniquely identifies the object file,
wherein the rule management file contains a plurality of rule entries that are in one-to-one correspondence with the object files,
wherein each rule entry has a same serial number as a serial number of a corresponding object file,
wherein a rule entry that corresponds to the object file containing the entirety of the content includes corresponding usage rule information and a content identifier for the content,
wherein each of a plurality of rule entries that corresponds to an object file containing a part of the at least one of the plurality of contents, which is divided, includes a content identifier for the at least one of the plurality of contents, which is divided, and one of the plurality of the rule entries includes corresponding usage rule information,
wherein the distribution medium has recorded thereon pieces of track information that are in one-to-one correspondence with the object files,
wherein the track information includes a time search table that shows a plurality of read addresses specifying data located in a corresponding object file at predetermined time intervals, and
wherein each part of the divided content has such a length that a corresponding time search table includes at most a predetermined number of read addresses.

9. A receiving apparatus for receiving contents from a distribution server via a network, as well as receiving contents via a distribution medium, and recording copies of a received content onto a recording medium, the distribution medium storing contents and corresponding usage rule information, and the usage rule information including control information controlling copying of a recorded content onto the recording medium, and authorization information showing whether moving a data set including a paired content and control information to said receiving apparatus is permitted, said receiving apparatus comprising:
a receiving unit operable to receive the data set from the distribution server via the network, and to hold the received data set;
a data set moving unit operable to read authorization information from the distribution medium, and (a) to move the data set from the distribution medium to the inside of said receiving apparatus by removing the data set from the distribution medium, and (b) to hold the data set, only when the read authorization information shows that moving the data set is permitted; and
a check-out unit operable to perform check-out when the data set is held by one of said receiving unit and said data set moving unit, the performed check-out being based on the control information in the held data set by generating a copy of the content included in the held data set and recording the copy onto the recording medium, the copy recorded onto the recording medium being supplied to the playback apparatus,
wherein the content comprises a plurality of contents that are recorded onto the distribution medium together with corresponding usage rule information, the usage rule information being contained in a rule management file that is provided in the distribution medium,
wherein the entirety of at least one of the plurality of contents is contained in a single object file, and at least one of the plurality of contents is divided so as to be contained in a plurality of object files,
wherein each object file has an assigned serial number that uniquely identifies the object file,
wherein the rule management file contains a plurality of rule entries that are in one-to-one correspondence with the object files, wherein each rule entry has a same serial number as a serial number of a corresponding object file, wherein a rule entry that corresponds to the object file containing the entirety of the content includes corresponding usage rule information and a content identifier for the content, wherein each of a plurality of rule entries that corresponds to an object file containing a part of the at least one of the plurality of contents, which is divided, includes a content identifier for the at least one of the plurality of contents, which is divided, and one of the plurality of the rule entries includes corresponding usage rule information, wherein the distribution medium has recorded thereon pieces of track information that are in one-to-one correspondence with the object files, wherein the track information includes a time search table that shows a plurality of read addresses specifying data located in a corresponding object file at predetermined time intervals, wherein each part of the divided content has such a length that a corresponding time search table includes at most a predetermined number of read addresses, and wherein the contents are compressed audio contents using variable-length coding.

10. A recording medium having recorded thereon, a computer-readable program capable of instructing a computer to perform processing as a first receiving apparatus in a distribution system, the distribution system including a distribution server for distributing a compressed audio content using variable-length coding via a network, a first receiving apparatus for receiving the content via the network and recording the content onto a distribution medium, a second receiving apparatus for receiving the content via the distribution medium and recording a copy of the content onto a recording medium by removing the content from the distribution medium, and a playback apparatus for receiving the copy of the content via the recording medium and playing back the received content, said computer-readable program being capable of instructing a computer to:

receive via the network a data set including the content and control information controlling copying of the content onto the recording medium, and hold the received data set; and generate authorization information showing whether moving the data set to another receiving apparatus is permitted, and record the content onto a distribution medium together with corresponding usage rule information including (1) the authorization information, and (2) the control information included in the data set, wherein the content comprises a plurality of contents that are recorded onto the distribution medium together with corresponding usage rule information, the usage rule information being contained in a rule management file that is provided in the distribution medium, wherein the entirety of at least one of the plurality of contents is contained in a single object file, and at least one of the plurality of contents is divided so as to be contained in a plurality of object files, wherein each object file has an assigned serial number that uniquely identifies the object file, wherein the rule management file contains a plurality of rule entries that are in one-to-one correspondence with the object files, wherein each rule entry has a same serial number as a serial number of a corresponding object file, wherein a rule entry that corresponds to the object file containing the entirety of the content includes corresponding usage rule information and a content identifier for the content, wherein each of a plurality of rule entries that corresponds to an object file containing a part of the at least one of the plurality of contents, which is divided, includes a content identifier for the at least one of the plurality of contents, which is divided, and one of the plurality of the rule entries includes corresponding usage rule information, wherein the distribution medium has recorded thereon pieces of track information that are in one-to-one correspondence with the object files, wherein the track information includes a time search table that shows a plurality of read addresses specifying data located in a corresponding object file at predetermined time intervals, and wherein each part of the divided content has such a length that a corresponding time search table includes at most a predetermined number of read addresses.

11. A recording medium having recorded thereon, a computer-readable program capable of instructing a computer to perform processing as a receiving apparatus for receiving contents from a distribution server via the network, as well as receiving contents via a distribution medium, and recording copies of a received content onto a recording medium, the distribution medium storing contents and corresponding usage rule information, the usage rule information including control information controlling copying of a recorded content onto the recording medium, and authorization information showing whether moving a data set including a paired content and control information to the receiving apparatus is permitted, said computer-readable program being capable of instructing the computer to:

receive the data set from the distribution server via the network, and hold the received data set;

read authorization information from the distribution medium, and (a) move the data set from the distribution medium to the inside of said computer by removing the data set from the distribution medium, and (b) hold the data set, only when the read authorization information shows that moving the data set is permitted; and perform check-out when the data set is held by one of said receiving and said reading, moving and holding, the check-out being performed based on the control information in the held data set by generating a copy of the content included in the held data set and recording the copy onto the recording medium, the copy recorded onto the recording medium being supplied to a playback apparatus, wherein the content comprises a plurality of contents that are recorded onto the distribution medium together with corresponding usage rule information, the usage rule information being contained in a rule management file that is provided in the distribution medium, wherein the entirety of at least one of the plurality of contents is contained in a single object file, and at least one of the plurality of contents is divided so as to be contained in a plurality of object files, wherein each object file has an assigned serial number that uniquely identifies the object file, wherein the rule management file contains a plurality of rule entries that are in one-to-one correspondence with the object files, wherein each rule entry has a same serial number as a serial number of a corresponding object file, wherein a rule entry that corresponds to the object file containing the entirety of the content includes corresponding usage rule information and a content identifier for the content, wherein each of a plurality of rule entries that corresponds to an object file containing a part of the at least one of the plurality of contents, which is divided, includes a content identifier for the at least one of the plurality of contents, which is divided, and one of the plurality of the rule entries includes corresponding usage rule information, wherein the distribution medium has recorded thereon pieces of track information that are in one-to-one correspondence with the object files, wherein the track information includes a time search table that shows a plurality of read addresses specifying data located in a corresponding object file at predetermined time intervals, wherein each part of the divided content has such a length that a corresponding time search table includes at most a predetermined number of read addresses, and wherein the contents are compressed audio contents using variable-length coding.

12. A receiving method performed by a first receiving apparatus in a distribution system, the distribution system including a distribution server for distributing a compressed audio content using variable-length coding via a network, the first receiving apparatus for receiving the content via the network and recording the content onto a distribution medium, a second receiving apparatus for receiving the content via the distribution medium and recording a copy of the content onto a recording medium by removing the content from the recording medium, and a playback apparatus for receiving the copy of the content via the recording medium and playing back the received content, said receiving method comprising:

receiving, via network, a data set including the content and control information controlling copying of the content onto the recording medium, and holding the received data set; and generating authorization information showing whether moving the data set to another receiving apparatus is permitted, and recording the content onto a distribution medium together with corresponding usage rule information including (1) the authorization information, and (2) the control information included in the data set, wherein the content comprises a plurality of contents that are recorded onto the distribution medium together with corresponding usage rule information, the usage rule information being contained in a rule management file that is provided in the distribution medium, wherein the entirety of at least one of the plurality of contents is contained in a single object file, and at least one of the plurality of contents is divided so as to be contained in a plurality of object files, wherein each object file has an assigned serial number that uniquely identifies the object file, wherein the rule management file contains a plurality of rule entries that are in one-to-one correspondence with the object files, wherein each rule entry has a same serial number as a serial number of a corresponding object file, wherein a rule entry that corresponds to the object file containing the entirety of the content includes corresponding usage rule information and a content identifier for the content, wherein each of a plurality of rule entries that corresponds to an object file containing a part of the at least one of the plurality of contents, which is divided, includes a content identifier for the at least one of the plurality of contents, which is divided, and one of the plurality of the rule entries includes corresponding usage rule information, wherein the distribution medium has recorded thereon pieces of track information that are in one-to-one correspondence with the object files, wherein the track information includes a time search table that shows a plurality of read addresses specifying data located in a corresponding object file at predetermined time intervals, and wherein each part of the divided content has such a length that a corresponding time search table includes at most a predetermined number of read addresses.

13. A receiving method performed by a receiving apparatus for receiving contents from a distribution server via the network, as well as receiving contents via a distribution medium, and recording copies of a received content onto a recording medium, the distribution medium storing contents and corresponding usage rule information, the usage rule information including control information controlling copying of a recorded content onto the recording medium, and authorization information showing whether moving a data set including a paired content and control information to the receiving apparatus is permitted, said receiving method comprising:

receiving the data set from the distribution server via the network, and holding the received data set;

reading authorization information from the distribution medium, and (a) moving the data set from the distribution medium to the inside of the receiving apparatus by removing the data set from the distribution medium, and (b) holding the data set, only when the read authorization information shows that moving the data set is permitted; and performing check-out when the data set is held by one of said receiving and said reading, moving and holding, the check-out being performed based on the control information in the held data set by generating a copy of the content included in the held data set and recording the copy onto the recording medium, the copy recorded onto the recording medium being supplied to a playback apparatus, wherein the content comprises a plurality of contents that are recorded onto the distribution medium together with corresponding usage rule information, the usage rule information being contained in a rule management file that is provided in the distribution medium, wherein the entirety of at least one of the plurality of contents is contained in a single object file, and at least one of the plurality of contents is divided so as to be contained in a plurality of object files, wherein each object file has an assigned serial number that uniquely identifies the object file, wherein the rule management file contains a plurality of rule entries that are in one-to-one correspondence with the object files, wherein each rule entry has a same serial number as a serial number of a corresponding object file, wherein a rule entry that corresponds to the object file containing the entirety of the content includes corresponding usage rule information and a content identifier for the content, wherein each of a plurality of rule entries that corresponds to an object file containing a part of the at least one of the plurality of contents, which is divided, includes a content identifier for the at least one of the plurality of contents, which is divided, and one of the plurality of the rule entries includes corresponding usage rule information, wherein the distribution medium has recorded thereon pieces of track information that are in one-to-one correspondence with the object files, wherein the track information includes a time search table that shows a plurality of read addresses specifying data located in a corresponding object file at predetermined time intervals, and wherein each part of the divided content has such a length that a corresponding time search table includes at most a predetermined number of read addresses, and wherein the contents are compressed audio contents using variable-length coding.

* * * * *